(12) United States Patent
Washlow et al.

(10) Patent No.: US 9,132,773 B2
(45) Date of Patent: Sep. 15, 2015

(54) MOBILE COMMUNICATION SYSTEM AND METHOD FOR ANALYZING ALERTS ASSOCIATED WITH VEHICULAR TRAVEL

(71) Applicant: Cobra Electronics Corporation, Chicago, IL (US)

(72) Inventors: Sally Ann Washlow, Oak Park, IL (US); Wilfred Charles Boudreau, Mundelein, IL (US); Robert Ryan Brandys, Hinsdale, IL (US); Brian Neal Hosler, Elmhurst, IL (US); Ronald Byron Kabler, Lawrence, KS (US); Monica Marie Vondruska, Golden, CO (US)

(73) Assignee: Cobra Electronics Corporation, Chicago, IL (US)

( * ) Notice: Subject to any disclaimer, the term of this patent is extended or adjusted under 35 U.S.C. 154(b) by 208 days.

(21) Appl. No.: 13/840,496

(22) Filed: Mar. 15, 2013

(65) Prior Publication Data

US 2013/0214939 A1    Aug. 22, 2013

Related U.S. Application Data

(63) Continuation-in-part of application No. 13/514,232, filed as application No. PCT/US2010/059115 on Dec. 6, 2010, now Pat. No. 8,842,004, said application No. 13/840,496 is a continuation-in-part of application No.

(Continued)

(51) Int. Cl.
*G08G 1/00* (2006.01)
*B60Q 9/00* (2006.01)
(Continued)

(52) U.S. Cl.
CPC . *B60Q 9/00* (2013.01); *G01S 7/003* (2013.01); *G01S 7/022* (2013.01)

(58) Field of Classification Search
CPC ................................ G01S 7/022; G01S 13/88
USPC ........... 340/901, 425.5, 905, 936, 990, 995.1, 340/426.19; 342/20, 52, 357.2, 357.39
See application file for complete search history.

(56) References Cited

U.S. PATENT DOCUMENTS

| 3,956,626 A | 5/1976 | Ross |
| 5,021,961 A | 6/1991 | Ross et al. |

(Continued)

FOREIGN PATENT DOCUMENTS

| JP | A-2003-132488 | 5/2003 |
| JP | A-2006-058191 | 3/2006 |

(Continued)

OTHER PUBLICATIONS

Entry for "Multimedia Messaging Service" in Wikipedia at Wikipedia.org, retrieved on May 9, 2014.

(Continued)

*Primary Examiner* — Phung Nguyen
(74) *Attorney, Agent, or Firm* — Hitchcock Evert LLP

(57) ABSTRACT

A mobile communication system for collection, determination and/or distribution of data to and from a server. The server executes analysis algorithms that analyze data received from multiple communication and data sources to develop predictions about the likelihood of future alerts or threats in geographic locations. The server communicates the predictions to communication devices based on the geographic locations corresponding to each of the communication devices. The communication system incorporates data through interfaces between data collection components and mobile communication devices that includes a communication element. The communication element transmits data between the data collection components and the mobile communication device. A user interface of the mobile communication device may communicate the information to a user of the electromagnetic signal detector.

40 Claims, 20 Drawing Sheets

Related U.S. Application Data

13/518,167, filed as application No. PCT/US2010/060952 on Dec. 17, 2010, now Pat. No. 8,970,422.

(60) Provisional application No. 61/267,172, filed on Dec. 7, 2009, provisional application No. 61/289,278, filed on Dec. 22, 2009.

(51) Int. Cl.
  *G01S 7/00* (2006.01)
  *G01S 7/02* (2006.01)

(56) References Cited

U.S. PATENT DOCUMENTS

| | | | |
|---|---|---|---|
| 5,151,701 A | 9/1992 | Valentine et al. | |
| 5,206,651 A | 4/1993 | Valentine et al. | |
| 5,218,467 A | 6/1993 | Ross et al. | |
| 5,229,947 A | 7/1993 | Ross et al. | |
| 5,250,951 A | 10/1993 | Valentine et al. | |
| D366,659 S | 1/1996 | Ross et al. | |
| 5,510,793 A | 4/1996 | Gregg, III et al. | |
| 5,515,402 A | 5/1996 | Chester | |
| 5,784,021 A | 7/1998 | Oliva | |
| 5,815,092 A | 9/1998 | Gregg, III et al. | |
| 5,859,628 A | 1/1999 | Ross et al. | |
| 5,943,653 A | 8/1999 | Ross et al. | |
| 5,977,884 A | 11/1999 | Ross | |
| 6,118,403 A | 9/2000 | Lang | |
| 6,201,493 B1 | 3/2001 | Silverman | |
| 6,204,798 B1 | 3/2001 | Fleming | |
| 6,265,989 B1 | 7/2001 | Taylor | |
| 6,266,617 B1 | 7/2001 | Evans | |
| 6,384,776 B1 * | 5/2002 | Martin | 342/357.31 |
| 6,400,304 B1 * | 6/2002 | Chubbs, III | 342/20 |
| 6,442,485 B2 | 8/2002 | Evans | |
| 6,469,653 B1 | 10/2002 | Haynes | |
| 6,480,144 B1 | 11/2002 | Miller et al. | |
| 6,498,569 B2 | 12/2002 | Dijkstra | |
| 6,567,035 B1 | 5/2003 | Elliott | |
| 6,670,905 B1 * | 12/2003 | Orr | 342/20 |
| 6,675,085 B2 * | 1/2004 | Straub | 701/93 |
| 6,748,322 B1 | 6/2004 | Fernandez | |
| 6,845,317 B2 | 1/2005 | Craine | |
| 6,895,324 B2 | 5/2005 | Straub | |
| 6,943,723 B2 | 9/2005 | Kim et al. | |
| 6,980,092 B2 | 12/2005 | Turnbull et al. | |
| RE39,038 E | 3/2006 | Fleming, III | |
| 7,042,345 B2 | 5/2006 | Ellis | |
| 7,058,356 B2 | 6/2006 | Slotznick | |
| 7,171,187 B2 | 1/2007 | Haave et al. | |
| 7,183,942 B2 | 2/2007 | Rock et al. | |
| 7,301,494 B2 | 11/2007 | Waters | |
| 7,468,659 B2 | 12/2008 | Haave et al. | |
| 7,471,236 B1 | 12/2008 | Pitt et al. | |
| 7,489,993 B2 | 2/2009 | Coffee et al. | |
| RE40,653 E | 3/2009 | Fleming, III | |
| 7,702,044 B2 | 4/2010 | Nallapureddy et al. | |
| 7,764,219 B2 | 7/2010 | Pitt et al. | |
| RE41,905 E | 11/2010 | Fleming, III | |
| 7,899,450 B2 | 3/2011 | Pitt et al. | |
| 7,965,222 B2 | 6/2011 | Pitt et al. | |
| 7,999,721 B2 | 8/2011 | Orr | |
| 8,099,466 B2 | 1/2012 | Tenereillo et al. | |
| 8,255,155 B1 | 8/2012 | Crane et al. | |
| 8,373,588 B2 | 2/2013 | Kuhn | |
| 8,442,524 B2 | 5/2013 | Jendbro et al. | |
| 8,515,414 B2 | 8/2013 | Pitt et al. | |
| 8,525,723 B2 | 9/2013 | Orr et al. | |
| 2001/0030624 A1 | 10/2001 | Schwoegler | |
| 2002/0135504 A1 | 9/2002 | Singer | |
| 2002/0152264 A1 | 10/2002 | Yamasaki | |
| 2003/0052797 A1 * | 3/2003 | Rock et al. | 340/936 |
| 2003/0139150 A1 | 7/2003 | Rodriguez et al. | |
| 2003/0214430 A1 | 11/2003 | Husted et al. | |
| 2003/0218562 A1 | 11/2003 | Orr | |
| 2004/0107037 A1 | 6/2004 | Straub | |
| 2004/0254729 A1 | 12/2004 | Browne et al. | |
| 2005/0242984 A1 | 11/2005 | Waters | |
| 2007/0046531 A1 | 3/2007 | Yu | |
| 2007/0109187 A1 * | 5/2007 | Murphy | 342/357.13 |
| 2007/0216521 A1 | 9/2007 | Guensler et al. | |
| 2007/0222639 A1 | 9/2007 | Giles et al. | |
| 2008/0147401 A1 | 6/2008 | Odinak et al. | |
| 2009/0016418 A1 | 1/2009 | Silver | |
| 2010/0188265 A1 | 7/2010 | Hill et al. | |
| 2010/0214148 A1 | 8/2010 | Kuhn | |
| 2010/0214149 A1 * | 8/2010 | Kuhn | 342/20 |
| 2010/0242906 A1 | 9/2010 | Konezny | |
| 2010/0317420 A1 | 12/2010 | Hoffberg | |
| 2011/0149933 A1 | 6/2011 | Pitt et al. | |
| 2012/0268306 A1 | 10/2012 | Coburn et al. | |
| 2012/0311559 A1 | 12/2012 | Clark et al. | |
| 2012/0326889 A1 | 12/2012 | Kabler et al. | |
| 2013/0009760 A1 | 1/2013 | Washlow et al. | |
| 2013/0207829 A1 | 8/2013 | Kabler et al. | |
| 2013/0211707 A1 | 8/2013 | Washlow et al. | |

FOREIGN PATENT DOCUMENTS

| | | |
|---|---|---|
| JP | A-2008-269178 | 11/2008 |
| JP | A-2009-097865 | 5/2009 |
| JP | A-2009-277059 | 11/2009 |
| WO | 2008137996 A1 | 11/2008 |
| WO | 2011071826 A1 | 6/2011 |
| WO | 2011087714 A1 | 7/2011 |

OTHER PUBLICATIONS

Blog Entry "Radar detector interface to iPhone," by Beamerboy on Tuesday, Aug. 25, 2009, www.trapster.com, printed on Nov. 5, 2009.
Radar Active Website, May 15, 2010, www.radaractive.com, as saved by Web.archive.org, printed on Jan. 21, 2013.
"Ford Prototype Car Talks to Other Cars," Jan. 26, 2011, www.ceoutlook.com, as printed on Feb. 3, 2011.
"Ford's intelligent vehicles communicate wirelessly, shoot hula hoops out of tailpipes (video)," Jan. 27, 2011, www.engadget.com, as printed on Jan. 21, 2013.
Mumble Webpage, http://muble.sourceforge.net, printed on Oct. 15, 2013.

* cited by examiner

MOBILE COMMUNICATION SYSTEM AND METHOD FOR ANALYZING ALERTS ASSOCIATED WITH VEHICULAR TRAVEL

CROSS-REFERENCE TO RELATED APPLICATION

The current application is a continuation-in-part of U.S. application Ser. No. 13/518,167, entitled "Radar Detector That Interfaces With A Mobile Communication Device" and filed on Aug. 9, 2012, which claims the benefit of priority from U.S. Provisional Application No. 61/289,278, entitled "Radar Detector That Interfaces With A Mobile Communication Device" and filed on Dec. 22, 2009. The current application is a continuation-in-part of U.S. application Ser. No. 13/514,232, entitled "Analyzing Data From Networked Radar Detectors" and filed on Aug. 9, 2012, which claims the benefit of priority from U.S. Provisional Application No. 61/267,172, entitled "Analyzing Data From Networked Radar Detectors" and filed on Dec. 7, 2009. The preceding applications are incorporated herein by reference.

FIELD OF THE INVENTION

This invention relates generally to the field of sensing and communication equipment meant to alert motor vehicle operators and passengers to potential threats and safety risks. This invention also relates to the field of radar detector interfaces, in which sensing equipment enables an interface to alert motor vehicle operators to detailed threats for specific geographic locations. This invention also relates to the field of threat level topography, in which sensing equipment alerts motor vehicle operators to levels of threats that are predicted for specific geographic locations. This invention also relates to communicating data transmissions associated with geographic locations among vehicle users.

BACKGROUND

Conventional radar detectors detect electromagnetic signals (such as microwave signals) or laser signals transmitted from radar or laser-type speed measurement equipment, such as police radar signals. Thus, radar detectors serve to provide advance warning to drivers who are being monitored by police radar. However, radar detectors and their scanning algorithms are an imperfect technology. Electromagnetic waves are naturally vulnerable to reflection, bouncing, and scattering. These characteristics create variability and "noise" that a radar detector must detect and analyze before determining whether or not to alert a motor vehicle operator to a potential threat. In addition, radar detectors do not actively predict areas for alert and, instead, they react to signals they receive from the environment which limits the amount of advanced warning that can be provided. In addition, radar detectors typically have interfaces that limit the amount of information provided to a motor vehicle operator and/or limit the ease with which a user may customize the use of the radar detector. However, increasing the size of a radar detector's display interface may be cost prohibitive.

There are a number of tools and/or types of sensing equipment used by drivers to provide an alert to these sorts of traffic control devices, with radar/laser detectors the most common. As used herein, the terms radar detector and electromagnetic signal detector will be used interchangeably to refer to any of a number of known signal detection units capable of detecting electromagnetic signals in the X-band, K-band or Ka-band. Furthermore, the terms radar detector and electromagnetic signal detector will also be used interchangeably to refer to radar and/or laser detectors, and could refer to any electromagnetic wave detector or light wave detector. Examples of known technology in this area include U.S. Pat. Nos. 5,784,021 and 5,151,701.

Existing radar detectors' inability to provide alerts in advance of receiving the electromagnetic signal limits each driver's capability to safely adjust his or her driving while approaching a threat or other safety hazard. Radar detectors are also encumbered by sources of false positives, including motion-sensing doors on commercial buildings, motion-detecting burglar alarms, other radar detectors, and light signals emitted from sources other than laser guns. More recently, makers of luxury automobiles have begun offering "collision detection" systems that use microwave motion sensors mounted around the vehicle. A radar detector following one of these vehicles may provide a false alert based on a collision detection system, which may diminish the motor vehicle operator's experience. These factors, taken together, make radar detection problematic.

U.S. Pat. Nos. 6,118,403, 6,384,776, 6,670,905, 6,895,324, and 7,471,236 describe radar detectors and radar detector systems. However, none of the systems overcome the various problems associated with existing radar detectors. In addition, none of the systems provide alerts or predictions based upon a statistical analysis of centralized aggregated data. Existing radar detectors and radar detector systems do not overcome problems with minimizing false alerts while providing advance statistical predictions of potential threats.

SUMMARY

A radar detector is fundamentally a device that turns data into actionable information. Data problems like these may be solved with database architectures and analysis algorithms. These analysis algorithms can sift through the noise and variance inherent in the sampling methodology to provide more precise actionable information. Some problems with radar detectors may be minimized by applying database analytical strategies. Generally, networked radar detectors may communicate the radar detectors' data for a geographic location to a server that executes analysis algorithms to analyze the aggregated data and make predictions about law enforcement speed monitoring activities and potential safety risks at the geographic location. The server provides alert management that dynamically adjusts alerts based on statistical probabilities and communicates the predictions to the networked radar detectors near the geographic location. The networked radar detectors at the geographical location communicate threat levels and/or predictions of alert levels to motor vehicle operators and/or passengers as alerts. These alerts will help motor vehicle operators minimize the risks associated with law enforcement speed monitoring activity and reduce the probability that a radar detector user will fall into a police speed trap. This present invention may also lead to larger zones of safe driving in compliance with local laws; a goal sought by all traffic regulating authorities.

An external mobile communication device, such as a cellular telephone or smart phone, may be used as a radar detector interface to address some radar detector problems and/or limitations. Radar detector data is communicated to a mobile communication device that includes a display screen capable of displaying significant quantities of information about law enforcement speed monitoring activities and potential safety risks at a geographic location in an easy-to-understand format. This detailed information will help motor vehicle operators minimize the risks associated with law enforcement speed monitoring activity and reduce the probability that a radar detector user will fall into a police speed trap. The mobile communication device's display screen, which is comparatively large when compared to current radar detector displays, will enable the user to more easily customize the operation of the radar detector to the user's specific needs and may also lead to larger zones of safe driving in compliance with local laws; a goal sought by all traffic regulating authorities. Furthermore, because many mobile communication devices use similar colors, color gradients, fonts, and layouts, many users of such devices are already familiar and comfortable with the display of information in these formats.

Mobile communication systems can facilitate the increased aggregation of data from numerous sources to improve and/or customize traffic alerts and monitoring. Devices and systems can be designed to improve the vehicular communication experience while also improving the driving safety of users. For example, improved user interfaces and information allow for the provision of more reliable and accurate alerts and capabilities to modify driving patterns to account for potential cautions and alerts in advance.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein. One skilled in the art will recognize that the predicted alert levels, alert probabilities, predictions, and threat levels are synonymous and based upon an analysis of data by analysis algorithm 424 whether located in the electromagnetic signal detector, server or elsewhere, and alert level, detection alert level and initial alert level are based upon an electromagnetic signal detectors normal operation and detection of a signal, prior to an analysis by the analysis algorithm 424.

Figure 1:
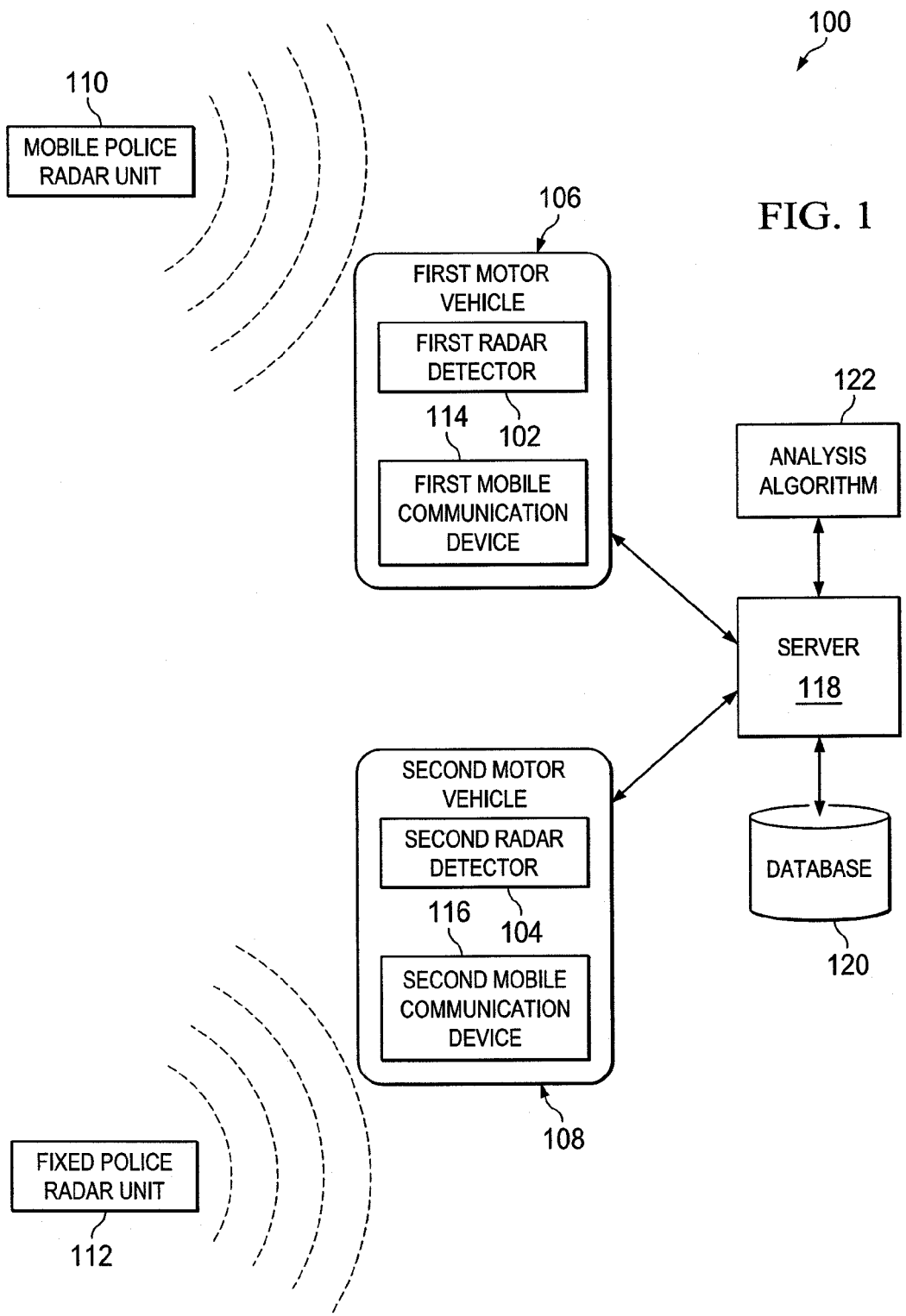
FIG. 1 is a block diagram depicting an embodiment of a system of the present disclosure.

With reference to FIG. 1, a block diagram depicts the system 100 according to an embodiment of the present invention. The depicted system 100 includes a first radar detector 102 and a second radar detector 104. The first radar detector 102 is used by a first motor vehicle 106 and the second radar detector 104 is used by a second motor vehicle 108. Electromagnetic signal devices depicted in FIG. 1 include a mobile police radar unit 110, such as a police motorcycle equipped with a radar gun, and a fixed police radar unit 112, such as a speed camera, that are situated towards the road on which the motor vehicles 106-108 are traveling. The radar detectors 102-104 may detect electromagnetic signals emitted from the radar units 110-112.

The system 100 may also include a first mobile communication device 114, a second mobile communication device 116, a server 118, a database 120, and an analysis algorithm 122. The mobile communication devices 114-116 may be a mobile phone, a cellular phone, a smart phone, a satellite phone, a navigation system, a personal digital assistant, a portable computer, a laptop computer, a tablet computer, and/or any other device with a user interface and the capability to wirelessly communicate. The mobile communication devices 114-116 enable the radar detectors 102-104 to communicate with the users of the mobile communication devices 114-116 via the corresponding user interfaces of the mobile communication devices 114-116. Many radar detector users already own and regularly use mobile communication devices 114-116, such as mobile phones, and therefore may not need to purchase any such mobile communication devices 114-116 to interface with the radar detectors 102-104. As one skilled in the art will recognize, the system 100 may include any number of radar detectors 102-104, motor vehicles 106-108, electromagnetic emitting devices 110-112, mobile communication devices 114-116, servers 118, databases 120, and analysis algorithm 122 and should not be limited to the illustrative example provided in FIG. 1.

The first radar detector 102 communicates with the first mobile communication device 114 via a first communication standard, such as the Bluetooth communication standard, the ZigBee communication standard, the WiFi communication standard, or any other communication standard. One skilled in the art will recognize that the first communication standard may include hard-wired and wireless communication and remain within the scope and spirit of the invention. Although specific communication standards may be identified for illustrative examples herein, one skilled in the art will recognize that other communication standards may be employed and remain within the scope and spirit of the invention. Similarly, the second radar detector 102 communicates with the second mobile communication device 116 via the first communication standard, such as the Bluetooth communication standard. In contrast to providing each of the radar detectors 102-104 with the capability to communicate via a wide area communication network, which may be complicated and cost prohibitive, providing each of the radar detectors 102-104 with the capability to communicate via the Bluetooth communication standard or other near-field communication standard may be easy and relatively inexpensive. Furthermore, many mobile communication devices 114-116 are either already provided with Bluetooth or other communication capabilities, or may be easily and relatively inexpensively upgraded to provide Bluetooth or other communication capabilities.

In some embodiments, the communication capabilities of radar detectors 102-104 and mobile communication devices 114-116 may be utilized to automatically execute the system and/or method in each of radar detectors 102-104 and mobile communication devices 114-116 when they are within a certain range, such as the communication range of the first communication standard. For example, radar detector 102 and mobile communication device 114 may contain paired radio frequency identification ("RFID") components. When the range between radar detector 102 and mobile communication device 114 is within the RFID signal range, the RFID components cause an application within mobile communication device 114 to automatically execute the system and/or method. For example, once the radar detector 102 and mobile communication device 114 are within range of one another, the devices could "pair" via the Bluetooth standard. As one skilled in the art will recognize, the communication capabilities may be used to automatically execute all or portions of the system and/or method in radar detectors 102-104 and/or mobile communication devices 114-116 and remain within the scope and spirit of the invention. In addition, one skilled in the art will recognize that the communication capabilities may be used to permit, preclude or and/modify other operations of radar detectors 102-104 and/or mobile communication devices 114-116 and remain within the scope and spirit of the invention.

Figure 2:
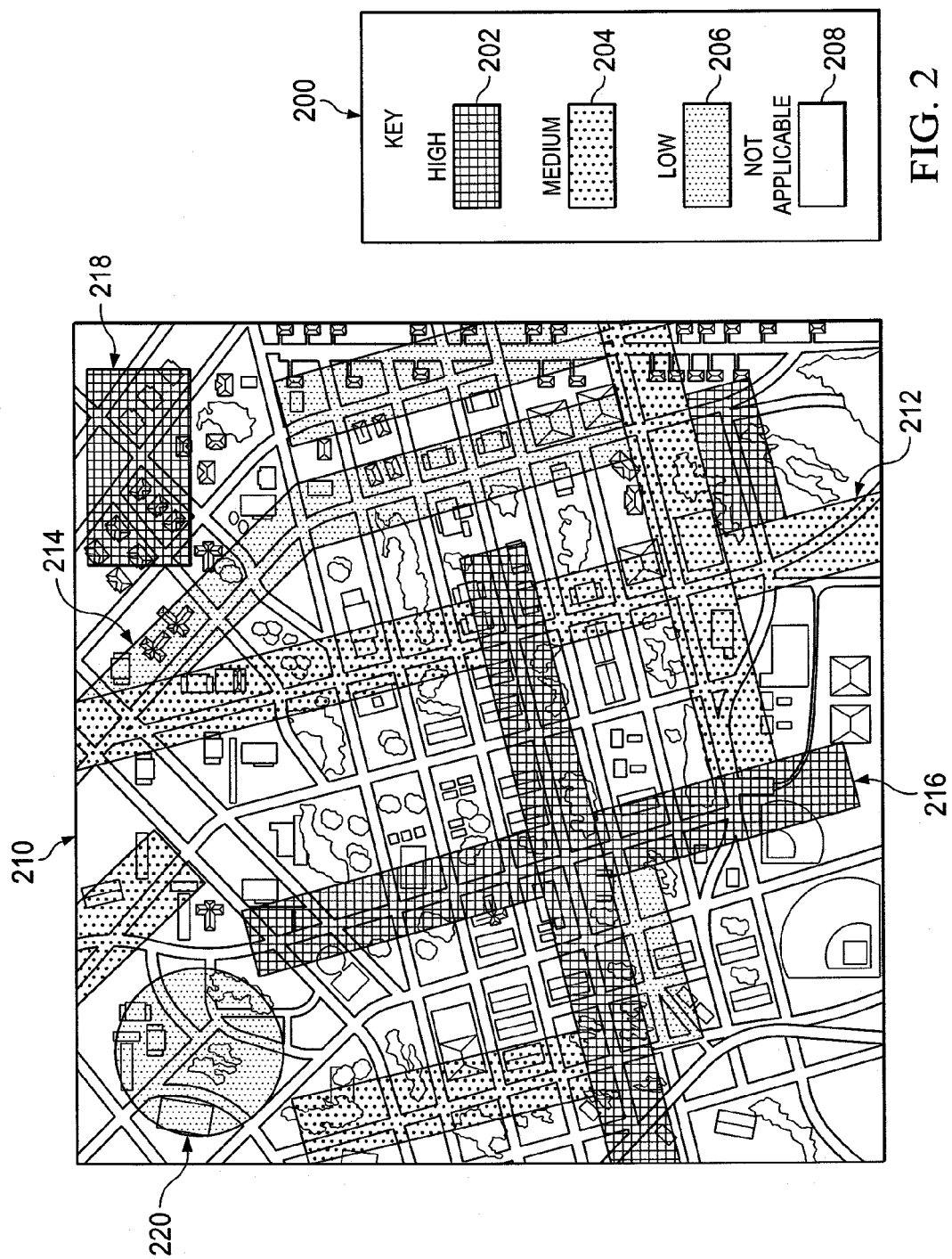
FIG. 2 is a mobile communication device interface depicting data of the present disclosure as a map illustration.

Each of the mobile communication devices 114-116 has its own user interface with which a user may already be familiar with using. In contrast, a user who recently purchased a typical radar detector may not become completely familiar with the new and potentially unfamiliar radar detector interface. This mobile communication device interface, which is distinct and separate from the user interface of any radar detector, may be much larger than the user interface of typical radar detectors. The mobile communication device user interface may be capable of displaying significantly more information than typical radar detectors can display, such as a navigation map that depicts various road segments and their corresponding predicted alert levels, as illustrated in FIG. 2 and discussed below. The mobile communication device user interface may also display a history of specific types of detected electromagnetic signals, such as the specific types of electromagnetic signals detected along a driven route.

The user interface of the mobile communication devices 114-116 may improve the aesthetic layout and informative presentation of data in a safe to utilize manner. The user interface may also display alerts based on various levels, such as a probability that a detected signal is a law enforcement speed monitoring signal, or levels of alerts based on colors, such as the range that includes yellow, yellow-orange, orange, orange-red, and red, or any other color scheme. In contrast to typical radar detectors that may be restricted to using a limited number of colors to depict various levels of alerts, the mobile communication device interface may be capable of displaying a virtually unlimited number of colors in the color spectrum. The user may select any color to be displayed by the user interface for each type of alert and/or to correspond with alert levels. Furthermore, the user interface may also display virtually any amounts of additional information, such as a compass heading and a calculation of the speed of the user's vehicle.

The user interface of the first mobile communication device 114 also enables the user of the first mobile communication device 114 to more easily enter user input to customize the operation of the first radar detector 102 without the need to utilize a user interface physically attached to or part of first radar detector 102. For example, the user may use the user interface of the first mobile communication device 114 to manage radar events on an interactive map, such as removing alerts that the user knows are false alerts and acknowledging alerts that the user knows are valid alerts via a mobile phone touch screen. Furthermore, the present invention may include one or more additional safety features, such as the ability to prevent or limit the ability to manage the system while the vehicle is in motion.

The user may also easily select from many options displayed by the mobile communication device user interface, such as whether to share radar events detected by the user's radar detector with servers and/or databases, which may convey these radar events to other mobile communication devices. Selecting to share radar events with other mobile communication devices may enable each of the mobile communication devices 114-116 to communicate their detected radar events via the second communication standard to the server 118, which may be a centralized server that aggregates these radar events and provides threat or predicted alert levels to the mobile communication devices 114-116 in a communication network. The aggregation of radar events may provide each of the mobile communication devices 114-116 with information about detected or predicted radar events at specific locations long before the corresponding radar detectors 102-104 are even capable of detecting these radar events. One skilled in the art will recognize that the radar detectors 102-104 and/or the mobile communication devices 114-116 may have a location determining unit, such as a Global Positioning System (GPS) receiver, to identify the current location of the radar detectors 102-104 and/or the mobile communication devices 114-116.

The options displayed by the mobile communication device user interface may also include an option to adjust the sensitivity of the user's radar detector based on specific city and highway environments. For example, a user may select specific road segments depicted in the map of FIG. 2 for lower sensitivity settings based on the user's experience in encountering false alerts while driving daily on those specific road segments. The user may also select to stream radar detector's audible alerts to external speakers, a piezoelectric device, and/or any other audio transducer. The options displayed by the larger user interface may also include an option to revise levels of alerts and outputs indicating alert levels, such as selecting green for a minor alert and/or muting audible alerts for minor alerts. Furthermore, the options displayed by the mobile communication device user interface may also include an option to either raise or lower the threat probabilities associated with each level of alerts, such as raising the threat probability level for an alert to qualify as a minor alert and lowering the threat probability level for an alert to qualify as a major alert, wherein the difference between a minor and major alert could be the number or color of visual displays lit and/or the loudness, pattern or tone of an audible alert. Additionally, the options displayed by the mobile communication device user interface may also include an option to select from various modes of operation, such as a proximity mode, a city mode, or a rural mode, and the mobile communication device user interface may be used to instruct the radar detectors 102-104 to enable or disable such mode selections. Furthermore, the modes may be selected by any combination of the first radar detector 102, the first mobile communication device 114, the server 118, or the user of the first mobile communication device 114. Additionally, the selection of the modes may be sent from the first radar detector 102, the first mobile communication device 114, and/or the server 118 to the first radar detector 102, the first mobile communication device 114, and/or the server 118. The first radar detector 102, the first mobile communication device 114, and/or the server 118 may include a map database used for determining when to enter a specific mode. For example, the first mobile communication device 114 switches from rural mode to city mode based on the current geographic location of the first mobile communication device 114 and a map database stored in the memory of the first mobile communication device 114. In another example, the user of the first mobile communication device 114 may enter a selection of city mode via the mobile communication device user interface even though the map database stored in the memory of the first mobile communication device 114 indicates that rural mode is still optimal for the current geographic location. One skilled in the art will recognize that the modes of operation and methods and/or options for selecting a mode of operation may vary and remain within the scope and spirit of the invention. One skilled in the art will also recognize that a map database may comprise data representing the roadways, geographic areas including specific geographical areas (such as country, state and/or municipality boundaries) and/or generic geographic areas (such as patterned geometric shapes), geographic points, and/or any other geographic information. One skilled in the art will also recognize that the size, shape, scope, calculation, and/or any defining parameters of geographic information in a map database may vary and remain within the scope and spirit of the present invention.

Because the first mobile communication device 114 may have a display screen that is comparatively larger than the screen found on current radar detectors, mobile communication device may enable the user to interface with the first radar detector 102, while the first radar detector 102 may have no display and a minimal number of small indicators and/or buttons, or no such indicators and/or buttons at all. If present, these small indicators may indicate whether the first radar detector 102 has sufficient electrical power to operate and whether the first radar detector 102 is paired with the first mobile communication device 104 by Bluetooth or another communication standard. The first radar detector 102 may also have small buttons for controlling the volume and/or muting the audible signals of the first radar detector 102.

Leveraging the network communication capabilities of any such mobile communication devices 114-116 is a cost-effective alternative to the expenses required to add such network communication capabilities to the radar detectors 102-104. The mobile communication devices 114-116 enable the radar detectors 102-104 to communicate data to and from the server 118 via a second communication standard that differs from the first communication standard. This second communication standard may have wide-area network capabilities, more range, or utilize a different communication protocol than the first communication standard. By utilizing the advantages of the second communication protocol through mobile communication devices 114-116, radar detectors 102-104 are able to gain these communication benefits. The mobile communication devices 114-116 enable the radar detectors 102-104 to communicate via the second communication standard over a communication network, such as a cellular telephone network, a satellite network, a Wi-Fi, another wireless network, and/or the Internet. As one skilled in the art will recognize, the system 100 may operate on one or more public networks, private networks or combinations of public and private networks. By leveraging the pre-existing communication capabilities of the mobile communication devices 114-116, the radar detectors 102-104 may inexpensively, quickly, and easily communicate data to the server 118.

Each of the radar detectors 102-104, the mobile communication devices 114-116, and the server 118 has the ability to initiate the process of sending or receiving data. The data may relate to location, speed, and/or acceleration of the motor vehicles 106-108, law enforcement activity, detectable electromagnetic signals, traffic conditions, any other hazards or alerts, and/or the status of the radar detector including operating mode, detection bands enabled and the like. Any or all such data may be identified and flagged at the discretion of the server 118 and/or the users of the radar detectors 102-104. As one skilled in the art will recognize, law enforcement activity includes speed traps, speed cameras, red light cameras, and any law enforcement personnel and/or device enforcing traffic laws. The data may also include driving patterns of vehicles 106-108 and/or specific driving patterns of individuals including patterns relating to the driver's typical reaction to specific alerts under specific circumstances. For example, the system may detect that the vehicle in which it is operating suddenly decelerated in response to a specific electromagnetic signal. This action by the vehicle could signify that the operator perceived an actual hazard or law enforcement activity, indicating that the signal is a legitimate source. This allows server 118 to utilize the database 120 to customize the predicted alert and/or threat levels it downloads to each user in order to adjust the alert levels to correlate to the advanced warning desired by the driver.

For example, the first radar detector 102 detects the mobile police radar unit 110 and the fixed police radar unit 112 and communicates data representing these detections to the first mobile communication device 114 via Bluetooth, and the first mobile communication device 114 communicates this data along with time and location data associated with the detections to the server 118 via a communication network. In another example, the second radar detector 104 also detects the fixed police radar unit 112 and communicates data representing this detection, including time and location data, to the second mobile communication device 116 via Bluetooth, and the second mobile communication device 116 communicates this data to the server 118 via a telephone communication network.

As one skilled in the art will recognize, radar detectors 102-104 and server 118 may leverage the various communication standards of the mobile communication devices 114-116 to communicate data in real-time or may communicate data based upon a schedule, a triggering event (such as reaching a data quantity threshold or a data storage size threshold), and/or a combination of a schedule and triggering event and remain within the scope and spirit of the invention. For example, the first radar detector 102 detects the mobile police radar unit 110 and the fixed police radar unit 112 and stores data representing these detections in internal memory, such as a buffer. Once a threshold quantity of data is reached or surpassed in the buffer, the first radar detector 102 communicates data representing these detections to the first mobile communication device 114 via Bluetooth, and the first mobile communication device 114 communicates this data to the server 118 via a telephone communication network. For another example, the second radar detector 104 may not receive any detection while traveling other roadways and stores data representing the absence of detections along the traveled path. At scheduled times the second radar detector 104 may communicate data representing the absence of detections to the second mobile communication device 116 via Bluetooth, and the second mobile communication device 116 communicates this data to the server 118 via a telephone communication network. In yet another example either mobile communication device 114-116 may buffer stored data, and wait until a threshold quantity of data is reached or surpassed in a buffer before communicating this data to the server 118 via a telephone communication network.

Upon receipt of such data, the server 118 stores the data into physical or electronic memory in the database 120, which may be part of the server 118 or separate from the server 118. The server administrators may also add other data to the database 120 (pertaining to law enforcement, safety, or driving in general) that are not measurable in the electromagnetic and laser spectrums of the radar detectors 102-104. Examples of this type of data include traffic flow conditions, dangerous intersections, and speed limits for various road segments. This additional data may be updated periodically by the server 118, automatically or through manual data entry. Some data changes frequently, like weather conditions and traffic conditions in local areas. Other data changes infrequently, such as "line segment" approximations of road maps and physical locations of school zones and/or law enforcement monitoring installations. These installations include but are not limited to red light and speed cameras. The data may include the data from the radar detectors 102-104, other data added by administrators as indicated above, and data from other data suppliers.

The server 118 executes the analysis algorithm 122 that periodically collects, sorts, organizes, and analyzes the data. The result of this analysis is stored in new records in database 120. In a preferred embodiment, the data is associated with database 120, but as one skilled in the art will recognize, the analysis algorithm 122 may incorporate or otherwise analyze data from sources other than the database 120 and remain within the scope and spirit of the invention. The analysis algorithm 122 may include statistical or predictive calculations relating to the likelihood of future threats, hazards, alerts, law enforcement speed monitoring activity, or traffic conditions. In the context of the present invention, the terms threat, predicted alert and predictive alert may be used interchangeably to refer to the likelihood that a user of the present invention will encounter a police radar unit, a road hazard or other event that will trigger an alert displayed on radar detectors 102-104 and/or the mobile communication devices 114-116.

Relative to the storage capacity and processing capacity of the radar devices 102-104, the storage capacity and the processing capacity of the mobile communication devices 114-116 may provide the capability to execute a complex analysis algorithm 122 using significant quantities of aggregated data, including data that is not readily available to the radar detectors 102-104. In addition, relative to the storage capacity and processing capacity of the radar devices 102-104 and the mobile communication devices 114-116, the storage capacity and the processing capacity of the database 120 and the server 118 may provide the capability to execute a complex analysis algorithm 122 using significant quantities of aggregated data, including data that is not readily available to either the radar detectors 102-104 and the mobile communication devices 114-116. However, it will be realized by those skilled in the art that as processing power increases, it may also be possible to run algorithm 122 on either radar detectors 102-104 and/or mobile communication devices 114-116 and still remain within the scope and spirit of the invention.

The output of the analysis algorithm 122 may include a calculated predictive alert level value or series of values that attempts to approximate and quantify the statistical likelihood of there being law enforcement activity and/or other safety risks in the geographic locations ahead of any of the motor vehicles 106-108. In some embodiments, the analysis algorithm 122 may tailor predicted alert values to an individual radar detector and/or driver based in part upon any considerations entered by the user and/or the user's stored driving patterns. This prediction may be based on a single factor or a combination of factors. As one skilled in the art will recognize, the prediction may be based on any data available to analysis algorithm 122, including but not limited to patterns of emission detections, geographic locations, signal analysis, user input, and any other data. One skilled in the art will recognize that signal analysis may include signal band analysis, signal frequency analysis, signal strength or intensity measurements, and/or any other signal analysis. For example, the received signal band may be compared to known signal regulations imposed by the FCC or other regulatory or licensing body. For instance, if the signal is in the X or K bands it may be a motion-sensing door, however, if the signal is in the Ka band it is less likely to be a motion-sensing door. For another example, the received signal band may be compared to previously identified signal bands stored in database 120. For instance, database 120 may have stored information associated with one geographic location regarding an X band signal that has a high probability of representing law enforcement activity and a Ka band signal that has a low probability of representing law enforcement activity. If a received signal is in the Ka band, the previously identified Ka band signals in the geographic location may factor in analysis algorithm 122 calculating a low probability of the received Ka band signal representing law enforcement activity.

In an embodiment, an alert may be based upon an analysis of speed limits for road segments in the geographic location associated with radar detectors 102-104. For example, database 120 may contain posted speed limits for the road segment that radar detector 102 is traveling along and recognize that radar detector 102 is approaching a lowered speed limit, server 118 may then communicate the approaching speed limit to mobile communication device 114, which can then provide an alert to the user of mobile communication device 114 of the approaching change in the speed limit. One skilled in the art will recognize that a road segment or road segments may refer to physical roadways and/or the data representations of physical roadways created and/or stored in server 118, radar detectors 102-104, mobile communication devices 114-116, and/or another computer hardware device. Mobile communication device 114 may also consider user inputs regarding when to provide a speed limit alert. For example, the user of mobile communication device 114 may input a condition that an alert not be provided unless the current vehicle speed is above the approaching speed limit or may input a condition that an alert not be provided unless there is also a prediction of law enforcement activity in the area. As one skilled in the art will recognize, database 120 may contain any number and type of various traffic regulations associated with geographic locations or specific road segments which may be communicated to a user via the alert outputs available to the user and remain within the scope and spirit of the invention. One skilled in the art will also recognize that default, system determined, and user conditions for alerts may vary and remain within the scope and spirit of the invention.

A third radar detector and a third mobile communication device (not depicted in FIG. 1) may derive the benefits from the system 100 based on detections made by the first radar detector 102 and the second radar detector 104 even when the third radar detector and the third mobile communication device approach the fixed police radar unit 112 for the very first time. The third mobile communication device may receive a predicted alert or threat level from server 118 and thereafter provide an alert for the fixed police radar unit 112 without the third radar detector having previously observed and recorded any band emissions from that geographic location. The predicted alert or threat level received by the third mobile communication device and communicated to the third radar detector may be based upon periodically received data from the server 118 pertaining to predicted probabilities and/or alert levels for potential threats in the local area. Therefore, the system 100 may provide benefits to mobile communication device users who have never traveled on a specific road segment before based on data from the multiple radar detectors 102-104 that have previously traveled on the specific road segment. In yet another example, an operator of a fourth mobile communication device (not depicted) may derive the benefits from system 100 based on detections made by radar detectors 102-104, even if that operator does not operate a radar detector of their own. Specifically, the fourth mobile communication device may receive periodic data from server 118, and display alerts in a manner similar to that described for the third mobile communication device. In this manner, fourth mobile communication device would be limited only in that it would not receive new detections of electromagnetic signals (because it is not communicating with an electromagnetic signal detector such as a radar detector) and would, therefore, be unable to generate or display alerts based on that data. Instead, fourth mobile communication device would rely only on historical data collected by other radar detectors and would display only predictive alerts based on this historical data and the analysis performed on this data by algorithm 122.

When signals are detected by one of radar detectors 102-104, an alert level may be based upon the predicted probability that the detected signals represent a law enforcement monitoring device or other safety risk. When signals are not detected, an alert level may be based upon the threat or predicted probability that a law enforcement monitoring device or other safety risk is within a vicinity determined by the radar detectors 102-104, the mobile communication devices 114-116, the server 118, and/or defined by a user. The resulting alert level may be defined in any number of levels whereby each alert level is correlated to a range of threat probabilities. In one embodiment, if there are two alert levels, a 0-50% threat probability may result in no alert or an ignore level and a 51-100% threat probability may represent an alert. In another embodiment, four alert levels may be defined by threat probability ranges 0-40% (no alert or an ignore level), 41-65% (minor alert), 66-85% (mid-level alert), and 86-100% (high alert). In yet another embodiment, five alert levels may be defined based upon ranges along a threat probability scale from −50 to 50, whereby threat probability ranges of −50 through −30 represent a no alert or an ignore level, threat probability ranges of −29 through −1 represent a minor alert, threat probability ranges of 1 through 30 represent a mid-level alert, threat probability ranges of 31 through 50 represent a high alert, and a threat probability of zero indicates that no stored data is available to analyze.

The analysis algorithm 122 may calculate a multitude of threat probabilities and/or associated alert levels based on specific subsets of the data, i.e. for specific times of the day, days of the week, or months of the year. The predicted alert and/or threat levels may also be based on data associated with specific geographic location boundaries. This process may create predicted alert and/or threat levels specific to grid regions bounded by latitude and longitude, specific to a rectangular, radial, or other shaped region, or specific to "road segments" where detailed map data is available. In addition, the analysis algorithm 122 may associate a weighted factor to various data to represent the strength and/or reliability of the data. For example, a diminishing weight factor may be associated with data based on the age of the data such that older data has a lower weight factor. Alternatively, data could be given weight based on actual driver reactions to the data. For example, if the system detects that an operator has slowed the vehicle immediately following detection of a particular electromagnetic signal, this may indicate that the signal corresponds to an actual hazard or law enforcement activity, suggesting that data relating to that particular signal may be given a greater weight. One skilled in the art will recognize that many variables may be considered to determine a weight factor for any data, different weight factors may be applied for different calculations, weight factors may change over time for all data or specific data, and multiple weight factors may be associated with any data to effect the overall weight of the evidence during analysis and remain within the scope and spirit of the invention.

In one example, the server 118 may provide the 95% threat probability predicted by analysis algorithm 122 for the fixed police radar unit 112 to the second mobile communication device 116 associated with the geographic location for the road segment currently traveled by the motor vehicle 108. The mobile communication device user may wish to respond differently to predicted threat probabilities, such as 95%, 50%, and 5%. For example, the user of the second radar detector 104 may program the second mobile communication device 116 to provide a minor alert level if there is a 50% threat or predicted alert probability, while the user of the first radar detector 102 may program the first mobile communication device 114 to provide a no alert or an ignore level if there is a 50% threat or predicted alert probability.

In addition, the mobile communication devices 114-116 may provide an alert based upon a high threat or predicted alert probability in the anticipated travel segment, wherein a travel segment may be a road segment on which the user is currently traveling, and may incorporate different actual distances depending on the speed of the vehicle, the mode in which the system is operating and/or any other relevant variables. For example, the second mobile communication device 116 may provide an alert prior to the second radar detector 104 receiving a radar signal from fixed police radar unit 112 when the second motor vehicle 108 is traveling towards the fixed police radar unit 112 with a determined 95% predicted threat probability. In addition, the second radar detector 104 may increase the given alert once a signal is received from the fixed police radar unit 112.

The alert levels and/or threat probability that the analysis algorithm 122 may predict and that the server 118 may communicate to the mobile communication devices 114-116 are supplementary to the normal operation of the radar detectors 102-104. For example, the mobile police radar unit 110 may arrive on a police motorcycle at a geographic location where electromagnetic signals have never been detected by the radar detectors 102-104 previously. However, the first radar detector 102 may still detect the mobile police radar unit 110 and provide an alert to the operator of the first motor vehicle 106 even before the first mobile communication device 114 communicates data representing this detection to the server 118. For example, the first radar detector 102 may determine that the detected signal is not stored in the internal memory of the first radar detector 102 and communicate an alert to the user based upon the internal analysis and settings of the first radar detector 102 for new or unrecognized signals. In one embodiment, a default setting of the first radar detector 102 would treat new or unrecognized signals as a threat and provide a default alert unless an internal analysis indicated that the signal is likely a false positive.

In addition, before the first radar detector 102 provides an initial alert to the user, it may further analyze the signal. The first radar detector 102 may recognize that a record relating to or describing that signal is not in its own database and therefore communicate an alert based upon the probability that a new electromagnetic signal is a police monitoring unit or other safety risk, or the first radar detector 102 may provide a default alert until additional data is received and analyzed.

In addition, while the first radar detector 102 is providing an initial alert to the user, it also may communicate the signal to the first mobile communication device 114. The first mobile communication device 114 may recognize that the signal is not in its own database and communicate an alert based upon the probability a new electromagnetic signal is a police monitoring unit or other safety risk, or the first mobile communication device 114 may provide a default alert until additional data is received and analyzed. The first mobile communication device 114 may send a different alert level than the first radar detector 102 determined, because the first mobile communication device 114 may utilize more aggregated data and/or a more thorough analysis algorithm 122 than the first radar detector 102, which may lead to differences in threat probability determinations.

In addition, while the first radar detector 102 is providing an initial alert to the user, it also may communicate the signal to the first mobile communication device 114, which may communicate the signal to the server 118 for further analysis by analysis algorithm 122. The analysis algorithm 122 may recognize that there is no record relating to or describing the signal in the database 120 and the server 118 may communicate a threat level and/or predicted alert level based upon the probability calculated by analysis algorithm 122 that a new electromagnetic signal is a police monitoring unit or other safety risk, or the server 118 may provide a default alert until additional data is received and analyzed by analysis algorithm 122. The server 118 may send a different threat level and/or predicted alert level than either the first radar detector 102 and/or first mobile communication device 114 determined, because the server 118 may utilize more aggregated data and/or a more thorough analysis algorithm 122 than the first radar detector 102 and/or the first mobile communication device 114, which may lead to differences in probability determinations.

As one skilled in the art will recognize, any combination of the first radar detector 102, the first mobile communication device 114, and the server 118 may analyze the signal using analysis algorithm 122 and determine its own alert level and remain within the scope and spirit of the invention. For example, the first radar detector 102 may conduct an initial analysis and communicate the detection data and initial alert level to the first mobile communication device 114 which communicates the initial alert to the user via its user interface and communicates the detection data to the server 118 without conducting any analysis. The server 118 then executes analysis algorithm 122 to conduct further analysis and communicates an updated threat level and/or predicted alert based upon the analysis to first mobile communication device 114 which communicates the updated alert to the user via its user interface.

Alternatively, the mobile police radar unit 110 may be turned off until the operator turns it on to specifically target a vehicle. This may prevent the first radar detector 102 from receiving the electromagnetic signal until the operator of the mobile police radar unit 110 targets a car in the vicinity. However, once the first radar detector 102 receives the signal and uploads it to server 118 via the first mobile communication device 114, the server 118 may provide an update based upon an analysis in server 118 to a memory component of the second mobile communication device 114 such that as the second radar detector 104 approaches the location of this threat, the second mobile communication device 114 provides an alert prior to the second radar detector 104 receiving the electromagnetic signal from the mobile police radar unit 110.

The server 118 communicates the threat probabilities and/or predictions calculated by analysis algorithm 122 based on specific geographic locations to each of the radar detectors 102-104 based on the corresponding geographic locations associated with each of the radar detectors 102-104. As one skilled in the art will recognize, geographic locations associated with the first radar detector 102 may include the geographic area in which the first radar detector 102 is currently located, geographic areas which the first radar detector 102 is approaching or likely to approach, geographic areas designated by the user of the first radar detector 102, and/or suggested by a mapping or navigation component or device. One skilled in the art will also recognize that the size, shape, scope, calculation, and/or any defining parameters of an associated geographic area may vary and remain within the scope and spirit of the present invention. Each of the radar detectors 102-104 periodically receives or downloads a subset of these threat probabilities and/or predicted alert levels calculated by analysis algorithm 122 from the server 118 via the mobile communication devices 114-116 that correspond to the current geographic locations associated with each of the radar detectors 102-104, including for example road segments currently traveled and road segments likely to be traveled in the future, and/or the particular time of day, day of week, or month of year. Each of the radar detectors 102-104 uses its location determining unit and corresponding timestamp data to provide real-time threat levels and/or predicted alert levels specific for the corresponding motor vehicles 106-108 using the radar detectors 102-104, on that day, at that time, at that geographic location, on that heading, at that speed and acceleration, under those weather and traffic conditions.

In an embodiment, the radar detectors 102-104 and/or the mobile communication devices 114-116 may be operably associated with a navigation component or device. In such an embodiment, the geographic location associated with the radar detectors 102-104 and/or the mobile communication devices 114-116 may include the route suggested by the navigation component or device. The analysis algorithm 122 may calculate threat levels and/or predicted alert levels based upon data associated with the roadway that the first radar detector 102 is currently located on and any roadways likely to be traveled, and may consider the speed, conditions, direction of travel, history of driving, and/or any other factors associated with travel on the road segments. The first radar detector 102 and/or the first mobile communication device 114 may prompt the navigation component or device to suggest alternate routes if an alert probability threshold is surpassed. Alternatively, the radar detector user may respond to threat levels and/or predicted alert levels associated with a primary route suggested by the navigation application by requesting the navigation application to suggest an alternative route.

One skilled in the art will recognize that the location determining unit may operate based on a relative location based system, a latitude/longitude system, another coordinate system, a map segment based system, a cellular or WiFi triangulation system, an accelerometer and compass system or any other system for identifying a location and/or any combination of location systems. In one embodiment, the radar detectors 102-104 and/or the mobile communication devices 114-116 use a Global Positioning System (GPS) receiver as the location determining unit. In another embodiment, the radar detectors 102-104 and/or the mobile communication devices 114-116 use a device determining the current map segment position as the location determining unit. One skilled in the art will recognize that the location determining unit may be part of the mobile communication devices 114-116, the radar detectors 102-104, and/or any component or device in operable association with the mobile communication devices 114-116 and/or the radar detectors 102-104.

For example, the server 118 may provide the threat levels and/or predicted alert levels predicted by analysis algorithm 122 for the mobile police radar unit 110 to the radar detector and/or mobile communication device within second motor vehicle 108 because the geographic locations for the second motor vehicle 108 indicate that the second motor vehicle 108 is currently approaching or may approach the mobile police radar unit 110. In another example, the server 118 no longer provides the threat levels and/or predicted alert levels for the fixed police radar unit 112 to the first motor vehicle 106 because the geographic locations for the first motor vehicle 106 indicate that first motor vehicle 106 has already passed and is currently moving away from the fixed police radar unit 112. In another example, mobile communication devices 114-116 may retrieve data from server 118 based on each of their current locations. Such data will generally be limited to data relevant to a particular geographic area or a road segment on which the particular mobile communication device is currently operating, or other user-defined grouping of data to prevent the unnecessary transfer of irrelevant data.

The server 118 may also communicate the threat levels and/or predicted alert levels based on geographic locations specific to a particular mobile communication device that is not directly communicating with any radar detector, based on a corresponding geographic location for the particular mobile communication device. In some embodiments, the particular mobile communication device must subscribe to a threat level and/or predicted alert level service. Although the particular mobile communication device may not directly communicate with any radar detector, the particular mobile communication device user may act as an additional data supplier by submitting a confirmation of law enforcement speed monitoring activity associated with the geographic location of the particular mobile communication device. As one skilled in the art will recognize, the particular mobile communication device may be any device that can be operably associated with the server 118, including a mobile phone, a cellular phone, a smart phone, a satellite phone, a navigation system, a personal digital assistant, a portable computer, a laptop computer, a tablet computer, and/or any other device with wireless connectivity.

Each of the radar detectors 102-104 and/or the mobile communication devices 114-116 may communicate an alert level to a corresponding user based on threat levels and/or predicted alert levels that correspond to the geographic locations of the radar detectors 102-104 and/or the mobile communication devices 114-116. The alert level resulting from the threat level and/or predicted alert level may be communicated to the user through a display, a mechanical response, and/or an audible or voice alert via the radar detector and/or the mobile communication device. For example, the second radar detector 104 flashes red and beeps rapidly while the second mobile communication device 116 displays a 95% alert level on a navigation map and provides a voice alert that identifies a 95% alert level when the second vehicle 108 approaches the fixed police radar unit 112. This will allow, in turn, motor vehicle operators to become more cognizant of traffic conditions by being warned in advance to adhere to the posted speed limits, to avoid collisions with or the obstruction of emergency vehicles and to avoid possible hazards such as accidents, weather and other road hazards. One skilled in the art will recognize that radar detectors 102-104 and/or the mobile communication devices 114-116 may communicate an alert level to another device which may provide an alert to the user of said other device. The other device may be a navigation device, a vehicle component, a mobile display device, a mobile audio device, and/or any device that can communicate with radar detectors 102-104 and/or the mobile communication devices 114-116, but may not be capable of communicating with server 118.

As one skilled in the art will recognize, the alert may be a color change on the second radar detector 104, such as a series of light-emitting diodes, and/or the information may be conveyed by the second mobile communication device's interface, such as a liquid crystal display, a projected image, and/or any display known or yet to be discovered, which may be utilized by the second radar detector 104 and/or the second mobile communication device 116, and will remain within the scope and spirit of the invention. As one skilled in the art will recognize, a mechanical response may be a vibration, a change to the vehicle's operation (such as automatically decelerating the vehicle as a safety risk approaches), and/or any other mechanical response known or yet to be discovered and will remain within the scope and spirit of the invention. As one skilled in the art will recognize, the audible alert may be a beep, buzz, voice response, and/or any other audible alert known or yet to be discovered and will remain within the scope and spirit of the invention.

The radar detectors 102-104 and/or the mobile communication devices 114-116 include data storage components such as a buffer or other form of memory and data processing components. In one embodiment, these components may contain a selected data set and be capable of processing all or portions of the analysis algorithm 122 within the radar detectors 102-104 and/or the mobile communication devices 114-116 for the data set in memory. For example, the first radar detector 102 may contain a data set in memory relating to the surrounding geographic area that includes threat levels and/or predicted alert levels within that geographic area. As the first radar detector 102 is in use it collects additional data relevant to the same geographic area and aggregates the collected data with the stored data, and executes the analysis algorithm 122 to calculate updated threat probabilities and threat levels based upon the aggregated data. This embodiment allows continued updating in a given area without connection to the server 118 permitting continued analysis without taking up the second communication network's bandwidth and/or analysis when connection to the server 118 is not available.

In another example, the first mobile communication device 114 may contain an even larger data set in memory relating to the surrounding geographic area that includes threat levels and/or predicted alert levels within that geographic area. As the first radar detector 102 is in use it collects additional data relevant to the same geographic area and communicates the additional data to the first mobile communication device 114 via the first communication standard. The first mobile communication device 114 aggregates the collected data with the stored data, and executes the analysis algorithm 122 to calculate updated threat probabilities and alert levels based upon the aggregated data. This embodiment also allows continued updating in a given area without connection to the server 118 permitting continued analysis without taking up the second communication network's bandwidth and/or analysis when connection to the server 118 is not available. Alternatively, a user of the system may elect to delay data updates until a certain time of day when, for example, data transfer rates may be improved. For another example, the user may elect to delay data updates until such time as they are able to use a Wi-Fi connection instead of the mobile communication device's data plan. Furthermore, it should be noted that any data retrieved will generally be stored in the mobile communication device's non-volatile memory so that all data is retained, even if the device is turned off or the mobile communication application is terminated.

Communication with the server 118 may be based upon a schedule to upload collected data to the server 118 and a schedule to download any updated data from the server 118. For example, if the server 118 predicts a change in alert levels in the geographic area to occur around 4:30 p.m., the server 118 may initiate a download of updated alert levels to the first mobile communication device 114 at 4:15 p.m., or if the device is powered off, the next time it is powered on. In addition, communication with the server 118 may be triggered by specified events. For example, as the first radar detector 102 approaches the geographic boundary of data within the currently stored data set, the first radar detector 102 may initiate communication with the server 118 via the first mobile communication device 114 in order to download an updated data set based upon the current geographic location of the first radar detector 102 and the direction of travel. As one skilled in the art will recognize, the extent and scope of the data set stored in memory of the radar detectors 102-104 and/or the mobile communication devices 114-116, and the extent of analysis conducted within the data processor of the radar detectors 102-104 and/or the mobile communication devices 114-116 may vary and remain within the scope and spirit of the present invention.

As one skilled in the art will recognize, the system and method may be effectuated with a specialized hardware device running specialized software, may be effectuated with a software application that can be loaded and executed in existing hardware, or any combination of hardware and software components and remain within the scope and spirit of the invention. For example, in an embodiment a software application is provided for a user to load onto mobile communication device 114. The software application can execute to communicate data to and from radar detector 102, communicate information regarding predicted alerts and other information via the user interface, receive user inputs via the user interface, analyze stored and received detection data, determine the time and location detection data is received, and communicate data to and from server 118 via the second communication standard. In another embodiment, a set of software applications is provided for a user to install on the user's existing radar detector 104 and mobile communication device 116 to facilitate the system and method of operation described.

FIG. 2 depicts one embodiment of a map illustration with overlaid alert levels which may be displayed on an interface associated with any of the mobile communication devices 102-104 or other devices. For example, the display may be shown on a mobile phone, a portable computer, and/or an electromagnetic signal detector having a display.

A key 200 shows the overlay styles and associates a meaning, such as the alert level, with each style of overlay. As one having skill in the art will recognize, any meaning may be associated with a given overlay style and remain within the scope and spirit of the invention. In the depicted embodiment, there are four overlay styles: an overlay design 202 associated with a high alert level, an overlay design 204 associated with a medium alert level, an overlay design 206 associated with a low alert level, and an overlay design 208 associated with a not applicable alert level due to a lack of data. As one skilled in the art will recognize, any number of overlays may be employed and remain within the scope and spirit of the invention. In addition, any overlay design may be used, including color overlays, line designs (such as those pictured), animations, degrees of opacity, other designs and/or any combination of colors and designs.

A map 210 depicts a street layout with portions overlaid with alert levels associated with the key 200. For example, overlay segment 212 has the overlay design 204 indicating that the road section covered by overlay segment 212 has a medium alert level, overlay segments 214 and 220 have the overlay design 206 indicating that the road sections covered by overlay segments 214 and 220 have a low alert level, and the overlay segments 216 and 218 have the overlay design 202 indicating that the road sections covered by overlay segments 216 and 218 have a high alert level. In addition, the portions of the map 210 not overlaid with overlay designs 202-206 are overlaid with overlay design 208 indicating that an alert level is not applicable due to a lack of data in areas covered by the overlay design 208. Overlay segments may be associated with specific road segments, such as those depicted by the overlay segments 212-216, or may be based upon an area evaluation, such as the rectangular overlay segment 218 and radial overlay segment 220 depicted in this embodiment. As one skilled in the art will recognize, overlay segments may correlate to individual road segments, grid sections of a map, geographic areas, shapes, and/or any design related to the map or the geographic area the map represents, and remain within the scope and spirit of the invention.

As one skilled in the art will recognize, the various overlay segments 212-220 may change which overlay design is displayed as a mobile communication device downloads an update from the server 118. For example, the analysis algorithm 122 may predict that a road section covered by a portion of the overlay segment 214 should be associated with a high alert level based upon data collected by the first radar detector 102. Accordingly, once the first mobile communication device 114 (or radar detector in other embodiments) downloads the update, the relevant portion of the overlay segment 214 will depict the overlay design 202 indicating the high alert level, while the remainder of the overlay segment 214 will maintain the overlay design 206 indicating a low alert level. For an additional example, individual road segments may change color on the map 210 to indicate reevaluated predicted alert levels.

Figure 3:
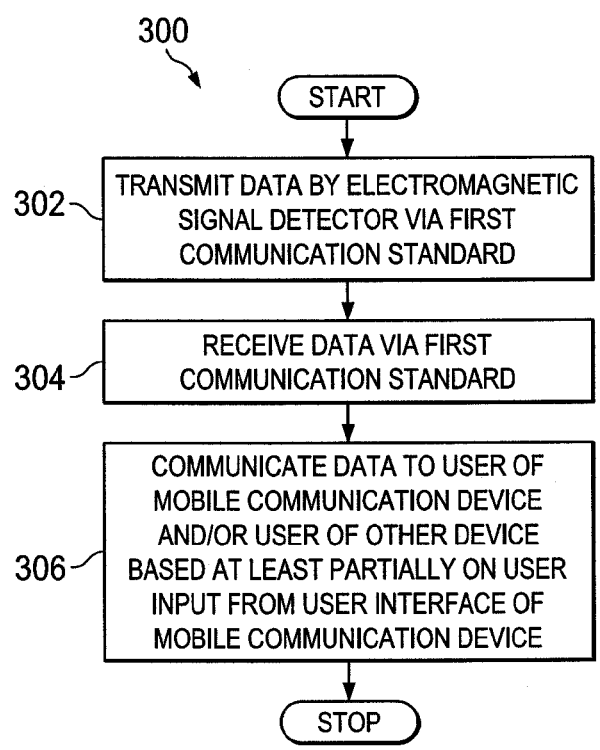
FIG. 3 is a flowchart depicting an embodiment of a process of the present disclosure.

FIG. 3 is a flowchart depicting an embodiment of process 300. The process 300 may be a method executed by the system 100 and/or a computer program product to provide predictions based on data analyzed from the radar detectors 102-104.

In box 302, data is transmitted via a first communication standard. For example, the first radar detector 102 communicates data that indicates detection of the fixed police radar unit 112 to the first mobile communication device 114 by the Bluetooth standard.

In box 304, data is received via a first communication standard. For example, the first mobile communication device 114 receives the data that indicates detection of the fixed police radar unit 112.

In box 306, data is communicated to a user of a mobile communication device and/or a user of another device based at least partially on user input from a user interface of the mobile communication device. For example, the user interface of the mobile communication device 114 communicates the data that indicates detection of the fixed police radar unit 112 to the user of the mobile communication device 114. As one skilled in the art will recognize, the data may also include information received from other radar detectors associated with the system 100 which have passed through and/or any other data sources which are associated with or entered into the system 100.

Figure 4:
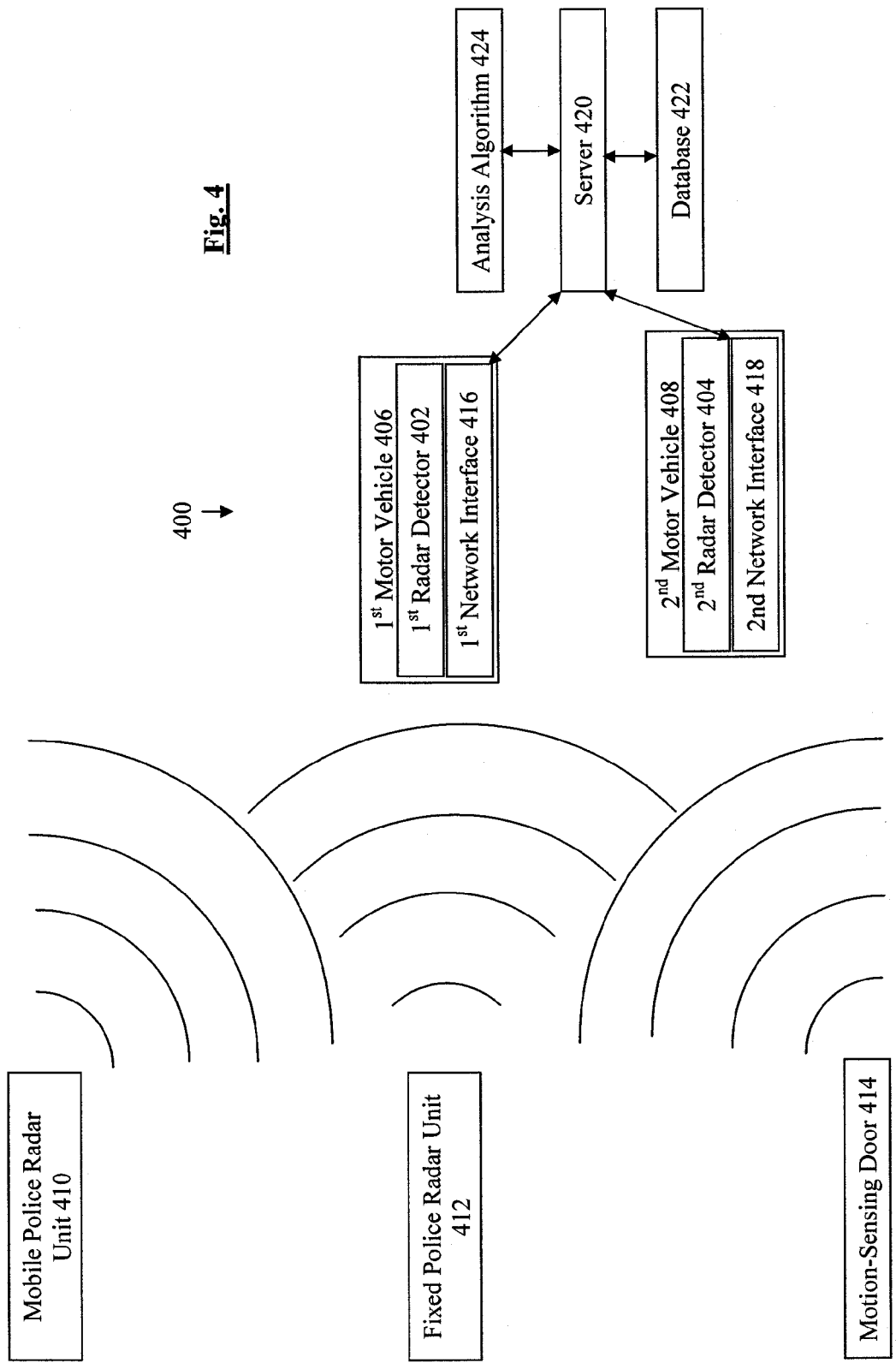
FIG. 4 is a block diagram depicting another embodiment of a system of the present disclosure.

With reference to FIG. 4, a block diagram depicts the system 400 according to an embodiment of the present invention. The depicted system 400 includes a first radar detector 402 and a second radar detector 404. The first radar detector 402 is used by a first motor vehicle 406 and the second radar detector 404 is used by a second motor vehicle 408. Electromagnetic signal devices depicted in FIG. 4 include a mobile police radar unit 410, such as a police motorcycle equipped with a radar gun, a fixed police radar unit 412, such as a traffic light camera or fixed speed camera, and a motion-sensing door 414, such as an automatic front door for a restaurant that is situated towards the road on which the motor vehicles 406-408 are traveling. The radar detectors 402-404 may detect electromagnetic waves emitted from devices 410-414.

The system 400 may also include a first network interface 416, a second network interface 418, a server 420, a database 422, and an analysis algorithm 424. The network interfaces 416-418 may enable the radar detectors 402-404 to communicate via a communication network, such as a cellular telephone network, a satellite network, a Wi-Fi, another wireless network, and/or the Internet. The network interfaces 416-418 may be incorporated into a single device with radar detectors 402-404 or may be otherwise associated with radar detectors 402-404 through wired or wireless communication. As one skilled in the art will recognize, the system may operate on one or more public networks, private networks or combinations of public and private networks. As one skilled in the art will recognize, the system 400 may include any number of radar detectors 402-404, motor vehicles 406-408, electromagnetic emitting devices 410-414, network interfaces 416-418, servers 420, databases 422, and analysis algorithms 424 and should not be limited to the illustrative example provided in FIG. 4.

The first radar detector 402 accesses the first network interface 416 that promotes communication of data to and from the server 420. Similarly, the second radar detector 404 accesses the second network interface 418 that promotes communication of data to and from the server 420. Each of the radar detectors 402-404 and the server 420 has the ability to initiate the process of sending or receiving data. The data may relate to location, speed, and/or acceleration of the motor vehicles 406-408, law enforcement activity, detectable electromagnetic waves, traffic patterns and/or conditions, safety alerts, evacuation notices, and/or any other hazards or alerts, identified and flagged at the discretion of the server 420 and/or the users of the radar detectors 402-404. The data may also include driving patterns of vehicles 406-408 and/or specific driving patterns of individuals including patterns relating to the driver's typical reaction to specific alerts under specific circumstances. This allows server 420 to utilize database 422 to customize the alert levels it uploads for each user in order to adjust the alert levels to correlate to the advanced warning desired by the driver.

For example, the first radar detector 402 detects the fixed police radar unit 412 and the motion sensing door 414 and communicates data representing these detections to the server 420. In another example, the second radar detector 404 also detects the fixed police radar unit 412 and the motion sensing door 414 and communicates data representing these detections to the server 420. As one skilled in the art will recognize, radar detectors 402-404 and server 420 may communicate data in real-time or may communicate data based upon a schedule, a triggering event (such as reaching a data quantity threshold or a data storage size threshold), and/or a combination of a schedule and triggering event and remain within the scope and spirit of the invention. For example, radar detector 402 detects the fixed police radar unit 412 and the motion sensing door 414 and stores data representing these detections in internal memory, such as a buffer. Once a threshold quantity of data is surpassed in the buffer, radar detector 402 communicates data representing these detections to the server 420. For another example, radar detector 404 may not receive any detection while traveling other roadways and stores data representing the absence of detections along the traveled path. At scheduled times radar detector 404 may communicate data representing the absence of detections to the server 420.

Upon receipt of such data, the server 420 stores the data into physical or electronic memory in the database 422, which may be part of the server 420 or separate from the server 420. The server administrators may also add other data to the database 422 (pertaining to law enforcement, safety, hazards, public notices, local knowledge, or driving in general) that are not measurable in the electromagnetic and laser spectrums of the radar detectors 402-404. This additional data may be updated periodically by the server 420, automatically or through manual data entry. The analyzed data includes the data from the radar detectors 402-404, other data added by administrators as indicated above, and data from other data suppliers, such as local knowledge and observed conditions.

The server 420 executes analysis algorithms 424 that periodically collect, sort, organize, and analyze the data. In a preferred embodiment, the data is associated with database 422, but as one skilled in the art will recognize, analysis algorithms 424 may incorporate or otherwise analyze data from sources other than database 422 and remain within the scope and spirit of the invention. These analysis algorithms 424 may include statistical or predictive calculations relating to the likelihood of future threats, hazards, alerts, law enforcement speed monitoring activity, or traffic conditions. The storage capacity and processing capacity of the radar devices 402-404 may be significantly less than the storage capacity and the processing capacity of the database 422 and the server 420. As a result, the database 422 and the server 420 may provide the capability to execute complex analysis algorithms 424 using significant quantities of aggregated data, including data that is not readily available to the radar detectors 402-404. The output of each analysis algorithm 424 may be a calculated predictive threat level value or series of values that attempts to approximate and quantify the statistical likelihood of there being law enforcement monitoring activity and/or other safety risks in the geographic locations ahead of or in the immediate vicinity of the motor vehicles 406-408. In some embodiments, the analysis algorithm may tailor the resulting threat level value or values to an individual radar detector and/or driver based in part upon any considerations entered by the user and/or the user's stored driving patterns. The analysis algorithm may also consider the current day, time, geographic location, heading, speed and acceleration of motor vehicles 406-408 to tailor a predicted alert value.

The "crowd-sourcing" method of data aggregation is based on analyzing data aggregated from multiple data sources, such as the radar detectors 402-404. The "crowd-sourcing" method of data aggregation may produce more accurate results than analysis based on a single source of data, such as data from one of the radar detectors 402-404.

For example, the analysis algorithm 424 analyzes data that represents detection of electromagnetic signals from the fixed police radar unit 412 by the radar detectors 402-404 and calculates a very high threat level, such as a 95% certainty, that the fixed police radar unit 412 is a law enforcement speed monitoring device. This prediction may be based on a single factor or a combination of factors. For this example, the same pattern of the electromagnetic waves repeatedly detected from the fixed police radar unit 412 by the radar detectors 402-404 on a frequent basis may be highly indicative of a law enforcement speed monitoring device. Additionally, the data may indicate that the source of these electromagnetic waves never moves and never ceases to emit electromagnetic waves because there is no data indicating an absence of detections from this location. The regularity indicated by this data combined with geographic data that approximates the source of these electromagnetic waves at a busy traffic intersection may enable the analysis algorithm 424 to predict that the fixed police radar unit 412 is a speed-detecting traffic camera fixed at the intersection. An additional factor used to calculate a threat level may be a confirmation of law enforcement speed monitoring activity input by a radar detector user. The analysis algorithm 424 may modify the high probability of 95% certainty to 100% certainty if a specified number of radar detector users submit such confirmations.

In another example, the analysis algorithm 424 analyzes data that represents detection of electromagnetic signals from the motion-sensing door 414 by the radar detectors 402-404 and calculates a very low threat level, such as a 5% certainty, that the motion-sensing door 414 is a law enforcement device or other safety risk. This prediction may be based on a single factor or a combination of factors. For this example, the same pattern of the electromagnetic waves repeatedly detected from the motion-sensing door 414 by the radar detectors 402-404 on a frequent basis may not be highly indicative of a law enforcement device or other safety risk. Additionally, the data may indicate that although the source of these electromagnetic waves never moves, the emission of the electromagnetic waves and the absence of detections of the electromagnetic waves coincides with normal business hours for a restaurant. The regularity indicated by this data combined with geographic data that approximates the source of these electromagnetic waves at a restaurant may enable the analysis algorithm to predict that the motion-sensing door 414 is not a law enforcement device or other safety risk. Although a calculation of a threat level may be based on a motion-sensing door 414 and these exemplary factors, predictions may be based on other types of electromagnetic wave devices and other factors. As one skilled in the art will recognize, a prediction may consider signal analysis including the signal band analysis, signal frequency analysis, signal strength or intensity measurements, and/or any other signal analysis. For example, the received signal band may be compared to known signal regulations imposed by the FCC or other regulatory or licensing body. For instance, if the signal is in the X or K bands it may be a motion-sensing door, however, if the signal is in the Ka band it is unlikely to be a motion-sensing door. For another example, the received signal band may be compared to previously identified signal bands stored in database 422. For instance, database 422 may have stored information associated with one geographic location regarding an X band signal that has a high probability of representing law enforcement activity and a Ka band signal that has a low probability of representing law enforcement activity. If a received signal is in the Ka band, the previously identified Ka band signals in the geographic location may factor in analysis algorithm 424 calculating a low probability of the received Ka band signal representing law enforcement activity. A known Ka band microwave communication tower is an example of a non-law enforcement source that may be factored into analysis algorithm 424.

A third radar detector (not depicted in FIG. 4) may derive the benefits from the system 400 based on detections made by the first radar detector 402 and the second radar detector 404 even when the third radar detector approaches the fixed police radar unit 412 for the very first time. The third radar detector may provide an alert for the fixed police radar unit 412 without having previously observed and recorded any band emissions from that geographic location. The alert provided by the third radar detector may be based upon periodically received data from server 420 pertaining to predicted probabilities and/or threat levels for potential threats in the local area. Therefore, the system 400 may provide benefits to radar detector users who have never traveled on a specific road segment before based on data from the multiple radar detectors 402-404 that have previously traveled on the specific road segment. Similarly, devices other than radar detectors which are capable of receiving predicted alert levels and/or threat levels in the local area from server 420 may also provide alerts based on data from the multiple radar detectors 402-404.

When signals are detected, an alert level may be based upon the predicted probability, or threat level, that the detected signals represent a law enforcement monitoring device or other safety risk. When signals are not detected, an alert level may be based upon the predicted probability, or threat level, that a law enforcement monitoring device or other safety risk is within a vicinity determined by radar detector 402, server 420, and/or defined by a user. The alert level may be defined in any number of levels whereby each alert level is correlated to a range of probabilities. For example, if there are two alert levels, a 0-50% probability may represent no threat or a weak or irrelevant received signal or an ignore level while a 51-100% probability may represent a high threat level, and/or strong and/or highly relevant received signal. For another example, four alert levels may be defined by probability ranges 0-40% (no threat or an ignore level), 41-65% (minor threat), 66-85% (mid-level threat), and 86-100% (high threat). For another example, five alert levels may be defined based upon ranges along a probability scale from −50 to 50, whereby probability ranges of −50 through −30 represent a no threat or an ignore level, probability ranges of −29 through −1 represent a minor threat, probability ranges of 1 through 30 represent a mid-level threat, probability ranges of 31 through 50 represent a high threat, and a probability of zero indicates no stored data for analysis.

The server 420 may calculate a multitude of probabilities and/or associated threat levels based on specific subsets of the data. The alert levels may also be based on data associated with specific geographic location boundaries. This process may create threat levels specific to grid regions bounded by latitude and longitude, or specific to "road segments" where detailed map data is available. In addition, the server 420 may associate a weighted factor to various data to represent the strength and/or reliability of the data.

Threat levels and/or the probabilities may be stored in physical or electronic memory on the server 420 and/or the database 422. For example, the server 420 may store the 95% probability for the fixed police radar unit 412 and the 5% probability for the motion-sensing door 414 in the database 422 associated with the geographic location for the road segment currently traveled by the motor vehicles 406-408. The radar detector user may respond differently to predicted probabilities, such as 95%, 50%, and 5%. For example, the user of radar detector 402 may program radar detector 402 to provide a minor alert level if there is a 50% predicted probability or threat level, while the user of radar detector 404 may program radar detector 404 to provide a no alert or an ignore level if there is a 50% predicted probability, or threat level.

The density of data stored for any geographic location may vary by region. Database algorithms may automatically balance the data density for specific regions based on population density, data density, or other factors in each region. The server 420 may adjust how frequently the analysis algorithms 424 are executed, and evaluate how an ever-enlarging set of data impacts the efficiency of the analysis algorithms 424.

The server 420 may instruct radar detectors 402-404 to occasionally override, mute, or alter any audible alerts that the server 420 identifies as highly likely to be false alerts, thereby suppressing false alerts in real-time or near-real time as needed. For example, the server 420 may instruct radar detectors 402-404 to provide the 95% threat level and/or a high alert to the motor vehicles 406-408 traveling on the road segment associated with the fixed police radar unit 412, but suppress the 5% threat level and/or an ignore for the motion-sensing door 414 located nearby the same road segment. In addition, radar detectors 402-404 may provide an anticipatory alert based upon a high threat level in the anticipated travel segment. For example, radar detector 402 may provide an anticipatory alert prior to receiving a radar signal from fixed police radar unit 412 when motor vehicle 406 is traveling towards fixed police radar unit 412 with a determined 95% threat level. In addition, radar detector 402 may increase the given alert once a signal is received from fixed police radar unit 412.

The threat levels and/or probability that the analysis algorithm 424 may predict and that the server 420 may communicate to the radar detectors 402-404 are supplementary to the normal operation of the radar detectors 402-404. For example, the mobile police radar unit 410 may arrive on a police motorcycle at a geographic location where electromagnetic waves have never been detected by the radar detectors 402-404 previously. However, the first radar detector 402 may still detect the mobile police radar unit 410 and provide an alert level and/or detection alert level to the operator of the first motor vehicle 406 even before the first network interface 416 communicates data representing this detection to the server 420. Radar detector 402 also may or may not check its internal database for a probability or threat level before communicating an alert to the user. For example, the first radar detector 402 may determine that the detected signal is not stored in the internal memory of radar detector 402 and communicate an alert to the user based upon the internal analysis and settings of radar detector 402 for new or unrecognized signals. In one embodiment, a default setting of radar detector 402 would treat new or unrecognized signals as a threat and provide a default alert or a detection alert unless an internal analysis indicated that the signal is likely a false positive. In addition, while the radar detector 402 is providing an initial alert to the user, it also may communicate the signal to server 420 for further analysis. Server 420 may recognize that the signal is not in the database and communicate an anticipatory alert based upon the probability that the new electromagnetic wave is a police monitoring unit or other safety risk, or the server 420 may provide a default threat level until additional data is received and analyzed. Server 420 may send a different threat level than radar detector 402 determined, because server 420 may utilize more aggregated data and/or a more thorough analysis algorithm 424 than radar detector 402, which may lead to differences in probability determinations.

Alternatively, mobile police radar unit 410 may be turned off until the operator turns it on to specifically target a vehicle. This may prevent radar detector 402 from receiving the electromagnetic signal until the operator of mobile police radar unit 410 targets a car in the vicinity. However, once radar detector 402 receives the signal and uploads it to server 420, server 420 may provide an update to a memory component of radar detector 404 such that as radar detector 404 approaches the location of this threat, radar detector 404 provides an anticipatory alert prior to receiving the electromagnetic signal from mobile police radar unit 410.

The server 420 communicates the predictions based on specific geographic locations to each of the radar detectors 402-404 based on the corresponding geographic locations associated with each of radar detectors 402-404. As one skilled in the art will recognize, geographic locations associated with radar detector 402 may include the geographic area in which radar detector 402 is currently located, geographic areas which radar detector 402 is approaching or likely to approach, geographic areas designated by the user of radar detector 402, and/or suggested by a mapping or navigation component or device. Each of the radar detectors 402-404 periodically receives or downloads a subset of these predicted alert levels and/or threat levels from the server 420 that correspond to the current geographic locations associated with each of the radar detectors 402-404. Each of radar detectors 402-404 uses its location identifier and corresponding timestamp data to provide real-time predicted alert levels specific for the corresponding motor vehicles 406-408 using the radar detectors 402-404, on that day, at that time, at that geographic location, on that heading, at that speed and acceleration, under those weather and traffic conditions.

In an embodiment, radar detectors 402-404 may be operably associated with a navigation component or device. In such an embodiment, the geographic location associated with radar detectors 402-404 may include the route suggested by the navigation component or device. The analysis algorithm 424 may calculate predicted threat levels based upon data associated with the roadway radar detector 402 is currently located on and any roadways likely to be traveled, and may consider the speed, conditions, direction of travel, history of driving, and/or any other factors associated with travel on the road segments. Radar detector 402 may promote the navigation component or device to suggest alternate routes if an alert probability threshold is surpassed. Alternatively, the radar detector user may respond to threat levels associated with a primary route suggested by the navigation application by requesting the navigation application to suggest an alternative route.

One skilled in the art will recognize that the location identifier may operate based on a relative location based system, a latitude/longitude system, another coordinate system, a map or road segment based system (such as one supplied by Google, Inc., Navteq or similar companies), a cellular or Wi-Fi triangulation system, any other system for identifying a location and/or any combination of location systems. In one embodiment, radar detectors 402-404 use a Global Positioning System (GPS) receiver as the location identifier. In another embodiment, radar detectors 402-404 use a device determining the current map segment position (or proximity to the nearest map segment) as the location identifier. One of skill in the art will recognize that a map segment is a representation of a physical road segment.

For example, the server 420 may provide the threat levels for a geographic area containing the fixed police radar unit 412 and a second geographic area containing the motion-sensing door 414 to the second motor vehicle 408 because the geographic locations for the second motor vehicle 408 indicate that the second motor vehicle 408 is currently approaching or may approach the fixed police radar unit 412 and the motion-sensing door 414. Conversely, the server 420 no longer provides the threat levels for the fixed police radar unit 412 to the first motor vehicle 406 because the geographic locations for the first motor vehicle 406 indicate that first motor vehicle 406 has already passed and is currently moving away from the fixed police radar unit 412.

The server 420 may also communicate the predictions based on specific geographic locations to a mobile communication device, such as a mobile telephone which is not depicted in FIG. 4, based on a corresponding geographic location for the mobile communication device. In some embodiments, the mobile communication device must subscribe to a threat level service. Although the mobile communication device may not have the capacity to detect electromagnetic signals, the mobile communication device user may act as an additional data supplier by submitting a confirmation of law enforcement speed monitoring activity associated with the geographic location of the mobile communication device. In some embodiments, the mobile communication device may act as network interface 416 by transmitting and receiving data with server 420 and radar detector 402. As one skilled in the art will recognize, a mobile communication device may be any device that can be operably associated with server 420, including a mobile phone, a smart phone, a satellite phone, a portable computer, a navigation system with wireless connectivity, an electromagnetic signal detector, a citizens band radio, and/or any other device with wireless connectivity. In addition, a device without wireless connectivity, such as a navigation system or GPS system without wireless connectivity, may employ a static but updatable version of the system by downloading a database of threat levels from server 420 into the device's storage element. The device without wireless connectivity could communicate predicted alerts to the user of such device based on the threat levels stored in the device. The database in the device could be updated periodically by the user by connecting the device to a networked device or an external storage device, such as a portable hard drive, in which the database is stored.

Each of the radar detectors 402-404 communicates an alert level to a corresponding radar detector user based on predictions, or threat levels, that correspond to the geographic locations of the radar detectors 402-404, as well as other predictive data described above. The resulting alert may be communicated to the radar detector user through a display, a mechanical response, and/or an audible or voice alert via the radar detector or another mobile device, such as a mobile telephone. For example, the second radar detector 404 flashes red, beeps rapidly, displays a 95% alert level, and provides a voice alert that identifies a 95% alert level when the second vehicle 408 approaches the fixed police radar unit 412. Each of the radar detectors 402-404 may communicate the initial detection alert level, a predicted alert level or threat level, and/or a combined alert level to a radar detector user. In addition, each of the radar detectors 402-404 may communicate other relevant data, such as local traffic, safety or evacuation notices, For example, the first radar detector 402 may provide a first display showing a medium detection alert, a second display showing a 85% probability threat level, a third display showing a combined 95% alert level, and an audible voice alert providing notice that speed limits in the local area are known to be strictly enforced. As one skilled in the art will recognize, the display may be color change on the radar detector, a series of light-emitting diodes, a liquid crystal display, and/or any other display known or yet to be discovered and will remain within the scope and spirit of the invention. As one skilled in the art will recognize, the mechanical response may be a change to the vehicles operation, such as automatically decelerating the vehicle as a safety risk approaches and/or any other mechanical response known or yet to be discovered and will remain within the scope and spirit of the invention. As one skilled in the art will recognize, the audible alert may be a beep, buzz, voice response, and/or any other audible alert known or yet to be discovered and will remain within the scope and spirit of the invention.

Radar detectors 402-404 include data storage components such as a buffer or other form of memory and data processing components. In one embodiment, these components may contain a selected data set and be capable of processing all or portions of analysis algorithm 424 within radar detectors 402-404 for the data set in memory. For example, radar detector 402 may contain a data set in memory relating to the surrounding geographic area that includes predicted alert levels within that geographic area. As radar detector 402 is in use it collects additional data relevant to the same geographic area and aggregates the collected data with the stored data, and analysis algorithm 424 calculates updated probabilities and threat levels based upon the aggregated data. This embodiment allows continued updating in a given area without connection to server 420 permitting continued analysis without taking up the communication network's bandwidth and/or analysis when connection to server 420 is not available. Communication with server 420 may be based upon a schedule to upload collected data to server 420 and a schedule to download any updated data from server 420. For example, if a server predicts a change in threat levels in the geographic area to occur around 4:30 p.m., it may initiate a download of updated threat levels to radar detector 402 at 4:15 p.m. In addition, communication with server 420 may be triggered by specified events. For example, as radar detector 402 approaches the boundary of data within the currently stored data set, radar detector 402 may initiate communication with server 420 in order to download an updated data set based upon the current location of radar detector 402 and the direction of travel. As one having skill in the art will recognize, the extent and scope of the data set stored in memory of radar detectors 402-404 and the extent of analysis conducted within the data processor of radar detectors 402-404 may vary and remain within the scope and spirit of the present invention.

Figure 5:
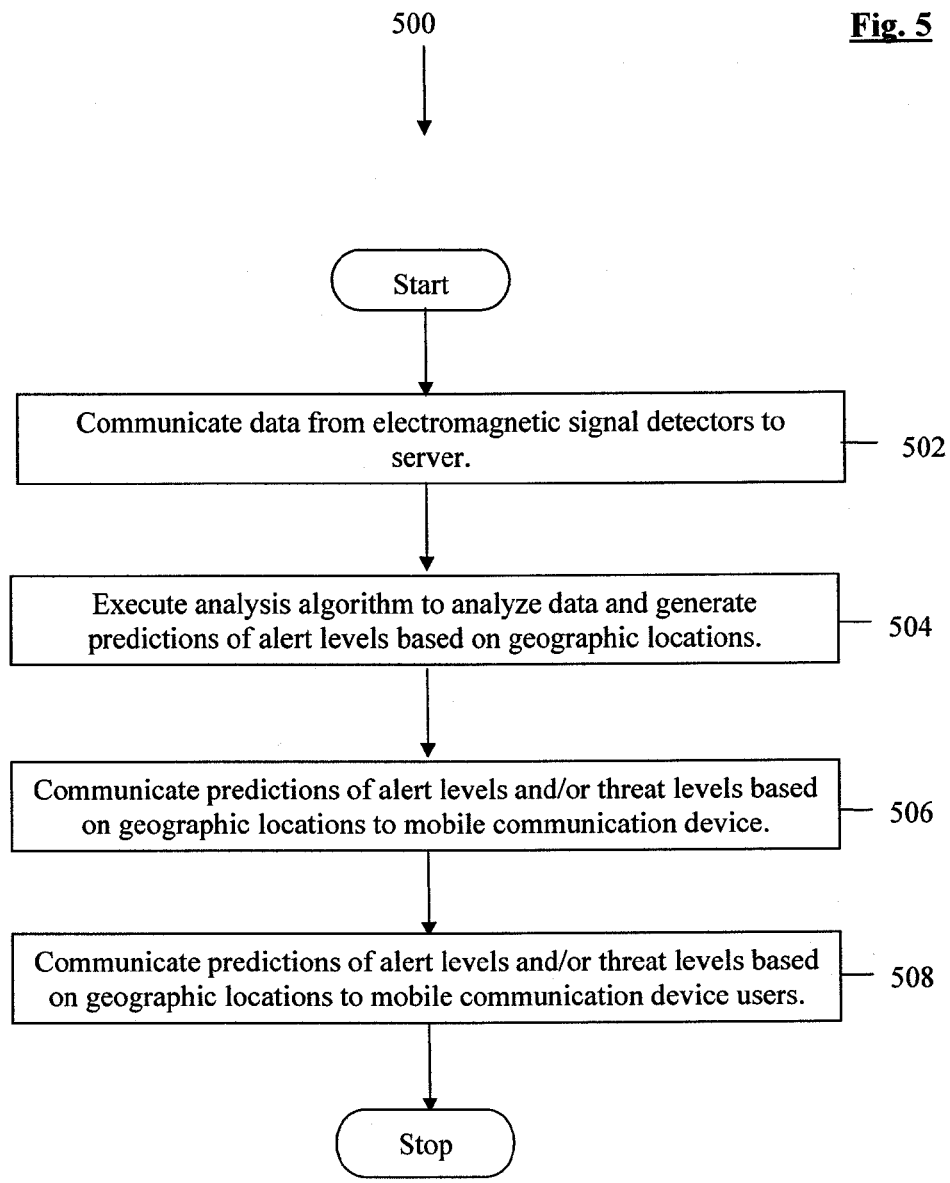
FIG. 5 is a flowchart depicting another embodiment of a process of the present disclosure.

FIG. 5 is a flowchart depicting an embodiment of process 500. The process 500 may be a method executed by the system 400 and/or a computer program product to provide predictions based on data analyzed from networked radar detectors.

In box 502, data is communicated from electromagnetic signal detectors to a server. For example, the first radar detector 402 and the second radar detector 404 communicate data that indicates detection of the fixed police radar unit 412 to the server 420.

In box 504, an analysis algorithm is executed to analyze data and generate predictions of alert levels based on geographic locations. For example, the analysis algorithm predicts a 95% probability, or threat level, that the fixed police radar unit 412 is a law enforcement speed monitoring device based on the aggregated data received from the first radar detector 402 and the second radar detector 404. As one skilled in the art will recognize, the aggregated data may also include information received other radar detectors associated with the system which have passed through the identical segment or segments in close proximity to that segment and/or any other data sources which are associated with or entered into the system. In addition, one skilled in the art will recognize that a plurality of radar detectors is not necessary because a single radar detector may collect data for aggregation over time, thereby supporting the predictive analysis.

In box 506, predictions of alert levels and/or threat levels based on geographic locations are communicated to a mobile communication device. For example, the server 420 communicates the 95% probability and/or a high threat level to the radar detectors 402-404 whenever any of the radar detectors 402-404 approach the geographic location likely to contain fixed police radar unit 412.

In box 508, predictions of alert levels and/or threat levels based on geographic locations are communicated to mobile communication device users. For example, the second radar detector 404 receives the 95% probability, or threat level, and communicates an alert level to the operator of the second motor vehicle 408 whenever the second motor vehicle approaches the geographic location likely to contain fixed police radar unit 412.

The radar detectors 402-404 and/or their mobile communication devices may utilize the "cloud computing" software usage model, where individual client devices can quickly begin using the latest software without the need for a firmware update or hardware revision. Changes made on the database or "cloud" side may be seen in near-real-time for the installed client/user base.

On boot, the radar detectors 402-404 may query the server 420 and/or the database 422 for any updates to the data upload packet protocol, and download any updates as appropriate. This may be a simple software change, a firmware update, and/or any other method for updating. Once the packet protocol is loaded, the radar detectors 402-404 may read data coming from the logging outputs of the radar detectors 402-404 in real time, and may parse that data according to the loaded packet protocol before reformatting the data and uploading the data to the server 420. Based on the volume of data that the server 420 receives from the radar detectors 402-404, the server 420 may adjust the packet protocols and parsing algorithms to get the highest quality of data using the lowest possible bandwidth.

In another embodiment, radar detectors 402-404 have a proximity mode designed for use when multiple radar detectors and/or mobile communication devices are within a certain proximity to one another. Server 420 may monitor the geographic proximity of radar detector 402 to radar detector 404. When server 420 determines that radar detectors 402-404 are within a certain proximity to one another, server 420 may transmit instructions to radar detectors 402-404 to execute in proximity mode. In the proximity mode, radar detectors 402-404 operate with a real-time or near-real-time communication with server 420 which analyzes and transfers updates to each radar detector in the given proximity. For example, when radar detectors 402-404 are within a given proximity and operating in proximity mode, if radar detector 402 detects an electromagnetic signal, radar detector 402 communicates data regarding the detected electromagnetic signal to server 420 in near-real time. Server 420 analyzes the new data from radar detector 402, updates threat levels based upon the new data, and communicates the updated threat levels to radar detector 404 in near-real time. When radar detectors 402-404 separate beyond a certain proximity, both radar detectors exit out of proximity mode (unless one is within proximity to another device). As one skilled in the art will recognize, what constitutes a certain proximity may vary, and the proximity for entering proximity mode and exiting proximity mode may be the same or may differ and remain within the scope and spirit of the invention. Proximity mode's functional distance may vary based on vehicle speed, heading, time of day, volume of data in the database at that location, or any other criteria not listed here, and remain within the scope and spirit of the invention.

Figure 6:
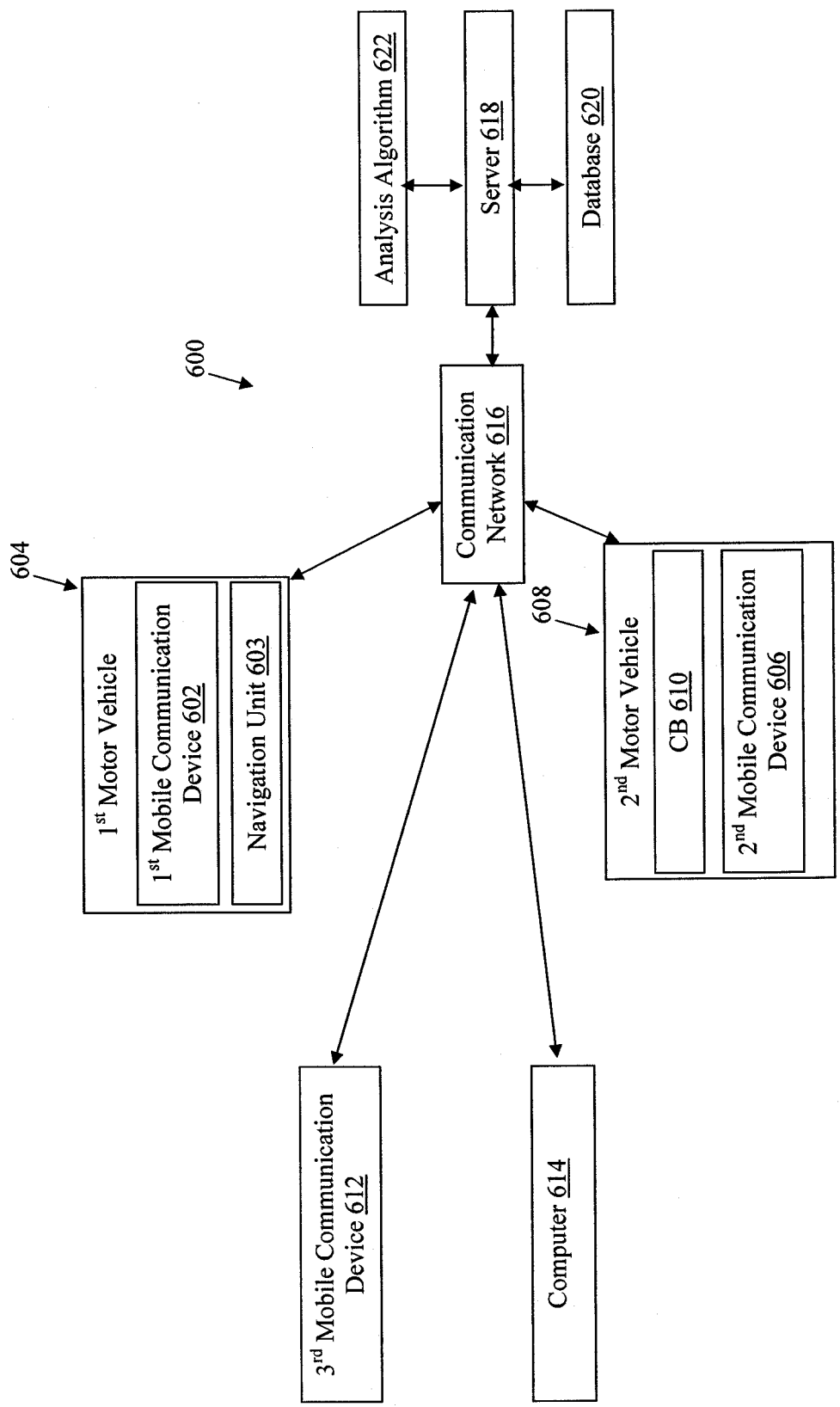
FIG. 6 is a block diagram depicting another embodiment a system of the present disclosure.

FIG. 6 depicts a block diagram of the system 600 according to another embodiment of the disclosure. System 600 facilitates communication for the identification of potential threat levels associated with vehicular travel. The depicted system 600 includes a first mobile communication device 602 associated with a user of the first motor vehicle 604 which also includes a navigation unit 603. The system 600 further includes a second mobile communication device 606 associated with a user of the second motor vehicle 608 which also includes a citizens band radio 610. Also included within system 600 are third mobile communication device 612 and computer 614. The first mobile communication device 602, the second mobile communication device 606, the citizens band radio 610, the third mobile communication device 612, and computer 614 may be collectively referred to as communication devices.

As an example, the first motor vehicle 604 may be a commuter vehicle used by one or more people to travel to and from work. The first mobile communication device 602 may be a smart phone associated with a driver or passenger of the first motor vehicle 604. In some embodiments, a display associated with navigation unit 603 may be used to assist the user of first motor vehicle 604. In some embodiments, both the navigation unit 603 and the first mobile communication device 602 may be equipped with components to interface with communication network 616 and facilitate communications over the communication network 616. In other embodiments, the navigation unit 603 may not directly interface and/or communicate over communication network 616. In some embodiments, the navigation unit 603 may interface with the first mobile communication device 602 using a short-range communication standard, such as Bluetooth®, in order to access communication network 616.

In this embodiment, the second motor vehicle 608 may be a commercial vehicle used for long drives sometimes into unfamiliar areas. In the embodiment shown, the second motor vehicle 608 includes citizens band radio 610 and the second mobile communication device 606, which may be a tablet computer in this example. In some embodiments, both the citizens band radio 610 and the second mobile communication device 606 may be equipped with components to interface with communication network 616 and transmit data and communication over the communication network 616. In other embodiments, the citizens band radio 610 may provide the capability to communicate over the citizens band frequencies, but not directly interface and/or communicate over communication network 616. In some embodiments, the citizens band radio 610 may interface with the second mobile communication device 606 in order to access communication network 616. As an example, citizens band radio 610 may interface with second mobile communication device 606 using a short-range communication standard, such as Bluetooth®, which may act as a conduit to allow the user to utilize the citizens band radio controls to communicate on communication network 616 as described further in U.S. Pat. No. 8,078,120 assigned to Cobra Electronics Corporation which is incorporated herein by reference. Although a citizens band radio is the illustrative embodiment disclosed herein, one skilled in the art will recognize that other radio transceivers may be used in conjunction with and/or instead of the citizens band radio. Such radio transceivers may operate on any frequency and remain within the scope and spirit of the present disclosure, including business band, aviation, VHF, marine bands, and public safety frequencies. The radio transceivers may also operate with the Multi Use Radio Service and/or the General Mobile Radio Service.

The third mobile communication device 612 in this embodiment may be another smart phone used by a bicyclist. The third mobile communication device 612 may be mounted on the front of the bicycle such that the user may view the display while riding. In addition, the third mobile communication device 612 may be in operative communication with speakers and a microphone attached or integrated into the cyclist's gear, such as a helmet, glasses, or other gear. In such an embodiment, the cyclist may be able to operate the third mobile communication device 612 using a voice control system and receive audio and visual feedback from system 600 through the third mobile communication device 612. One skilled in the art will recognize that the third mobile communication device 612 may be operated by other types of users, such as pedestrians, emergency personnel, businesses, the general public and others.

The computer 614 may be a household computer that is utilized to report local knowledge and recent observations, and used to review information regarding an upcoming trip. In some embodiments, computer 614 may be part of a network of computers utilized by system 600 to improve the processing of analysis algorithm 622.

As one skilled in the art will recognize, certain components described herein for illustrative purposes may be utilized in additional or alternative manners. For example, third mobile communication device 612 may be used in a third motor vehicle (not shown), second mobile communication device 606 may be used by a patron at a restaurant to share a good or bad experience across communication network 616, computer 614 may be a laptop computer which is utilized in a motor vehicle to collect and store information received by other components in the vehicle for transmission over the communication network 616 at another time. In some embodiments, the devices may be removable from their environment while others are attached and/or integrated with other components to prevent or increase the difficulty of removal. For example, citizens band radio 610 may be integrated into the dashboard of the second motor vehicle 608 while the second mobile communication device 606 may be designed to easily engage and disengage from a support location in the second mobile communication device 606.

In some embodiments, the system and method may be effectuated with a specialized hardware device running specialized software, may be effectuated with a software application that can be loaded and executed in existing hardware, or any combination of hardware and software components and remain within the scope and spirit of the invention.

System 600 also includes a communication network 616 through which the communication devices may communicate with a server 618. In this embodiment, server 618 is associated with database 620 and analysis algorithm 622. The communication network 616 may comprise one or more public networks, private networks or combinations of public and private networks operating on and/or in conjunction with a cellular telephone network, a satellite network, a Wi-Fi, another wireless network, the Internet, and/or any other communication network. As used herein, communication network 616 may include the protocols, controls, systems, and/or components for facilitating communication among different types of networks.

The communication devices may operate on the same communication network 616 and/or different communication networks 616. For example, the third mobile communication device 612 may operate on a Wi-Fi network at a local book store to access the Internet, first mobile communication device may operate on the cellular network to access the Internet, and computer 614 may connect directly to the Internet. As one skilled in the art will recognize, the system 600 may include any number of communication devices (602, 606, 610, 612, and 614), motor vehicles 604 and 608, communication networks 616, servers 618, databases 620, and analysis algorithms 622 and should not be limited to the illustrative example provided in FIG. 6.

The first mobile communication device 602 accesses the communication network 616 and promotes communication of data to and from the server 618. Similarly, the second mobile communication device 606, citizens band radio 610, third mobile communication device 612, and computer 614 may access the communication network 616 and promote communication of data to and from the server 618. Each of the communication devices and the server 618 has the ability to initiate the process of sending or receiving data. The data may relate to location, speed, and/or acceleration of the motor vehicles 604-608, law enforcement activity, detectable electromagnetic waves, traffic patterns and/or conditions, safety alerts, evacuation notices, and/or any other hazards or alerts, identified and flagged at the discretion of the server 618 and/or the users of the communication devices. Safety alerts may include notifications provided by emergency response teams and vehicles, severe weather warnings, custom alerts, and/or other alerts to facilitate safe driving. For example, a bicyclist may create a custom alert to provide vehicles in the area advance warning of the bicyclist's location in order for the vehicles to change lanes or increase the awareness of their surroundings to avoid the bicyclist. Similarly, a pedestrian may activate an alert that warns users in the area of the pedestrian's location when they are proximate to or on a roadway. In some embodiments, the bicyclist's and pedestrian's respective mobile communication devices may limit or alter the alerts based upon the user's proximity to the roadways. As another example of a safety alert, emergency response vehicles may provide an indication of their location and/or route to the system 600 when operating under emergency conditions in order to alert other users of system 600.

The data may also include driving patterns of vehicles 604-608 and/or specific driving patterns of individuals including patterns relating to the driver's typical reaction to specific alerts under specific circumstances. For example, the data may include records of time between the first mobile communication device 602 providing an alert to the user of first motor vehicle 604 and a change in a driving characteristic such as acceleration or a change in lanes or direction, and the reaction data may be subsequently used to indicate the extent of advanced warning that a user needs to adjust their driving in given circumstances. This allows server 618 to utilize database 620 to customize the alert levels it uploads for each user in order to adjust the alert levels to correlate to the advanced warning desired by the driver.

As discussed with earlier embodiments, communication of data with the server 618 may be in real-time or based upon a schedule, a triggering event (such as reaching a data quantity threshold or a data storage size threshold), and/or a combination of a schedule and triggering event and remain within the scope and spirit of the invention. In addition, each of the communication devices may operate under different communication patterns. For example, the first mobile communication device 602 may conduct real time communication with server 618, computer 614 may communicate only on instruction from the user of computer 614, and third mobile communication device 612 may communicate data based on a triggering event—i.e. entering a Wi-Fi operation mode.

Upon receipt of such data, the server 618 may store the data into physical or electronic memory in the database 620, which may be part of the server 618 or separate from the server 618. The server administrators and/or other users may also add and/or cause the addition of other data to the database 620 (pertaining to law enforcement, safety, hazards, public notices, local knowledge, or driving in general). For example, a user of computer 614 may add data based upon their local knowledge and observed conditions such as locations of frequent wrecks, a new social hotspot, and/or an upcoming event, such as a parade. As another example, the system administrator may schedule periodic updates of information from other databases than database 620, such as a traffic analysis database, a social media database, map databases, emergency responder databases, weather databases (such as the National Oceanic and Atmospheric Association ("NOAA") database for weather warnings), work-zone databases, law enforcement equipment use in a geographic location (such as a database identifying types of radar and laser guns in use for a given county), and other databases which may benefit system 600. This additional data may be updated periodically by the server 618, automatically or through manual data entry. The analyzed data may include data from radar detectors, the communication devices, databases, administrators, and other data suppliers.

In this embodiment, the server 618 executes analysis algorithms 622 that periodically collect, sort, organize, and analyze the data. As discussed above with respect to other embodiments, analysis algorithms 622 may utilize data in database 620 and/or incorporate or otherwise analyze data from sources other than database 620. These analysis algorithms 622 may include statistical or predictive calculations relating to the likelihood of future threats, hazards, alerts, law enforcement speed monitoring activity, traffic conditions, communication content, relevance to the community, and/or other considerations. For example, the analysis algorithm 622 may receive data from second mobile communication device 606 indicating the receipt of a K-band signal and a geographic location. Based upon the geographic location, the analysis algorithm 622 may indicate a low level alert or ignore the alert based on a determination that the law enforcement equipment used in the area does not employ K-band signals.

As discussed above with respect to other embodiments, the storage capacity and processing capacity of the associated devices may vary and impact the extent of information stored on a device and processing capability of the device. One skilled in the art will recognize that although the analysis algorithm 622 is discussed with respect to the server 618, any one of the components—including the communication devices (602, 606, 610, 612, and 614), server 618, and other associated devices, such as radar detectors, navigation units, displays, etc.—may include and operate the analysis algorithm 622. In addition, in some embodiments of system 600, different aspects of the analysis algorithm 622 may be operated by different components such that any one or more components may execute the analysis algorithm 622 in whole or in part and remain within the scope and spirit of the disclosure. In such embodiments where the analysis algorithm 622 is operated in whole or in part by different components, the various components may reconcile the analysis on a real-time, periodic, scheduled, and/or triggered basis.

In some embodiments, the analysis algorithm 622 may tailor the resulting output to an individual based in part upon any considerations entered by the user and/or the user's stored driving patterns. The analysis algorithm may also consider the current day, time, geographic location, heading, speed and acceleration of motor vehicles 604-608 to tailor a predicted alert value.

The analysis algorithm 622 may analyze a multitude of probabilities, communications, and/or associated threat levels based on specific subsets of the data, i.e. for specific times of the day, days of the week, or months of the year. The analysis may also be based on data associated with specific geographic location boundaries. This process may create alerts, communications, and/or other outputs specific to grid regions bounded by latitude and longitude, or specific to "road segments" where detailed map data is available. In addition, the analysis algorithm may associate a weighted factor to various data to represent the strength and/or reliability of the data. For example, a diminishing weight factor may be associated with data based on the age of the data such that older data has a lower weight factor. One skilled in the art will recognize that many variables may be considered to determine a weight factor for any data, different weight factors may be applied for different calculations, weight factors may change over time for all data or specific data, and multiple weight factors may be associated with any data to effect the overall weight of the evidence during analysis and remain within the scope and spirit of the invention. For example, the extent of time in which an entry, such as an alert, announcement, or notification, is available may depend upon the age of the entry, the content of the entry, the source of the entry, additional activity related to the entry (i.e. comments, views, etc.), additional entries in a proximate geographic location to the initial entry, and other factors. Each of the factors may be weighted according to the analysis algorithm 622, user settings and/or activity, and/or other data and analysis. The user history and/or settings associated with the user that originated the entry, the user that is receiving the entry, and/or system administrators may also alter the applicability and availability of various entries.

In addition, the density of data stored for any geographic location may vary by region. Database algorithms may automatically balance the data density for specific regions based on population density, data density, or other factors in each region. The server 618 may adjust how frequently the analysis algorithms 622 are executed, and evaluate how an ever-enlarging set of data impacts the efficiency of the analysis algorithms 622.

Based on the geographic locations associated with each of the communication devices, the server 618 may communicate real-time data, near real-time data, recorded data, and/or predictions derived by the analysis algorithm 622. As one skilled in the art will recognize, geographic locations associated with the communication devices may include the geographic area in which each communication device is currently located, geographic areas which each communication device is approaching or likely to approach, geographic areas designated by the user of each communication device, and/or suggested by a mapping or navigation component or device. One skilled in the art will also recognize that the size, shape, scope, calculation, and/or any defining parameters of an associated geographic area may vary and remain within the scope and spirit of the present invention. Each of the communication devices periodically receives or downloads a subset of the data, recordings, announcements, predicted alert levels and/or threat levels from the server 618 that correspond to the current geographic locations associated with each communication device, including for example road segments currently traveled and road segments likely to be traveled in the future, and/or the particular time of day, day of week, or month of year. Each communication device uses its location identifier and corresponding timestamp data to provide real-time data and/or predictions for the user, on that day, at that time, at that geographic location, on that heading, at that speed and acceleration, under those weather and traffic conditions.

Recordings may include stored audio data (e.g. voice, music, beeps, tones, etc.), visual data (e.g. photographs, drawings, text, etc.), and combinations of audio and visual data (e.g. video with sound, text with voice, etc.). In addition, recordings may be stored in any format, such as a digital format, an analog format, and/or other data storage formats.

Each of the communication devices communicates information, such as data, recordings, and/or alert levels, to a corresponding user based on the geographic locations of the communication devices, as well as other predictive data described above. The resulting information may be communicated to the user through a display, a mechanical response, and/or an audible or voice output via a mobile communication device or another mobile device, such as a mobile telephone, citizens band radio, or other radio. For example, a light on the citizens band radio 610 may flash red as the second motor vehicle 608 approaches the location of a recorded message and may provide a voice alert that identifies a classification for the recorded message. In addition, some communication devices may communicate other relevant data, such as local traffic, safety alerts, evacuation notices, custom alerts, local messages, and/or potential available users for a live communication. For example, the first mobile communication device 602 may provide a first display showing alert levels and active custom alerts, a second display showing a list of users within a defined radius, a third display showing a recordings regarding entertainment options, and an audible voice alert providing notice that speed limits in the local area are known to be strictly enforced. This will allow, in turn, motor vehicle operators to become more cognizant of traffic conditions by being warned in advance to adhere to the posted speed limits, to avoid collisions with or the obstruction of emergency vehicles and avoiding possible hazards such as accidents, weather and other road hazards. For example, server 618 may receive a weather alert from an associated weather source, such as NOAA, and facilitate the transmission of the weather alert to the first mobile communication device 602. The first mobile communication device 602 may display a map showing counties affected by the weather alert with a flashing purple background. In addition, the first mobile communication device 602 may provide an audible weather warning automatically or based upon user controls, geographic location and/or other basis.

As one skilled in the art will recognize, the display may be color change on the radar detector, a series of light-emitting diodes, a liquid crystal display, and/or any other display known or yet to be discovered and will remain within the scope and spirit of the invention. As one skilled in the art will recognize, the mechanical response may be a change to the vehicles operation, such as automatically decelerating the vehicle as a safety risk approaches, and/or any other mechanical response known or yet to be discovered and will remain within the scope and spirit of the invention. As one skilled in the art will recognize, the audible alert may be a beep, buzz, voice response, and/or any other audible alert known or yet to be discovered and will remain within the scope and spirit of the invention.

System 600 may be utilized for a variety of alert and communication processes. For example, system 600 may facilitate the communication of predictive and/or submitted alerts associated travel, such as high traffic areas, law enforcement activity, traffic accidents, hazards, bicycle warnings, and other travel alerts. In another example, system 600 may facilitate verbal communication among groups of people based upon one or more factors. In some embodiments, analysis algorithm 622 may include voice recognition capabilities to analyze the live broadcasts and recorded voice messages to evaluate potential alerts in conjunction with additional information from system 600 users.

In another example, system 600 may facilitate the sharing of recordings among users. In some embodiments, the system 600 may include components and/or software for converting audio data to visual data and visual data to audio data. For example, the user of the first mobile communication device 602 may create a voice recording which is transmitted to the server 618. Upon receipt, the server 618 converts the voice message into a text message and facilitates communication of the text message to the second mobile communication device 606. For another example, the user of the third mobile communication device 612 may create a text recording which is transmitted via the communication network 616 to the first mobile communication device 602. Upon receipt, the first mobile communication device 602 may determine that the first mobile communication device 602 is traveling above a threshold speed and automatically convert the text message into a voice message to play to the user of the first mobile communication device 602 via the operatively associated speakers within the first motor vehicle 604.

In some embodiments, system 600 may utilize database 620 and/or analysis algorithm 622 for facilitating and/or determining the distribution of alerts, communications, recordings, and other information. For example, the analysis algorithm 622 may determine which users in system 600 will receive an alert, communication, recording, or other information based upon settings for each user (including both the originating user and potential receiving users), a system status for each user, and other system controls. In addition, the analysis algorithm 622 may evaluate when to provide certain information to a recipient based upon various factors such as content of the information, historical analysis of a potential recipient's driving characteristics, a geographic location of potential recipient, and/or any other indications of interest from the potential recipient or originating user. For example, analysis algorithm 622 may identify information related to a roadway obstruction, such as a traffic accident, in a user's current path of travel or a route defined by navigation unit 603. After identifying such information, the analysis algorithm 622 may determine when to provide the information based upon the potential options for taking an alternative route and the user's historical characteristics, such as their characteristics relating to traffic accident notifications and timeframe to take the actions necessary to change the routes. In some embodiments, the various uses and/or capabilities of system 600 may be integrated in part or in whole.

Figure 7:
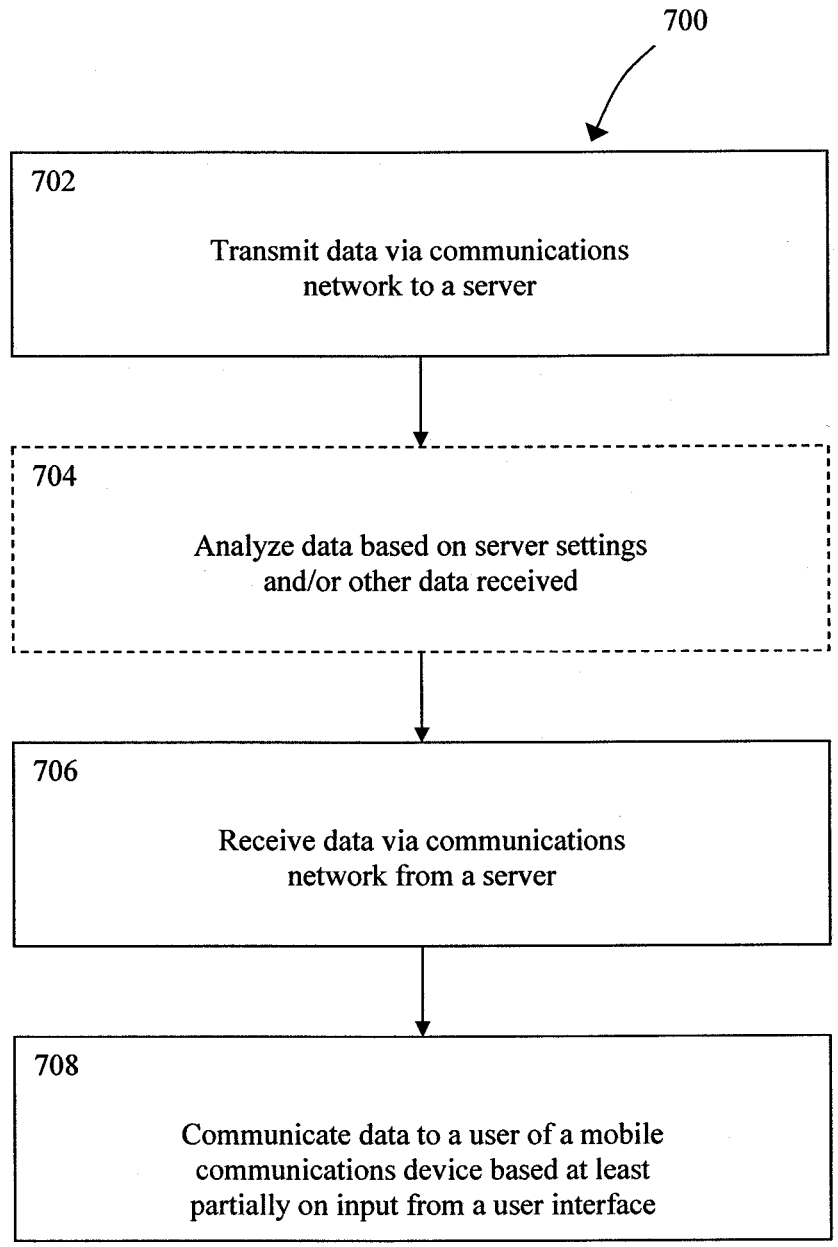
FIG. 7 is a flowchart depicting another embodiment of a process of the present disclosure.

FIG. 7 is a flowchart depicting an embodiment of process 700. The process 700 may be a method executed by the system 600 and/or a computer program product to facilitate communication of data, recordings, and/or predictions based on data in database 620 and or collected from components of system 600.

In box 702, data is transmitted via a communication network to a server. For example, the first mobile communication device 602 communicates data that indicates a road closure over communication network 616 to server 618. In some embodiments, the communication network 616 may utilize an alternative to server 618 or otherwise bypass server 618.

In box 704, data may optionally be analyzed based upon the internal server settings and/or other received data. For example, a voice recording transmitted by citizens band radio 610 may be analyzed by analysis algorithm 622 to determine if the recording indicates a potential alert or threat at a specified location. If the recording is indicative of a threat at a specified location, the analysis algorithm 622 may incorporate the data into an alert level analysis with other information related to the location and/or indicated threat.

In box 706, data is received via a communications network from a server. For example, a motorcyclist using the third mobile communication device 612 may receive a recording from the server 618 which is from a person within the motorcyclist's user group and states that anyone in the area should meet up for a bite at the local restaurant off the next exit.

In box 708, data is communicated to a user of a mobile communication device and/or a user of another device based at least partially on user input from a user interface. For example, the user interface of the first mobile communication device 602 communicates the data that indicates an emergency hospital location ahead and provides a recording that indicates vehicles should be cautious because due to a nearby wreck there are more emergency responders in the area than normal. As one skilled in the art will recognize, the data may also include information received from other communication devices associated with the system 600 which have passed through and/or any other data sources which are associated with or entered into the system 600.

Figure 8:
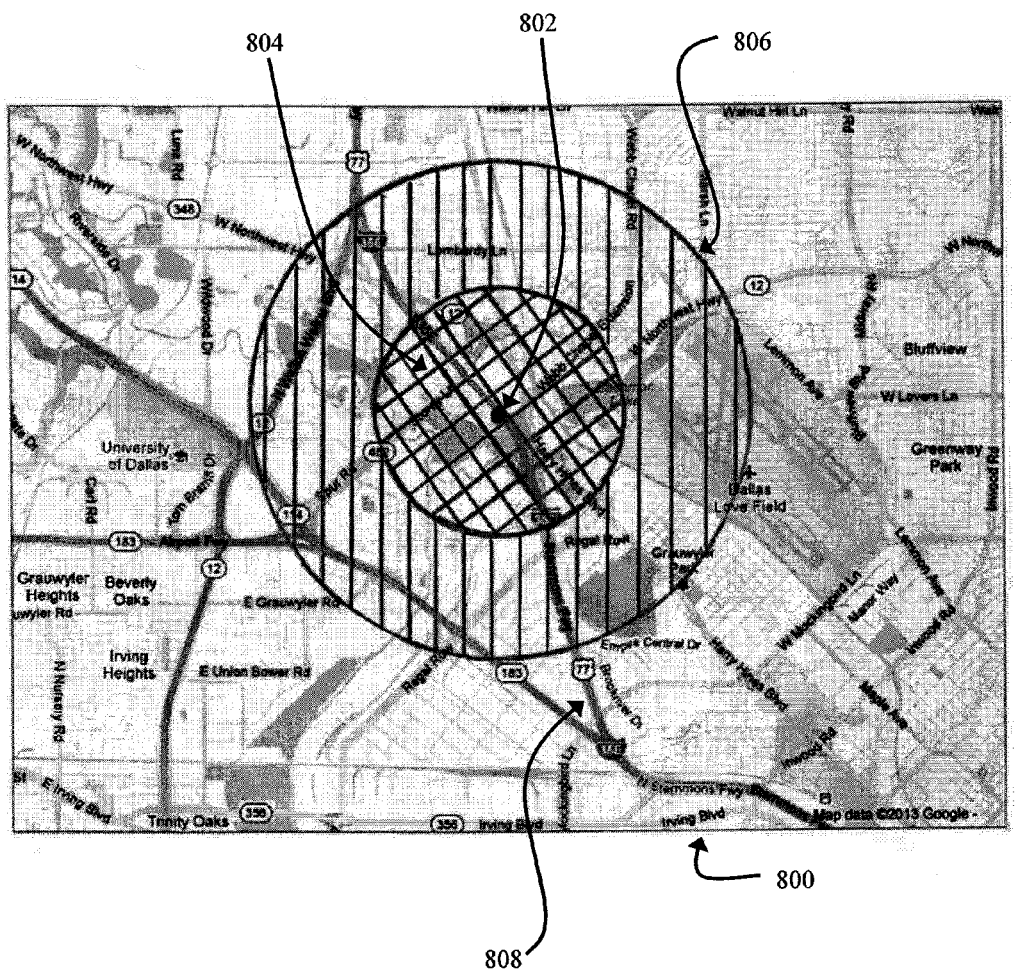
FIG. 8 is an embodiment of a map illustration depicting communication areas of the present disclosure.

FIG. 8 depicts an embodiment of a map illustration with overlaid communication areas. In some embodiments, the map illustration may be displayed on an interface associated with any of the communication devices. In other embodiments, only portions of the map illustration may be provided to a user of an interface associated with one of the communication devices. For example, the user interface may only depict the map 800 and an indication of the current location of user 802 associated with a communication device.

Map 800 depicts a street layout with portions overlaid with first communication area 804 and second communication area 806. The communication areas 804 and 806 are provided herein to illustrate options for defining areas of communication and/or distribution of information among users of system 600. The depictions of communication areas may or may not be included in the displays associated with system 600.

In this embodiment, each communication area 804 and 806 is depicted with a different pattern which may be associated with a different communication setting. For example, first communication area 804 has the first overlay design indicating that the area is within an open broadcast zone. Second communication area 806 has the second overlay design indicating that the area is within a user group broadcast zone. To illustrate this further, user 802 operating first mobile communication device 602 may provide voice communications to server 618 through network 616. Based upon the user settings and the geographic locations of the participants of system 600, the analysis algorithm 622 will determine the users in which to distribute the voice communications. Based upon the determination, server 618 may facilitate the distribution of the voice communications to other users in communication area 804 with settings to allow the receipt of open broadcasts, and users within communication area 806 which are in the user group associated with the first communication device 602 and/or user 802. In some embodiments, each user group associated with the first mobile communication device 602 may be associated with separately defined communication areas. In addition, the portions of the map 800 not overlaid with communication areas 804-806 may indicate areas in which the user 802 will not receive or distribute communications or information under the current settings. In other embodiments, the portions of map 800 not covered by communication areas 804 and 806 may allow communication among select users only, such as selected subscribers, invited users, family, and/or other specified users.

As one having skill in the art will recognize, any meaning may be associated with a given overlay style and remain within the scope and spirit of the invention. In the depicted embodiment, there are two overlay patterns associated with communication areas 804 and 806. As one skilled in the art will recognize, any number of overlays may be employed and remain within the scope and spirit of the invention. In addition, any overlay design may be used, including color overlays, line designs (such as those pictured), animations, degrees of opacity, other designs and/or any combination of colors and designs.

Communication areas may be associated with specific road segments and/or areas, such as the radial communication areas 804 and 806 depicted in this embodiment as an area based upon the location of user 802. As one skilled in the art will recognize, communication areas may correlate to individual road segments, grid sections of a map, geographic areas, shapes, and/or any design related to the map or the geographic area the map represents, and remain within the scope and spirit of the invention. Some additional non-exhaustive examples of communication areas and implementations of system 600 are provided below.

As one skilled in the art will recognize, the various communication areas 804 and 806 may change in display and/or operation as a mobile communication device receives an update from the server 618 or receives modified settings via a user interface associated with the mobile communication device. For example, as the user 802 continues to travel along road 808, the communication areas 804 and 806 may move in conjunction with the movement of the user 802. As another example, the analysis algorithm 622 may automatically alter the scope of each communication area based upon characteristics of the environment and history associated with user 802. For example, the analysis algorithm 622 may apply different restrictions based upon whether the user 802 is in a city or a rural area. For instance, the radius of communication area 804 allowing open communications may be smaller in a city environment due to the potential for an increased number of users associated with system 600 while the communication area 806 associated with a user group for user 802 remains the same. In a rural area, both communication areas 804 and 806 may expand. The analysis algorithm 622 may evaluate the scope of communication areas based upon any number of factors, including but not limited to user statistics of system 600, communication characteristics (e.g. content, length, noise characteristics, etc.), environmental characteristics (e.g. weather, alert levels, traffic, etc.), current activity on system 600, historical activity on system 600, time, proximity of other users, and/or other factors.

In addition, user controls may determine the scope of communication areas 804 and 806. For example, user 802 may elect to set the communication area 804 to 50 miles, but muting the microphone for communication area 804 in order to listen to the community comments on the open broadcast. The user 802 may also limit communication area 806 to 10 miles without muting the microphone in order to talk to nearby friends within communication area 806. One skilled in the art will recognize that the user controls may operate in conjunction with or as an alternative to the control associated with analysis algorithm 622 in whole or in part. In some embodiments, the analysis algorithm 622 may override the user controls.

Figure 9:
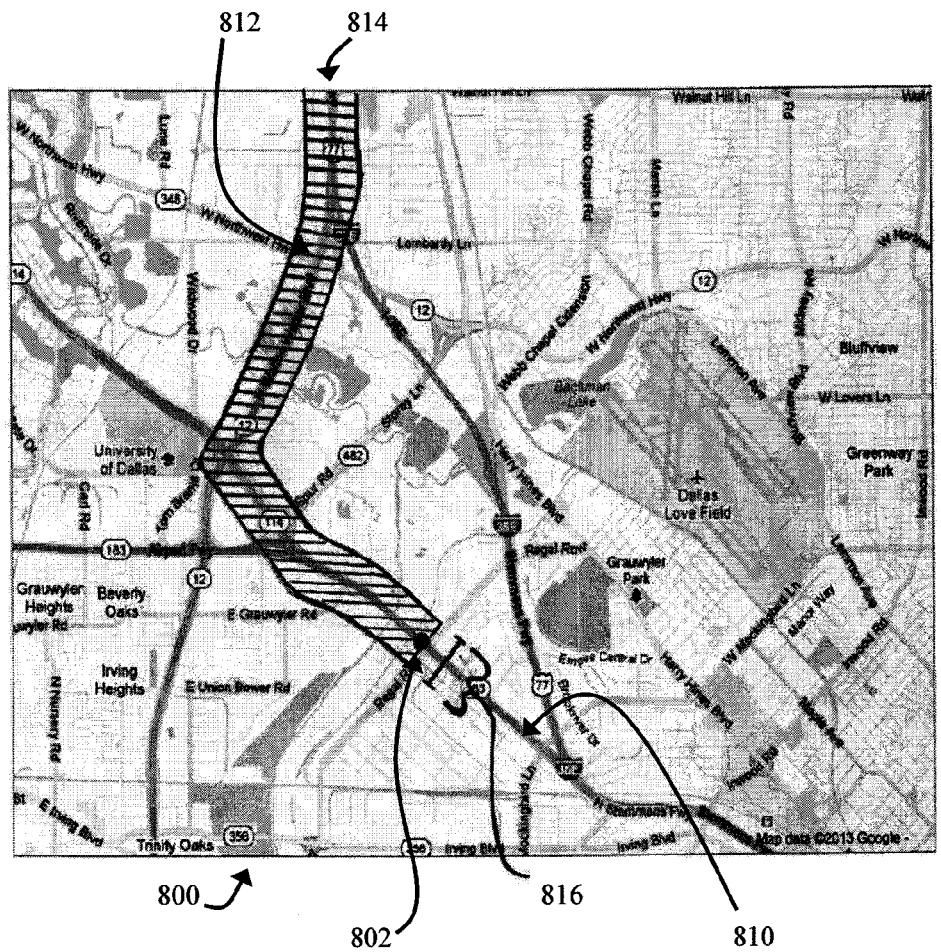
FIG. 9 is another embodiment of a map illustration depicting communication areas of the present disclosure.

FIG. 9 depicts another embodiment of a map illustration with an overlaid communication area. As discussed with regard to FIG. 8, the map illustration may be displayed on an interface associated with any of the communication devices in whole or in part, or not displayed in some embodiments.

Map 800 depicts a street layout with portions overlaid with third communication area 814. In this embodiment, user 802 is traveling along a selected route from road 810 to second road 812. The route may be selected from any communication device and/or other device associated directly or indirectly with system 600 which includes a navigation or route selection function. For example, user 802 may have selected a route of travel from a navigation unit in the first motor vehicle 604 that interfaces with the first mobile communication device 602. The first mobile communication device 602 may communicate the selected route and the aspects of the third communication area 814 with server 618 through network 616.

In this embodiment, communication area 814 is depicted as an overlay of the selected route. In this embodiment, the communication area 814 covers a width 816 with the selected route shown approximately with approximately half the width 816 on each side. In other embodiments, the width 816 may not be centrally positioned over the route. For example, width 816 may be shifted along the route based upon the direction of travel for user 802, whereby the width 816 of third communication area 814 may extend further on the right side of roads 810 and 812 in order for the user 802 to receive information regarding the intended direction of travel without the need to cross to the other side of the roads 810 and 812. As discussed with other embodiments, the position and shifting of communication area 814 may be controlled in whole or in part by the user 802 and/or the analysis algorithm 622.

In some embodiments, additional route based communication areas may be included for a variety of purposes, such as those described in conjunction with the first and second communication areas 804 and 806 discussed with FIG. 8. In some embodiment, the various communication areas designs may be used in conjunction. For example, user 802 may utilize the radial design of first communication area 804 (FIG. 8) and the route based design of third communication area 814 to define the area of an open broadcast zone. In addition, user 802 may select to listen to any recorded entries regarding specified categories (such as traffic notices, alert levels, and good restaurants) within third communication area 814 as they are approached.

As one skilled in the art will recognize, the third communication area 814 may change in display and/or operation as a mobile communication device receives an update from the server 618 or receives modified settings via a user interface associated with the mobile communication device. For example, if the user 802 alters the route of travel, the third communication area 814 may be recalculated to correspond with the new route.

In some embodiments, user 802 may receive live broadcasts of from other active users of live communications on system 600 and distributions of other information based upon factors associated with the information and user 802. For example, user 802 may elect to listen to live broadcasts and to receive recordings and alerts related to traffic, law enforcement activity, and refueling locations in the third communication area 814. The analysis algorithm 622 may automatically rebroadcast communications from other active users in the third communication area 814.

The analysis algorithm 622 may also determine when to provide the relevant recordings and alerts based upon the route characteristics, traffic, the historical and current driving characteristics of user 802, and/or other factors. For example, the analysis algorithm 622 may facilitate distribution of the recordings and alerts regarding refueling locations a quarter-mile ahead of the relevant exit from the road 810 on which user 802 is traveling based upon the speed of travel for user 802 and the current traffic conditions. As another example, analysis algorithm 622 may facilitate distribution of an alert for law enforcement activity a half-mile in advance of the location, but only if the speed of travel for user 802 exceeds the speed limit of road 810 or a threshold amount over the speed limit for road 810. As another example, the analysis algorithm 622 may facilitate distribution of recordings and alerts associated with a traffic accident when user 802 is determined to be within an area affected by the traffic accident or approaching the area affected by the traffic accident as determined information received from users of system 600 and other sources of information. When approaching the area affected by the traffic accident, the analysis algorithm 622 may determine potential alternative routes and determine when to facilitate distribution of the recordings and alerts based upon the proximity of user 802 to potential alternative routes to the current route with an identified traffic accident. In addition, the area affected by a traffic accident may be defined based upon data, information, communications from other users of system 600 in closer proximity to the traffic accident. In addition, the analysis algorithm 622 may apply different evaluations based upon whether the user 802 is in a city or a rural areas.

Figure 10:
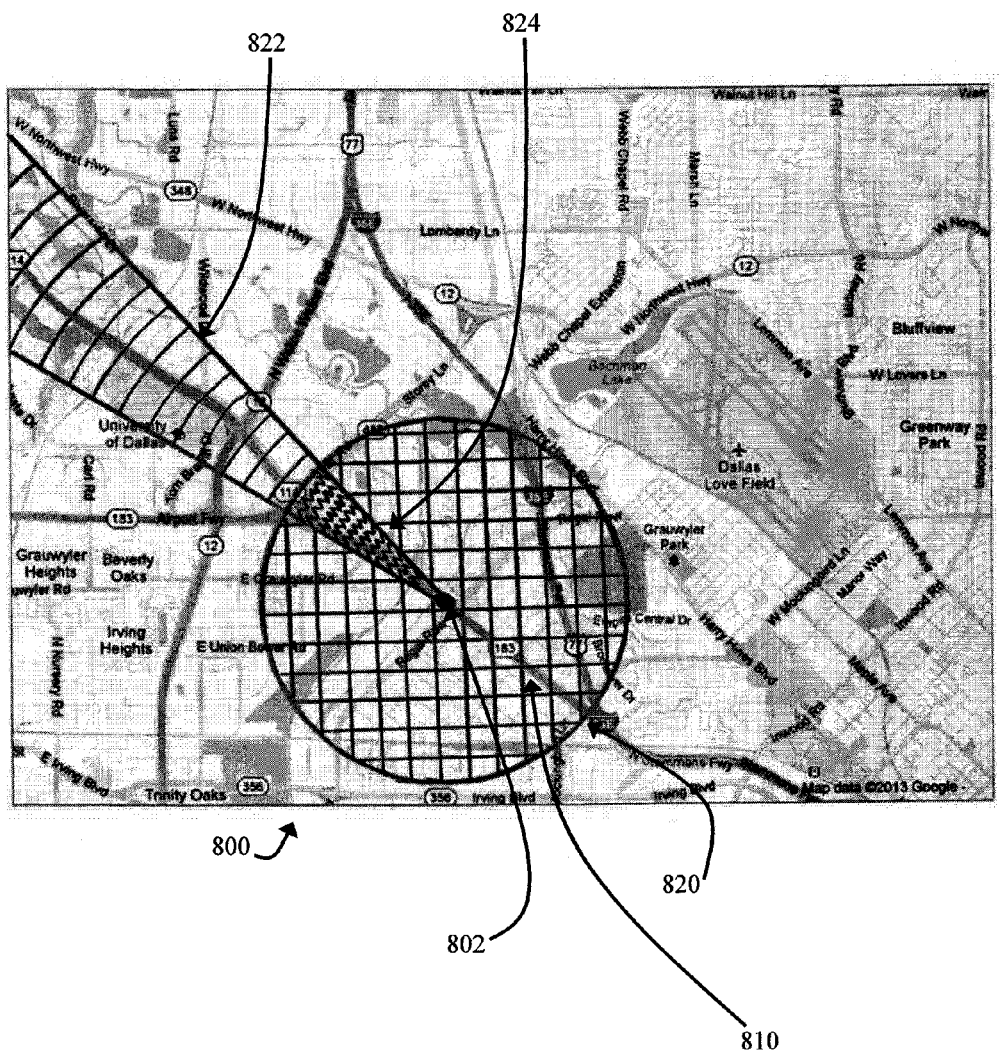
FIG. 10 is another embodiment of a map illustration depicting communication areas of the present disclosure.

FIG. 10 depicts another embodiment of a map illustration with an overlaid communication area. As discussed with regard to other figures, the map illustration may be displayed on an interface associated with any of the communication devices in whole or in part, or not displayed in some embodiments.

Map 800 depicts a street layout with portions overlaid with fourth communication area 820, fifth communication area 822, and sixth communication area 824. In this embodiment, user 802 is traveling along road 810 in the direction of fifth communication area 822. The analysis algorithm 622, may determine the direction of travel based upon a selected route by user 802 or an analysis of the change in location over time for user 802. For example, the last three locations of the second mobile communication device 606 determined by a location determination component associated with the device may be recorded. Based upon these historical locations, the analysis algorithm 622 may operate within second mobile communication device 606 to determine the direction of travel for the second mobile communication device 606.

In this embodiment, fourth communication area 820 is depicted as a circle overlay approximately centered on the location of user 802, fifth communication area 822 is depicted as a angular shape with its vertex approximately at the location of user 802, and sixth communication area 824 is location where the fourth communication area 820 and the fifth communication area 822 overlap. The angle defining the fifth communication area 822 may vary depending on a variety of factors including how far the fifth communication area 822 extends from the user 802, as well as other factors including those discussed with respect to other embodiments disclosed herein. In some embodiments, the fifth communication area 822 will have a vertex at a point behind the user 802 such that the fifth communication area 822 encompasses the location of user 802 by a certain amount. As discussed with other embodiments, the position and shifting of communication areas 820-824 may be controlled in whole or in part by the user 802 and/or the analysis algorithm 622.

As discussed in conjunction with other embodiments, communication areas 820-824 may identify different categories of communication. For example, fourth communication area 820 may be allow communication from a selected user group (e.g. a fans headed to a selected game, a travel caravan, etc.), fifth communication area 822 may allow communications and alerts regarding traffic, predictive alerts, and other travel information, and the sixth communication area 824 may provide an open broadcast discussion. As discussed above, the various communication areas designs may be used in conjunction. As one skilled in the art will recognize, the communication areas 820-824 may change in display and/or operation as a communication device receives an update from the server 618 or receives modified settings via a user interface associated with the communication device.

Figure 11:
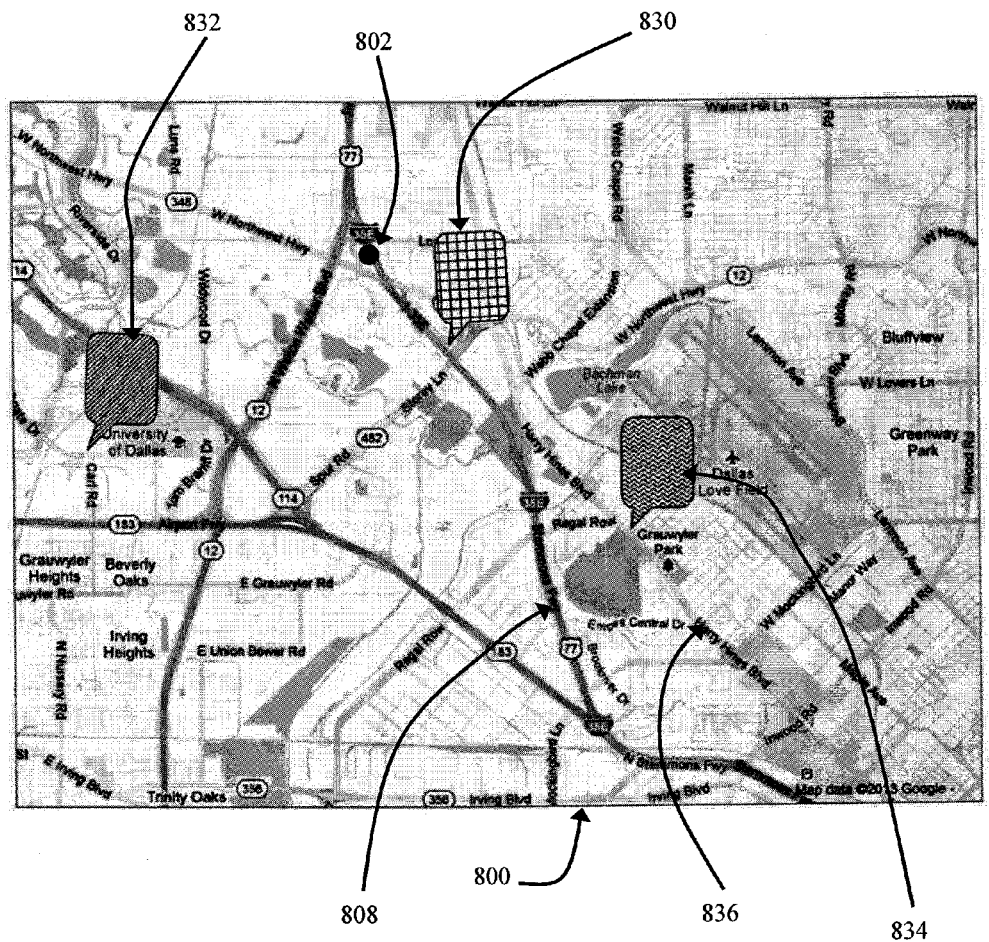
FIG. 11 is an embodiment of a map illustration depicting icons of the present disclosure.

FIG. 11 depicts another embodiment of a map illustration with icons associated with specified locations. As discussed with regard to other figures, the map illustration may be displayed on an interface associated with any of the communication devices in whole or in part, or not displayed in some embodiments.

Map 800 depicts a street layout showing the location of user 802. The map 800 also includes a first icon 830, a second icon 832, and a third icon 834. Each icon 830-834 is associated with a location depicted on map 800. In this embodiment, user 802 is traveling along road 808 towards first icon 830. As discussed with other embodiments, the analysis algorithm 622, may determine the direction of travel based upon a selected route by user 802 or an analysis of the change in location over time for user 802.

In this embodiment, the icons 830-834 are each associated with an audible recording or entry associated with the location by system 600 and/or a user thereof. In other embodiments, the icons 830-834 may be associated with other types of recordings or stored information. The audible recordings may be unlimited and/or restricted by system 600. For example, the system 600 may require all created audio recordings to be limited by time (e.g. only 10 seconds, 1 minute, etc.), content, format, noise characteristics, and/or other limitations. In addition, the system 600 may control the length of time in which a recording or entry is available. For example, the analysis algorithm 622 may determine the availability of a recording based upon characteristics of the recording such as the categorization, age, reliability, activations of the recording, and other characteristics. The analysis algorithm 622 may also determine the availability of a recording based upon other factors such as user settings, travel directions, user proximity to the recording, additional data in system 600, and/or other information. Embodiments of the system 600 may consider any one or more of the above characteristics or factors.

In this embodiment, each icon 830-834 is depicted with a different style which may be associated with a meaning, such as the content category, user relevance, activity status, and other meanings. As one having skill in the art will recognize, any meaning may be associated with a given style and remain within the scope and spirit of the invention. In the depicted embodiment, there are the three icons 830-834 each associated with a different style. The style of the first icon 830 may indicate that the recording relates to traffic situation such as a wreck or law enforcement activity. In some embodiments, the style of first icon 830 may further be varied to indicate a predicted alert level. For example, a check pattern may indicate a traffic situation and a red background may further indicate a high alert level. The style of the second icon 832 may indicate that the recording relates to user group entry such as a student group announcing an study session at the local park. The style of the third icon 834 may indicate that the recording relates to a sales establishment such as a restaurant, mall, or refueling location. As one skilled in the art will recognize, any number of style may be employed and remain within the scope and spirit of the invention. In addition, any design may be used, including color overlays, line designs (such as those pictured), animations, degrees of opacity, other designs and/or any combination of colors and designs.

As one skilled in the art will recognize, the various icons 830-834 may change which style is displayed as a communication device downloads an update from the server 618 or a user updates their user settings. In addition, the icons 830-834 may be removed and/or replaced over time based upon determinations of analysis algorithm 622. In some embodiments, the user settings may eliminate the presentation of one or more icons 830-834 and/or cause certain icons 830-834 to be highlighted and/or diminished in view. For example, when user 802 associates a route with system 600, icons 830-834 which are not on the route (such as icon 830) may be diminished from view while those on the route (such as icon 832) are highlighted.

After icons 830-834 are displayed on the communication device of user 802, user 802 may select to hear the recording by pressing icon 830 to listen to the audio recording associated with the icon 830. In some embodiments, user 802 may elect to receive recordings along the traveled roads as they are approached. For example, if user 802 travels along road 836, the recording associated with icon 834 may automatically play once the user 802 is within a threshold distance to the location associated with icon 834.

In some embodiments, the icons 830-834 may represent information provided by the system 600 from database 620 or other databases. For example, icon 832 may indicate a work zone as indicated by a third party database. In some embodiments, the icons 830-834 may be associated with other indicators such as highlighted areas of interest and/or relevance. For example, icon 832 may be associated with a highlighted road segment indicating that the icon 832 is applicable to the road segment which is highlighted—e.g. icon 832 may indicate that an active work-zone is in the highlighted road segment.

In some embodiments, the systems and/or apparatuses disclosed may automatically warn users of legal limitations on using mobile devices in certain areas. For example, in locations which preclude drivers from using cellular phones in school zones and/or work zones, a user's communication device may alert the user to an approaching restricted area. In some embodiments, the systems and/or apparatuses disclosed may temporarily disable mobile devices in certain areas. In some embodiments, a data filter is used to restrict the display of icons 830-834 and/or other data from the server based upon parameters such as the communication areas, content, user groups, alert levels, and/or other categorizations or limitations relevant to the selection and display of data, including customized data restriction.

FIGS. 12-16 depict embodiments of a smart phone 900 with different displays associated with embodiments of the present disclosure. Each of the FIGS. 12-16 include a depiction of smart phone 900 with button 902 and display 904. One skilled in the art will recognize that the disclosure associated with smart phone 900 may be implemented with other communication devices, including other types, styles, and designs of smart phones. Other devices may include more or less components that smart phone 900 and remain within the scope and spirit of the disclosure. For example, some communication devices may include more buttons 902 as part of a user interface, while other communication devices may not include a button 902 as part of a user interface. For another example, some communication devices may have more than one display 904. In some embodiments, the user interface may comprise a touch-screen capability associated with the display 904, one or more buttons 902, an audio input/output system, a tactile output, and/or other user interface components.

The various embodiments may be implemented in smart phone 900 using software, updated hardware, and/or firmware. For example, the embodiment in smart phone 900 may be available for download as a software application that leverages existing hardware and capabilities of the smart phone 900.

Figure 12:
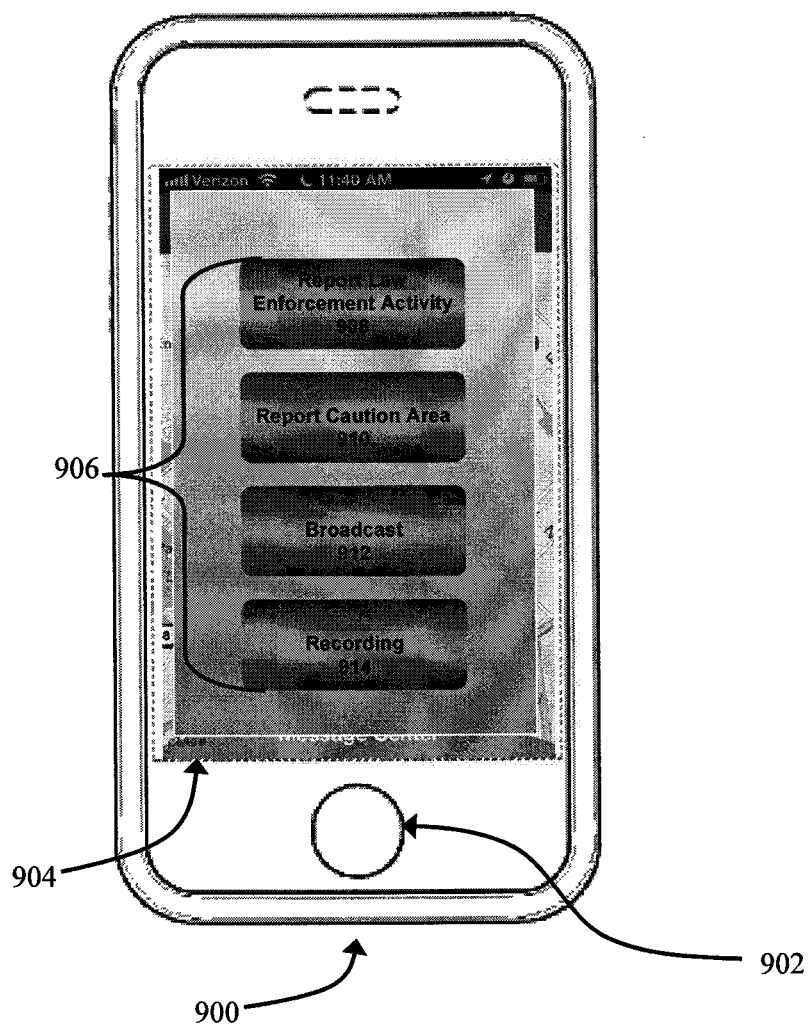
FIG. 12 is an embodiment of a smart phone depicting a user interface of the present disclosure.

FIG. 12 further depicts smart phone 900 with a set of touch-screen selectable options 906. In this embodiment, the options 906 include: a report law enforcement activity button 908; a report caution area button 910; a broadcast button 912; and a recording button 914.

The report law enforcement activity button 908 allows a user to provide indications of observed law enforcement activity associated with a location. For example, a user of smart phone 900 traveling along a road may see a police officer pulling over vehicles. When sighted, the user may press the report law enforcement activity button 908 causing the smart phone 900 to transmit data to a server, such as the servers discussed with other embodiments, indicating the location of the sighted police officer. In some embodiments, selection of the report law enforcement activity button 908 may open another screen to provide additional detail regarding the law enforcement activity. In some embodiments, the application in smart phone 900 may allow a user to provide an audio recording associated with the report of law enforcement activity.

The report caution area button 910 allows a user to provide indications of observed areas of caution associated with a location. For example, a user of smart phone 900 traveling along a road may see a broken down vehicle in one lane of traffic. When sighted, the user may press the report caution area button 910 causing the smart phone 900 to transmit data to a server indicating the location of the broken down vehicle. As discussed with regard to other options, selection of the report caution area button 910 may open another screen and/or provide additional options to provide additional detail regarding the sighted caution.

The broadcast button 912 allows a user to enter a communication broadcast mode wherein the user may send and receive communication broadcasts from other participants in the communication broadcast mode of operation. For example, a commercial truck driver using smart phone 900 may enter a broadcast mode to communicate with other truck drivers and broadcast mode participants. As discussed with other figures, the communication area and participants may be limited by user and/or system controls. One skilled in the art will recognize that the limited range capabilities of a citizens band radio may be emulated by the broadcast mode of smart phone 900, and improved by providing potentially limitless range, user controls, user identification, and/or other improvements. As discussed with regard to other options, selection of the broadcast button 912 may open another screen and/or provide additional options to provide additional controls. Some embodiments will also facilitate transmitting and receiving additional information regarding the broadcast users, such as discussion topics (e.g. weather conditions, roadway conditions, etc.), content limitations (e.g. no obscenity, no politics, only sports, etc.), user groups (e.g. truckers, campers, spring break convoy, etc.), and/or other relevant information.

In some embodiments, the broadcast mode of operation facilitates a live communication system among the participants in the broadcast mode. For example, the systems of the present disclosure may facilitate broadcast mode by collecting streaming packets of audio from one user of the system to the server and broadcast the streaming packets of audio to other users of the broadcast system as determined by an analysis algorithm associate with the server. In some embodiments, the server may replicate the streaming packets for broadcasting to each of the other users of the broadcast system. In some embodiments, the other users will be determined by operation of the analysis algorithms evaluation of participant restrictions. In other embodiments, the broadcast mode of operation facilitates a half-duplex communication system among the participants in the broadcast mode wherein an actuated control allows either an audio input or an audio output to operate alternatively, but not concurrently. In yet other embodiments, the broadcast mode of operation facilitates a hybrid communication system among the participants in the broadcast mode, wherein the audio input requires an actuation control, but the audio output operated apart from the actuation control. For example, a user of smart phone 900 may be required to press a talk button to contribute to the conversation, but may receive the broadcast audio on the speakers of smart phone 900 without regard to the status of the talk button.

The recording button 914 allows a user to record a communication which is associated with a geographic location and transmit it to a database which provides the recording to other users of the system. For example, a person using smart phone 900 may post a comment stating the traffic is horrible around the stadium. In some embodiments, the recording is limited to a short snippet of audio and provided only for a limited amount of time. As discussed with other figures, the distribution of recordings and user which may receive the recordings may be limited by user and/or system controls. In some embodiments, the user information is not associated with recordings. In such embodiments, limitations based upon the originating user may not be applicable. As discussed with regard to other options, selection of the recording button 914 may open another screen and/or provide additional options to provide additional controls. Some embodiments will also facilitate transmitting and receiving additional information regarding the recording mode users, such as discussion topics (e.g. weather conditions, roadway conditions, etc.), content limitations (e.g. no obscenity, no politics, only sports, etc.), user groups (e.g. truckers, campers, spring break convoy, etc.), and/or other relevant information.

Figure 13:
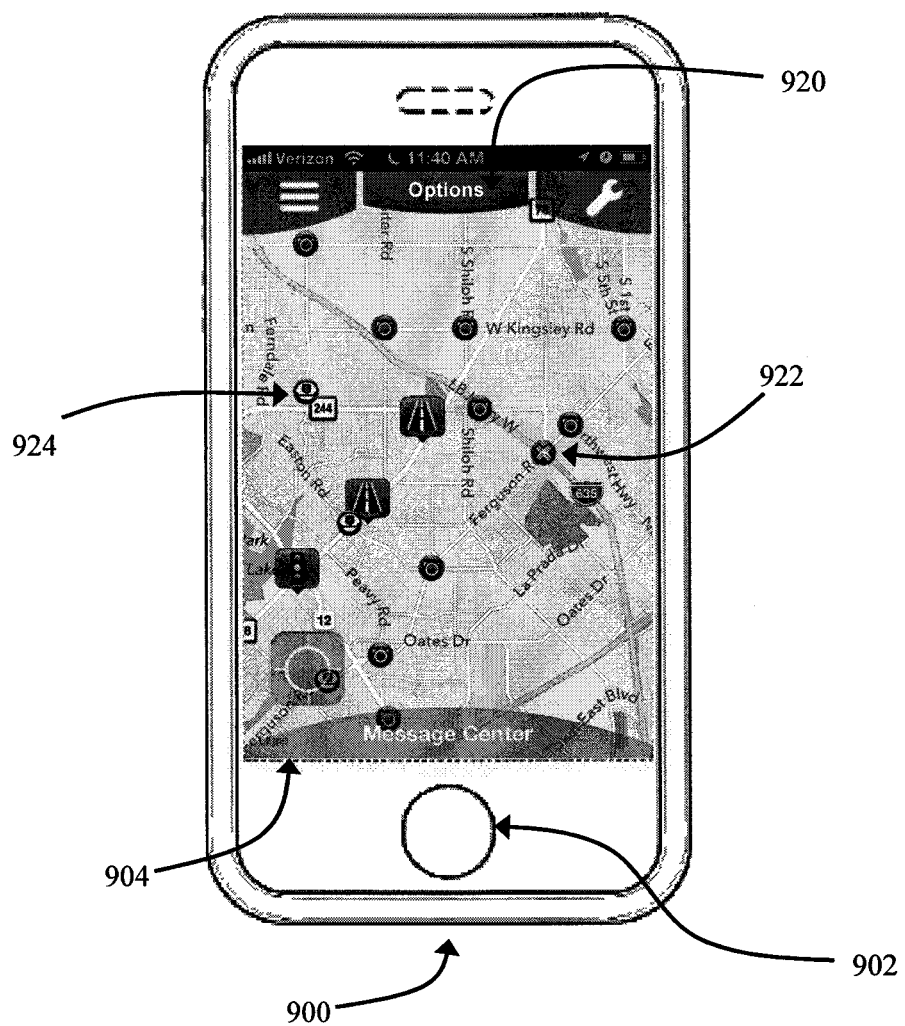
FIG. 13 is an embodiment of a smart phone depicting a map illustration of the present disclosure.

FIG. 13 further depicts smart phone 900 showing a map illustration on display 904. In this embodiment, the display 904 shows a few operative buttons which may be utilize to facilitate and/or control operation of the application software. As an example, an options button 920 is located at the top of display 904. The options button 920 may allow a user to provide further information to the system and/or customize the application options, such as audio, tactile, and/or visual outputs of the user interface. In some embodiments, selecting the options button 920 may cause the screen shown in FIG. 12 to appear.

The map illustration shown in FIG. 13 further depicts a variety of symbols indicative of various information provided by one or more of the systems disclosed herein. For example, first symbol 922 may indicate a dangerous intersection, and second symbol 924 may indicate the location of an active police officer. One skilled in the art will recognize that the number, type, illustration, shape, color and/or other attributes of the symbols may vary and remain within the scope and spirit of the present disclosure. In some embodiments, a user may tap on a symbol to receive additional information associated with the symbol. For example, when a user taps on second symbol 924, an 87% alert level may be shown on the bottom of display 904 and a voice may indicate there is a high probability that a police officer is present.

Figure 14:
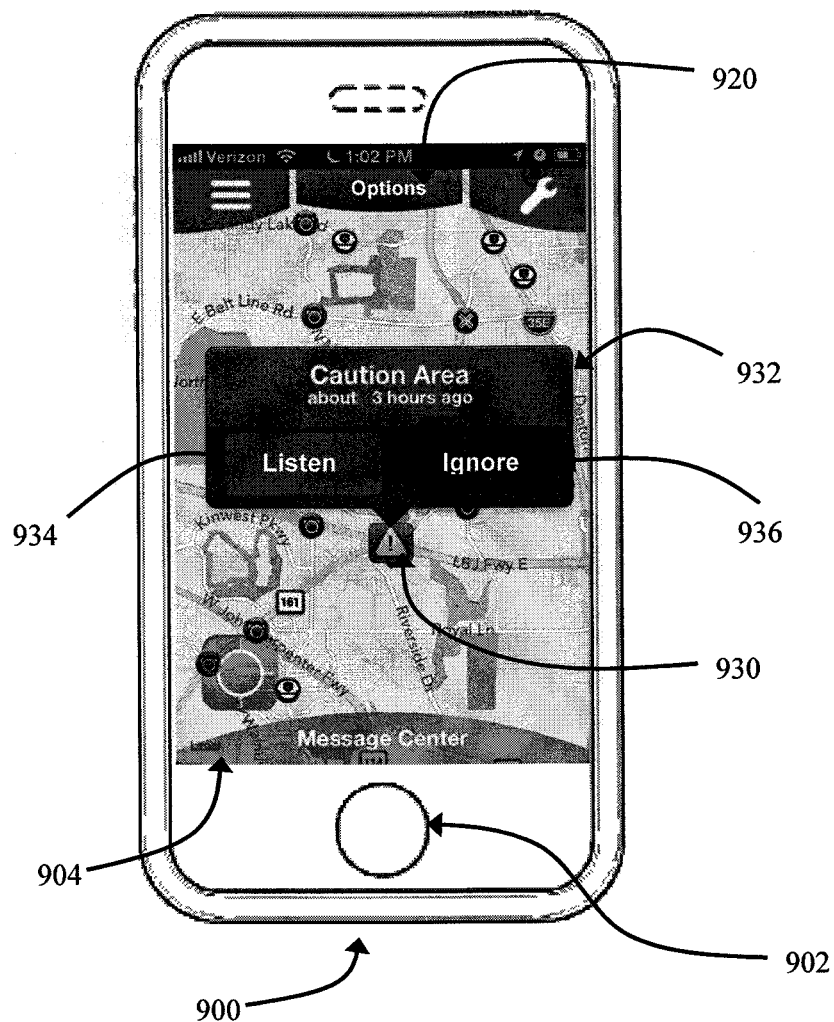
FIG. 14 is another embodiment of a smart phone depicting a map illustration of the present disclosure.

FIG. 14 further depicts smart phone 900 showing a map illustration on display 904. As with FIG. 13, the display 904 shows a few operative buttons which may be utilize to facilitate and/or control operation of the application software including options button 920.

The map illustration shown in FIG. 14 also depicts a variety of symbols indicative of various information provided by one or more of the systems disclosed herein. In this embodiment, third symbol 930 may indicate a caution area, such as a traffic accident, roadwork, or user specific caution. The depiction shows an embodiment of a summary screen 932 that may appear when the third symbol 930 is selected by a user. In some embodiments, summary screen 932 may automatically appear based upon an analysis indicating the user of smart phone 900 is approaching the identified location. In this embodiment, summary screen 932 is associated with a recording and provides initial information regarding the category of information (i.e. caution area) and the time since the original recording was created (i.e. 3 hours ago). In addition, the summary screen 932 provides the option to listen or ignore the recording in this embodiment. If the user selects the listen button 934, the recording will play on the speakers of smart phone 900 or an associated set of available speakers. Alternatively, the user may select the ignore button 936 to close the summary screen without listening to the recording. If the user does not select either the listen button 934 or ignore button 936, the smart phone 900 may determine whether to play or ignore the recording based upon default or user selections and/or other factors.

Figure 15:
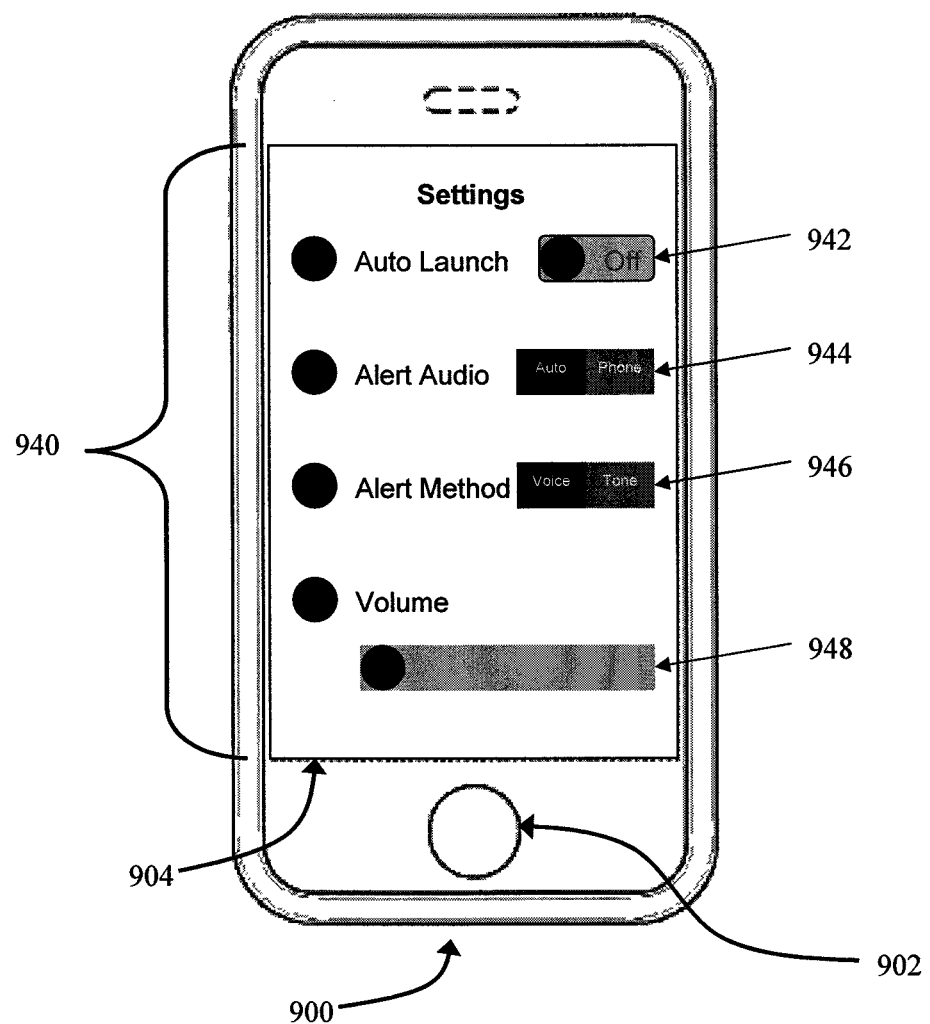
FIG. 15 is another embodiment of a smart phone depicting a user interface of the present disclosure.

FIG. 15 further depicts smart phone 900 with display 904 showing a set of touch-screen selectable settings 940. In this embodiment, the settings 940 include: an automatic launch control 942; an alert audio control 944; an alert method control 946; and a volume control 948.

In this embodiment, the automatic launch control 942 is a touch-screen button which shows the current selection in the view of a toggle switch. For example, as shown the automatic launch feature of the application is "off". If the automatic launch control 942 is touched, the automatic launch control 942 may shift the depicted circular portion to the right and indicated the feature is "on". One skilled in the art will recognize that the user interface options for controlling the operation of the application features may vary and remain within the scope and spirit of the disclosure. The automatic launch feature may be designed to initiate execution of an application and/or engagement of a component associated with the system based upon a triggering event. In some embodiments, the triggering event may include entering the operative range of another component of the systems (e.g. a radar detector, a vehicle, a computer, a CB, a navigation unit, etc.), a detected vehicle operation (e.g. a threshold speed, sudden change in acceleration, etc.), entering a location associated with a specified alert type or threshold alert level, and/or other triggering events.

In some embodiments, the automatic launch feature applies to launching the entire application and/or corresponding applications and equipment in other operatively associated applications and/or components of the systems disclosed herein. In some embodiments, the automatic launch feature may apply to any one or more portions of the application and/or corresponding applications and equipment in other operatively associated applications and/or components of the systems disclosed herein. In such embodiments, when automatic launch control 942 is "on", additional detailed automatic launch controls may be provided for selecting which aspects of the system will be automatically launched. For example, the smart phone 900 may be associated with a car diagnostic system which may be automatically launched to record car diagnostics upon a sudden change in acceleration meeting a set threshold. In addition, the display of user controls and selections may vary and remain within the scope and spirit of the disclosure.

The alert audio control 944 and the alert method control 946 are shown in this embodiment as touch-screen buttons which display the options for selection and highlight the current selection for the user. In some embodiments, the alert audio control 944 and/or the alert method control 946 may comprise two or more buttons, wherein each button is associated with a selectable option. In such embodiments, the application may limit the selection to one option (i.e. the last option selected) or may allow for multiple concurrent selections. For example, a user of smart phone 900 may use alert audio control 944 to select both auto and phone causing any audio alerts to be provided over both the vehicle speakers and the audio output of smart phone 900. In some embodiments, the alert audio control 944 and/or the alert method control 946 may comprise a button which depicts only the current setting, and provides a different indication of a selected setting each time the control 944 or 946 is toggled. In some embodiments, the selection in one control may determine and/or limit the options provided by another control. For example, if alert audio control 944 is set to "auto", the alert method control 946 may only provide a voice alert.

In this embodiment, the volume control 948 is shown as a slide control to allow the user to adjust the volume. In some embodiments, alternative volume controls may work in conjunction with or instead of volume control 948. For example, when alert audio control 944 is set to "auto", the vehicle's volume controls may be used to control the overall volume of the alert provided by smart phone 900.

Figure 16:
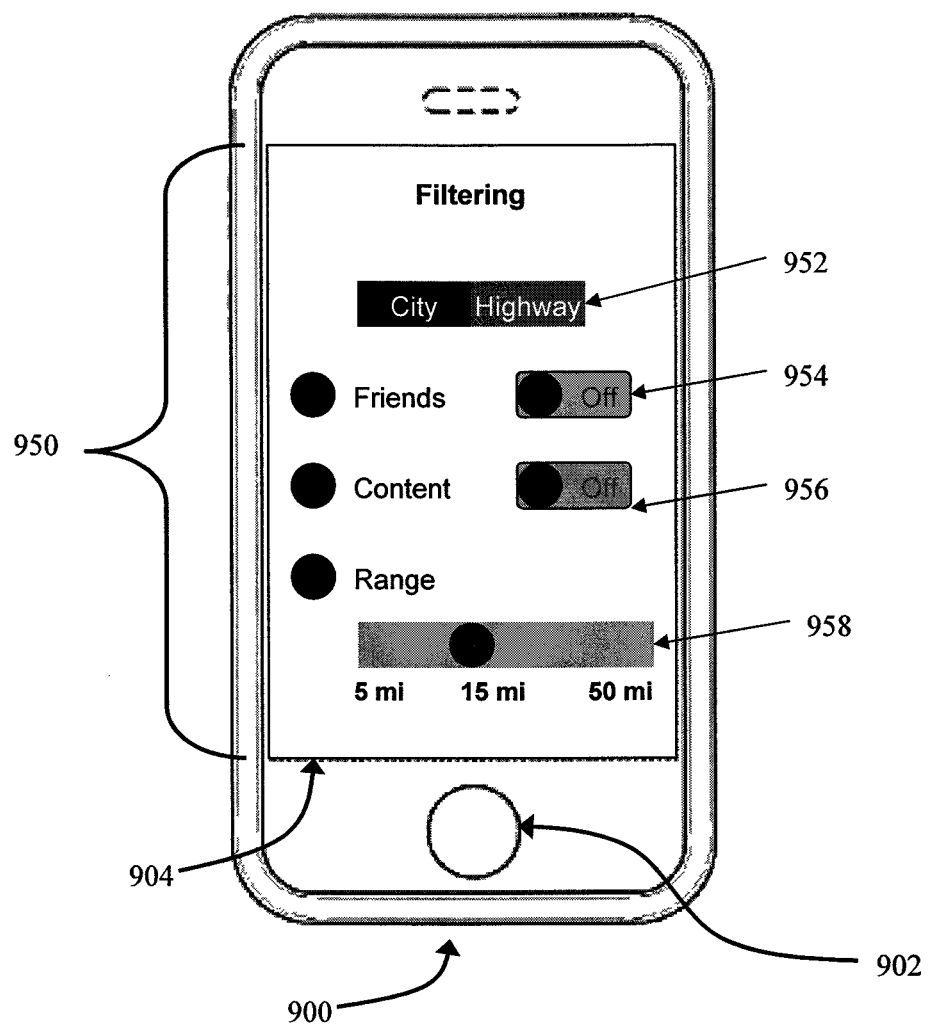
FIG. 16 is another embodiment of a smart phone depicting a user interface of the present disclosure.

FIG. 16 further depicts smart phone 900 with a set of touch-screen selectable filters 950. In this embodiment, the filters 950 include: a travel mode control 952; a user group control 954; a content control 956; and a range control 958.

The travel mode control 952 is shown in this embodiment as a touch-screen button which displays the options for selection and highlights the current selection for the user. For example, a user of smart phone 900 may use the travel mode control 952 to select either a city mode of operation or a highway mode of operation. Various potential applications and considerations relating to travel modes, such as city and highway modes, are discussed further herein. As discussed with respect to other figures and embodiments, the design, operation, depiction, and/or other attributes of the controls may vary and remain within the scope and spirit of the present disclosure.

In this embodiment, the user group control 954 and the content control 956 are depicted as touch-screen buttons which shows the current selection in the view of a toggle switch. For example, as shown the user group and content filters of the application are "off". If the user group control 954 is touched, the user group control 954 may shift the depicted circular portion to the right and indicated the feature is "on". In some embodiments, activating a filter may cause additional options for filtering within the activated filter category. For example, the content control 956 may shift the depicted circular portion to the right and indicated the feature is "on" if the content control 956 is touched. Once the content control 956 is "on", a separate filtering screen may be displayed allowing the user to select specific content filters, such as a kid-friendly filter, a trucker filter, weather filter, sports filter, traffic filter, and/or other content filters. In some embodiments, the additional detail filters may be shown in the filters 950 display. One skilled in the art will recognize that the user interface options for controlling the operation of the application features may vary and remain within the scope and spirit of the disclosure. In addition, the display of filter controls and selections may vary and remain within the scope and spirit of the disclosure.

In this embodiment, the range control 958 is shown as a slide control to allow the user to adjust the range of operation. In some embodiments, alternative controls may work in conjunction with or instead of the filter controls depicted and discussed herein. For example, while the filters 950 display shows various settings, the options may be selected and/or modified using voice controls. In some embodiments, the application and/or system will allow for custom filters and controls to be created, added, and/or modified by the user. For example, the kid-friendly filter may be a separate feature that may be incorporated into and/or operates in conjunction with the systems and embodiments disclosed herein. In some embodiments, the kid-friendly filter may operate as a separate application on the user's smart phone 900. For example, when the kid-friendly filter selected in the application, voice communication received by smart phone 900 may be routed through the kid-friendly filter application to minimize the likelihood that obscenity is communicated to the user of smart phone 900.

Figure 17:
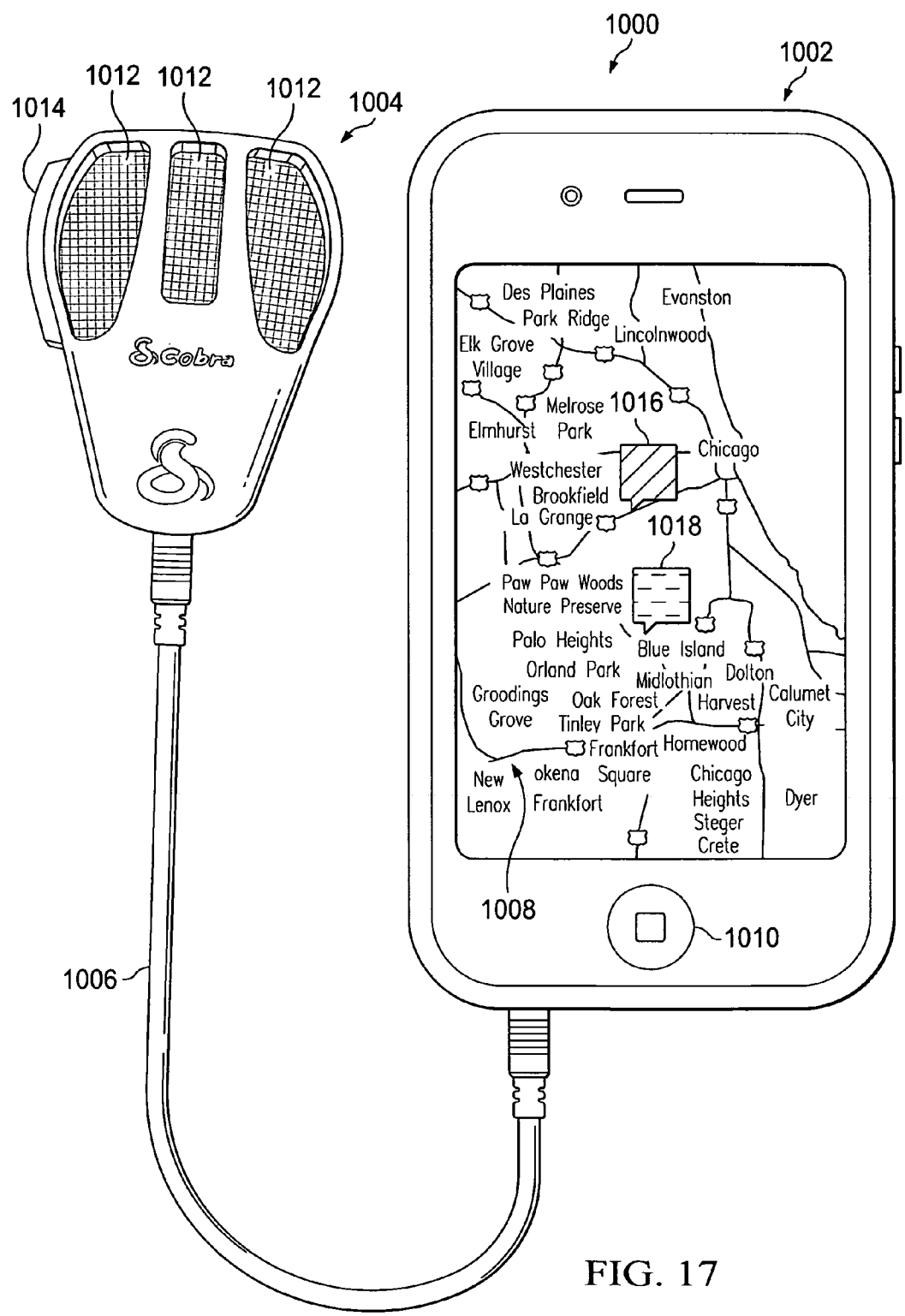
FIG. 17 is an embodiment of a user system operable with the systems of the present disclosure.

FIG. 17 depicts an embodiment of user system 1000 which may operate in connection with the systems of the present disclosure. In this embodiment, user system 1000 comprises a smart phone 1002 and accessory audio device 1004. The accessory audio device 1004 is depicted in this embodiment operatively attached to smart phone 1002 via cord 1006. In other embodiments, accessory audio device 1004 may be operatively attached to smart phone 1002 by any operable communication standard, such as the Bluetooth communication standard, the ZigBee communication standard, the WiFi communication standard, or any hard-wired or wireless other communication standard.

In this embodiment, the smart phone 1002 includes a display 1008 and a user interface control 1010. The smart phone 1002 may include one or more additional user interface controls of the same or alternative designs, including voice activation, touch-screen, movement controls, and/or other types of controls.

In this embodiment, the accessory audio device 1004 comprises an audio communication area 1012 and user control 1014. The audio communication area 1012 is shown with three sections which may be functional (i.e. associated with different functions) or merely ornamental in design. The audio communication area 1012 may include any number of audio components including speakers, microphones, transducers, piezoelectric devices, and/or other audio components. In some embodiments, the audio communication area may include only one type of audio component. In some embodiments, the audio components associated with the accessory audio device 1004 may improve sound quality received by and/or output from the smart phone 1002. In some embodiments, the accessory audio device 1004 may limit the need to operate the user interface of smart phone 1002 to input and/or receive non-visual information. In such embodiments, the smart phone 1002 may be mounted in a preferred location to limit any driver distraction.

The user control 1014 depicted in this embodiment is a button which may be actuated to control aspects of the accessory audio device 1004 and/or smart phone 1002. For example, a user of the accessory audio device 1004 may use a voice control to activate a recording mode. While in recording mode, the user may actuate user control 1014 to initiate a recording and speak into the audio communication area 1012. Once the user is done recording, the user may release the user control 1014 (or actuate the user control 1014 a second time) to stop the recording process. Once recorded, the recording may be associated with a location by smart phone 1002 and communicated to a system server. Once provided to the server, the recording (or a link thereto) may be provided to users of the system. In some embodiments, prior to communicating the recording to a system server, the user may have an opportunity to playback the recording. In such embodiments, the user may have the options to send, delete or re-record the recording. In some embodiments, the accessory audio device 1004 may include one or more additional user controls, such as additional buttons, knobs, etc.

In some embodiments, the recording is provided back to user system 1000. For example, after submitting a recording, icon 1016 may be displayed on smart phone 1002 indicating the location of the user's own recording. The style, design and/or other attribute of icon 1016 may indicate that the recording was created by user system 1000. In some embodiments, users may provide additional related comments to an existing icon which are further associated with the existing icon. In such embodiments, the style, design, and/or other attributes of the icon 1016 may change to indicate additional comments have been provided. In other embodiments, additional comments may be placed at the same location, but not associated with the existing icon.

In some embodiments, the user control 1014 may be actuated to listen to recordings in which the user system 1000 is approaching. For example, when user system 1000 is approaching icon 1018, the display 1008 of smart phone 1002 may flash to indicate a recording is available. The user may listen to the recording by actuating user control 1014. In addition, the user control 1014 may be used in a variety of methods, systems, and/or modes of operation. For example, when operating in a broadcast mode, the user control 1014 may be used to control half-duplex communication—e.g. the user can broadcast when the user control 1014 is depressed and listen when the user control 1014 is not depressed. In some embodiments, user control 1014 is limited to broadcast communication control, and a separate control on the accessory audio device 1004 is provided to operate additional functionality.

In some embodiments, the accessory audio device 1004 may be operatively associated with a device other than smart phone 1002 such as another type of phone, a navigation system, a personal digital assistant, a portable computer, a laptop computer, a tablet computer, and/or any other device with a user interface and the capability to wirelessly communicate. For example, the accessory audio device 1004 may be connected via cord 1006 to a navigation unit which is operatively associated with the systems of the present disclosure via a wireless communication standard. For another example, the accessory audio device 1004 may be operatively associated with an electromagnetic signal detector having a user interface and the capability to wirelessly communicate. In some embodiments, the accessory audio device 1004 may be operatively associated with other devices via smart phone 1002 or another intermediate device.

Figure 18:
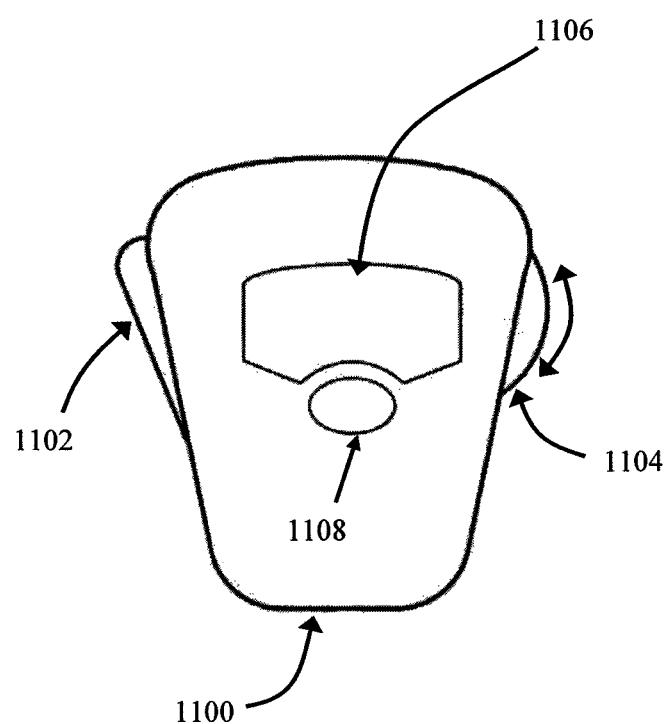
FIG. 18 is an embodiment of a device operable with the systems of the present disclosure.

FIG. 18 depicts another embodiment of an accessory audio device 1100 which may operate in connection with the systems of the present disclosure. In this embodiment, the accessory audio device 1100 is depicted apart from other communication devices. The accessory audio device 1100 may be operatively associated with the systems of the present disclosure via a wireless communication standard. In some embodiments, accessory audio device 1100 may be operatively associated with a system via an operative association with a communication device over a first communication standard as discussed with other figures and embodiments of this disclosure. In some embodiments, the accessory audio device 1100 may be operatively associated with a mobile phone, a cellular phone, a smart phone, a satellite phone, a navigation system, a personal digital assistant, a portable computer, a laptop computer, a tablet computer, and/or any other device with a user interface and the capability to wirelessly communicate.

In this embodiment, the accessory audio device 1100 comprises a first user control 1102, a second user control 1104, a display 1106, and an operation indicator 1108. In some embodiments, the accessory audio device 1100 may include additional components such as a microprocessor, a memory, a wireless communication component, etc. In addition, the accessory audio device 1100 may include any number of internal audio components including speakers, microphones, piezoelectric devices, and/or other audio components. In some embodiments, the audio components associated with the accessory audio device 1100 may improve sound quality received by and/or output from an associated communication device. As discussed with respect to other figures and embodiments, the accessory audio device 1100 may limit the need to operate a user interface of other devices. In this embodiment, the accessory audio device 1100 may be mounted in a preferred location to limit any driver distraction and provide ease of use. In some embodiments, the accessory audio device 1100 includes one or more mounting components which facilitate the accessory audio device 1100 to be removably mounted such as clips, magnets, hook and loop tapes, etc. In some embodiments, the mounting components may not facilitate ease of removal, such as bolts, adhesives, etc.

The first user control 1102 depicted in this embodiment is a button which may be actuated to control aspects of the accessory audio device 1100 and/or other operatively associated devices. As discussed with respect to other figures and embodiments, the first user control 1102 may be used in a variety of ways.

The second user control 1104 is depicted as a rotatable control. In some embodiments, the second user control 1104 may also operate as a button similar to the first user control 1102. In some embodiments, the second user control 1104 may be used to change variable controls, such as volume and/or range. In other embodiments, the second user control 1104 may be used to assist in the navigation of other controls. For example, as second user control 1104 is rotated, selectable options are shown on display 1106 and/or an alternative display operatively associated with the accessory audio device 1100, such as a communication device display. When an option is shown and/or indicated on display 1106, the user may actuate first user control 1102 or second user control 1104 to select the displayed option. Display 1106 may comprise any type of visual output device, such as a liquid crystal device, an LED array, etc.

In this embodiment, operation indicator 1108 may be another display which depicts one or more symbols associated with a current mode of operation for the accessory audio device 1100. In some embodiments, the operation indicator 1108 may be a light, LED and/or other visible indicator to depict a current mode of operation. For example, the operation indicator 1108 may comprise an LED behind a cover to indicate the whether the identified mode of operation is active or inactive. In some embodiments, the operation indicator may comprise visual, audible, tactile, and/or other modes of indication.

In some embodiments, the accessory audio device 1100 may be used outside of a vehicle. For example, the accessory audio device 1100 may be carried by a user and operate in conjunction with a communication device which is within range, such as a smart phone in the user's pocket. For another example, the accessory audio device 1100 may be attached magnetically to the metallic frame of a vehicle while the user is checking the engine, refueling, at a loading dock, and/or otherwise around the outside of a vehicle.

In some embodiments, the accessory audio device 1100 may operate as a mobile communication device in the systems disclosed with respect to other figures and embodiments. For example, the accessory audio device 1100 may include a wireless communication component, such as a cellular communication component.

Figure 19:
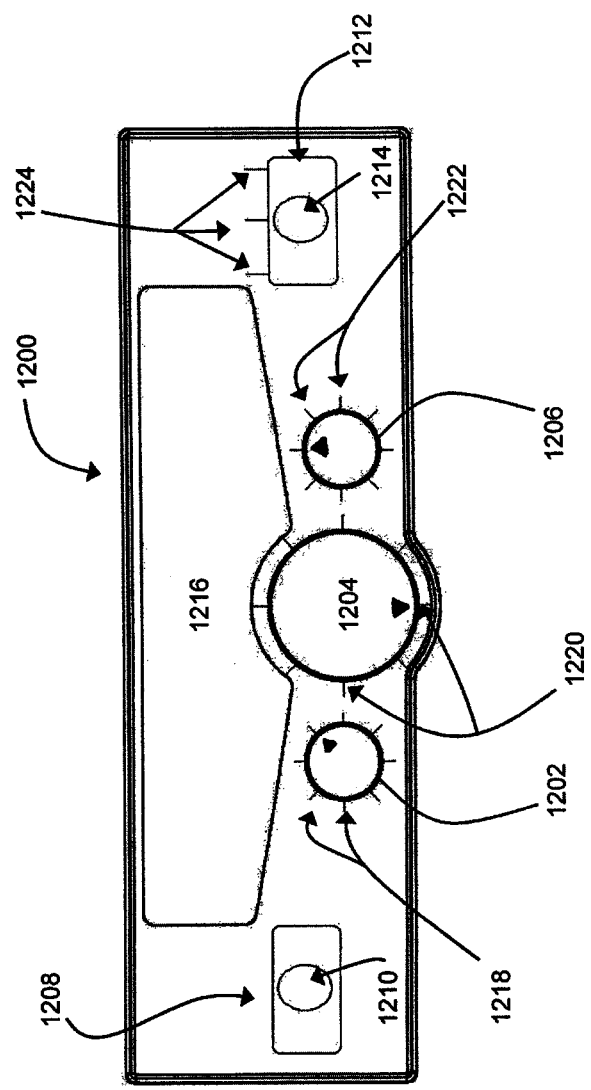
FIG. 19 is another embodiment of a device operable with the systems of the present disclosure.

FIG. 19 depicts another embodiment of a user device 1200 which may operate in connection with the systems of the present disclosure. In some embodiments, the user device 1200 may replace, be integrated into, and/or operate in conjunction with another device. For example, the user device 1200 may be integrated with a citizens band radio wherein the user may elect to use the citizens band radio communications and/or communications over the systems of the present disclosure.

In this embodiment, the user device 1200 included a variety of user controls including: first knob 1202, second knob 1204, third knob 1206, first slide control 1208, and second slide control 1212. In some embodiments, display 1216 may also include user interface controls such as touch-screen options. The user controls may be utilized to select options related to communication of data, information, predictions, and/or other information in the system. For example, the user controls may be used for controlling and/or filtering broadcast communications. In some embodiments, the controls may facilitate different operations depending on a selected mode. For example, when the CB mode is selected, the controls may be used to control aspects of the citizens band radio communications, such as the frequency channels, and when the system broadcast mode is selected, the controls may be used to operate separate system limitations for communications over the systems of the present disclosure.

In some embodiments, a separate device operatively associated with the user device 1200 may be used to manage and/or configure one or more aspects of the controls. For example, a server associated with one or more user devices 1200 may be used to manage and/or configure the operation of the controls. The server may be accessed by a computer, mobile communication device, and/or another device. Settings for the controls of user device 1200 may include channel selections, display restrictions, range limitations, user group options, direction options, and/or other configurable options. For example, a user may utilize a tablet computer to access a communication system configuration page. On the configuration page, the user may have the option to reconfigure one or more of the controls associated with user device 1200. In some embodiments, a user may setup user groups, such as friends, convoy members, sports groups, traffic groups, destination friends, etc., which may be selected as virtual channels associated with first knob 1202. Settings may also relate to modes of operation, navigation routes, and/or selected communication areas a for user device 1200.

In some embodiments, the user may configure the one or more portions of display 1216. For example, a user may configure the display 1216 to show user selections in sections of the display 1216 above each associated control, and alert levels on another section of the display. In some embodiments, the indicators 1218-1222 may be configured through the server to indicate specific options. In some embodiments, the indicators 1218-1222 may not be operatively associated with specific options. For example, one or more knobs may be freely rotatable, wherein the actuation of a second knob 1204 may cause display 1216 to show the current selected option associated with second knob 1204 and rotation of the second knob 1204 causes the selected option and depiction thereof to change to reflect a new selection. For illustration, a display may show the current selected range of 50 miles used when traveling rural areas, but as the user enters a more populous area, the user may rotate the range knob in a direction to reduce the range to 1 mile. In some embodiments, certain controls may be restricted by a third party. For example, a company may set certain restrictions on configuring user devices 1200 provided by the company to employees or contractors.

In some embodiments, the system may use separate servers, wherein one server facilitates operation, communication, and/or implementation of the system while another server facilitates user management, control, setup, and/or configuration of the system. In other embodiments, one server may be used for both system operation elements and system configuration elements. One skilled in the art will recognize that the number of components, such as servers, user devices, databases, user input devices, etc., in a system may vary and remain within the spirit and scope of the present disclosure. In addition, the various operations and management components may be applicable to other embodiments and/or figures disclosed herein. For example, operation of an electromagnetic signal detector and/or a mobile communication device may be configured using an associated server. One skilled in the art will recognize that the options, configurations, and/or settings may vary and remain within the scope and spirit of the present disclosure.

In some embodiments, first knob 1202 may be used to select communication groups. For example, each of first indicators 1218 may represent participant limitations on reception and/or distribution of system broadcasts. The first indicators 1218 may represent options to broadcast with all groups or separate selected user groups such as family, friends, coworkers, etc.

In some embodiments, second knob 1204 may be used to select a range of communication. For example, each of second indicators 1220 may represent a different range for reception and/or distribution of system broadcasts, such as 5 miles, 15, miles, 30, miles, etc.

In some embodiments, third knob 1206 may be used to select direction limitations. For example, each of third indicators 1222 may represent directional limitations on reception and/or distribution of system broadcasts. The third indicator 1222 may represent options to broadcast in all directions or separate identified directions such as ahead, behind, the same traveling direction, the opposite traveling direction, etc.

In some embodiments, the first slide control 1208 may be used to control potentially variable filters such as volume, range, etc. For example, the operative range of communication may increase as the slide 1210 is moved in a first direction, and the operative range of communication may decrease as the slide 1210 is moved in a second direction. In other embodiments, the first slide control 1208 may be used to switch between modes of operation such as a radio mode and a system mode.

The second slide control 1212 is shown as a three-way selector wherein, the slide 1214 may be associated with one of the three options represented by fourth indicators 1224. For example, the second slide control 1212 may allow the user to select a current user status for the system. In some embodiments, the user status may indicate the user is available, busy, invisible, or another status. When the user device is set to an available status other users of the system can identify the user of user device 1200. When the user device is set to a busy status other users of the system can identify the user of user device 1200, but are notified that the user is busy and may not actively participate in the communication. When the user device is set to an invisible status other users of the system cannot identify the user of user device 1200, however, the user may be listening to other user's broadcasts and/or recordings.

In some embodiments, the display 1216 may be used to show alerts levels, upcoming recordings, other users of the system, and/or other information. For example, when approaching locations having alert levels, the alert level may be posted on the display 1216 or a portion thereof. For another example, when engaging in a broadcast communication, other user names or call signs may be displayed for easy reference.

In some embodiments, the display 1216 depict an altered background color (such as green, yellow, red, etc.) to indicate the current alert level while continuing to show other relevant information, such as the available users for broadcast communication. The alert level associated with the user device 1200 may be based upon the user's historical and/or current driving characteristics, an analysis of aggregated data, and/or other information. For example, an analysis system may determine a high alert level based upon an analysis of aggregated data, but the user device 1200 may override the alert level based upon a determination that the user is traveling at or below the posted speed for the area. In such an example, the user device may not provide an indication on display 1216, or may provide an indication, such as a blue background, to represent the existence of an alert and the user's current compliance with the speed limit. In some embodiments, display 1216 may provide an indication that other users of the system have been ahead of you on the current path recently and no alerts have been identified. For example, a green background on display 1216 may indicate the road has been cleared by other vehicles within the prior 15 minutes.

One skilled in the art will recognize that the various aspects of the user interface of user device 1200 may differ and remain within the scope and spirit of the disclosure. For example, one or more of the knobs 1202-1206 and slide controls 1208 and 1212 may be replaced and/or modified with other user controls such as buttons, switches, voice controls, touch-screen applications and/or other components. In some embodiments, user device 1200 may include a display 1216 for communicating information received from the disclosed systems, but not include any user controls. In such embodiments, user device 1200 may be operatively associated with other devices which may operate as a user interface for user device 1200. The external user input controls may be associated with other devices operatively associated with user device 1200 such as a mobile phone, a cellular phone, a smart phone, a satellite phone, a navigation system, a personal digital assistant, a portable computer, a laptop computer, a tablet computer, a vehicle component, and/or any other device with a user interface.

For another example, the display 1216 may not be provided on other embodiments of user device 1200. In such an embodiment, the information discussed in conjunction with display 1216 may be communicated to the user through alternative means, such as audible, mechanical, tactile and/or other outputs from user device 1200. In other embodiments, information discussed in conjunction with display 1216 may be communicated to the user through alternative displays and/or outputs associated with other external devices operatively associated with user device 1200 such as a mobile phone, a cellular phone, a smart phone, a satellite phone, a navigation system, a personal digital assistant, a portable computer, a laptop computer, a tablet computer, a vehicle component, and/or any other device with a user interface.

Figure 20:
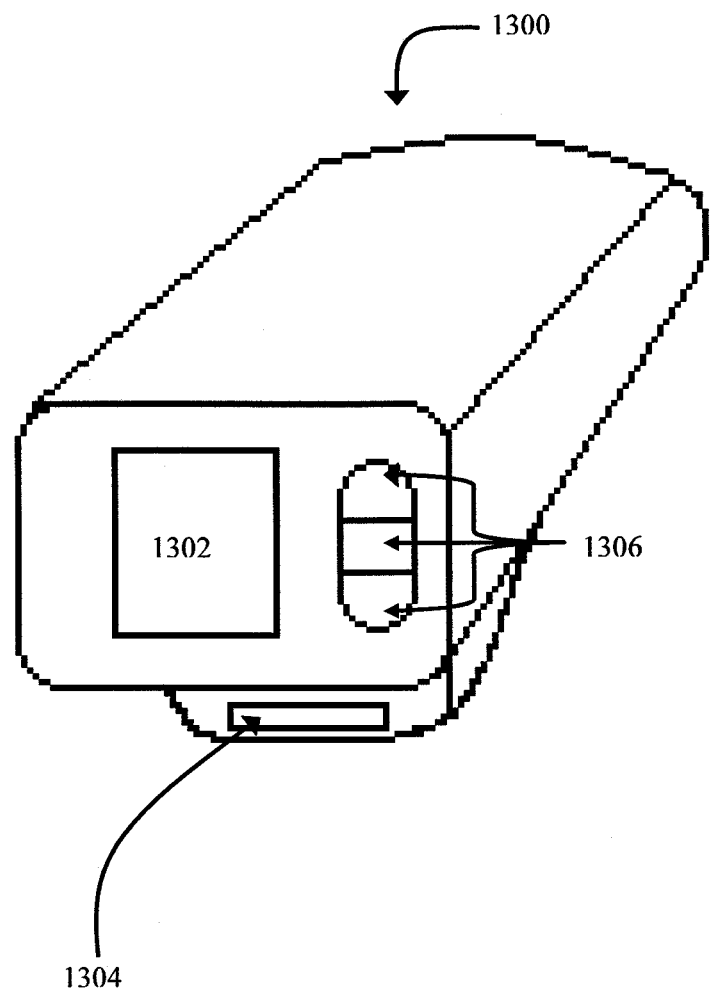
FIG. 20 is an embodiment of a radar detector operable with the systems of the present disclosure.

FIG. 20 depicts another embodiment of a user device associated with the systems of the present disclosure. This embodiment shows a radar detector 1300 which may be operatively associated with one or more of the systems of the present disclosure. Radar detector 1300 is shown with a first display 1302, a second display 1304, and buttons 1306.

In some embodiments, first display 1302 and/or second display 1304 may be a liquid crystal display, a projected image, and/or any display known or yet to be discovered. In some embodiments, first display 1302 and/or second display 1304 may be an alternative form of visual indicator, such as a series of light-emitting diodes. In some embodiments, the first display 1302 may comprise one type of display, such as a liquid crystal display, while the second display 1304 comprises a different type of display, such as a series of light-emitting diodes.

In some embodiments, first display 1302 may provide one type of information, while the second display 1304 provides another type of information. For example, first display 1302 may provide information from the systems of the present disclosure—such as predicted alert levels, recordings, weather alerts, communication system users, etc. At the same time, second display 1304 may provide information regarding electromagnetic signal detections of radar detector 1300. Similarly, other output mechanisms, such as audible outputs, mechanical outputs, tactile outputs, and other outputs, may be associated with different sources of data and alert information. For example, an audio output of radar detector 1300 may be solely associated with alerts provided by system 600 and not based upon internal signal detections. In some embodiments, the displays 1302 and 1304 may operate in conjunction providing alerts and/or information. In such embodiments, the displays 1302 and 1304 may utilize alternative indications to represent the source of information. For example, an orange color in either display 1302 or 1304 may indicate the information is from the internal components of radar detector 1300, and a blue color in either display 1302 or 1304 may indicate the information is from one or more of the systems of the present disclosure.

Some embodiments of radar detector 1300 may not include buttons 1306. For example, one or more of the buttons 1306 may be replaced and/or modified with other user controls such as knobs, switches, voice controls, touch-screen applications and/or other components. In some embodiments, radar detector 1300 may include one or more of displays 1302 and 1304 for communicating information received from the internal electromagnetic signal detector and/or the systems of the present disclosure, but not include any user controls. In such embodiments, radar detector 1300 may be operatively associated with other devices which may operate as a user interface for radar detector 1300.

Some embodiments of the radar detector 1300 may operate as a black box without a user interface. In such embodiments, the radar detector 1300 may comprise electromagnetic signal detector components and a communication component to interface with the systems and/or devices of the present disclosure. For example, the radar detector 1300 may detect a radar signal and send data regarding the detection to a mobile communication device using the communication component. The mobile communication device may further communicate the detection data to other components of the systems of the present disclosure and receive information from the other components. In addition, the mobile communication device associated with the radar detector 1300 may operate as a user interface for controlling the operation of radar detector 1300. In some embodiments, the mobile communication device may operate as a conduit to pass detection data to the systems of the present disclosure. In some such embodiments, the mobile communication device may operate as a display for alerts provided by components of the systems other than the radar detector 1300.

The invention being thus described and further described in the claims, it will be obvious that the same may be varied in many ways. The descriptions associated with various embodiments may be applicable to other embodiments of the present disclosure. Such variations are not to be regarded as a departure from the spirit and scope of the invention and all such modifications as would be obvious to one skilled in the art are intended to be included within the scope of the system, method, or computer program product described.

The invention claimed is:

1. A server for a mobile communication device operable to communicate with an electromagnetic signal detector, comprising:
  a communication element that facilitates communication via a second communication standard between said sever and said mobile communication device which is operable to communicate with said electromagnetic signal detector via a first communication standard,
    wherein said communication element receives data from at least one of said mobile communication device and said electromagnetic signal detector, wherein said data comprises voice transmissions,
    wherein said communication element facilitates transmission of said data via a second communication standard to a second mobile communication device based on a geographic location associated with said second mobile communication device, wherein a user interface of said second mobile communication device communicates said data to a user of said second mobile communication device, and
    wherein said first communication standard differs from said second communication standard; and
  an analysis algorithm that analyzes said data, wherein analyzing said data generates a prediction of an alert level based on a geographic location associated with at least one of said mobile communication device and said second mobile communication device, wherein said prediction is communicated to at least one of said mobile communication device, said second mobile communication device, and said electromagnetic signal detector.

2. The server of claim 1, wherein said prediction is communicated to said user based at least partially on a user input from at least one of said user interface of said second mobile communication device and a user interface of said first mobile communication device.

3. The server of claim 1, wherein said analysis algorithm comprises a voice recognition element, wherein said voice recognition element evaluates said voice transmissions.

4. The server of claim 3, wherein said prediction is based at least in part on said evaluated said voice transmissions.

5. The server of claim 1, further comprising a management element, wherein said management element facilitates configuration of at least one setting associated with at least one of said mobile communication device, said second mobile communication device, and said electromagnetic signal detector.

6. A mobile communication device that interfaces with a server, comprising:
   a communication component that communicates with a server via a communication standard, wherein said server aggregates data received from a plurality of communication devices and facilitates communication of at least a portion of said aggregated data to said mobile communication device, wherein said data is associated with a geographic location;
   a data filter that restricts said data received by said mobile communication device based upon at least one parameter; and
   a user interface that communicates filtered data to a user of said mobile communication device.

7. The mobile communication device of claim 6, wherein said parameter includes at least one of a geographic location, a route, a communication area, a map display limitation, a content category, a user group, a direction, a heading, a speed, and an alert level.

8. The mobile communication device of claim 6, wherein said parameter is based at least in part on a user input.

9. The mobile communication device of claim 8, wherein said user input is associated with at least one of said user of said mobile communication device and a user that created said data.

10. The mobile communication device of claim 6, wherein said mobile communication device further receives a prediction of an alert level from said server based on a geographic location associated with said mobile communication device via said communication standard, wherein said prediction is based on an analysis of said aggregated data, and wherein said user interface communicates said prediction to said user.

11. The mobile communication device of claim 6, wherein said mobile communication device generates a prediction of an alert level based on a geographic location associated with said mobile communication device via said communication standard, wherein said prediction is based on an analysis of said aggregated data, and wherein said user interface communicates said prediction to said user.

12. The mobile communication device of claim 6, wherein said aggregated data comprises information related to at least one of a geographic location, a speed, an acceleration, a direction, a heading, and a navigation route associated with a motor vehicle that is associated with said mobile communication device.

13. The mobile communication device of claim 6, wherein said aggregated data comprises information related to at least one of an electromagnetic signal detection, a road segment restriction, a voice transmission, and a predicted alert level.

14. A system for recorded communication among a plurality of mobile communication devices, the system comprising:
   said plurality of mobile communication devices that:
   a) communicate a data recording based on a geographic location associated with said mobile communication device and a parameter via a communication standard,
   b) display a map and an indication representing at least one said data recording, and
   c) communicate said data recording to a user of said mobile communication device; and
   a server that:
   d) receives said data recording from at least one mobile communication device via a communication standard, wherein said data recording is associated with said geographic location and said parameter;
   e) analyzes said geographic location and said parameter, and
   f) facilitates transmission of said data recording to said mobile communication device via said communication standard based on said analysis.

15. The system of claim 14, wherein said parameter is at least one of a threshold quantity of data, a threshold data storage size, and a time schedule.

16. The system of claim 14, wherein said parameter is at least one of an alert level, a content category, a recording format, a user control, and a user group restriction.

17. The system of claim 14, wherein said data recording is an audible voice recording.

18. The system of claim 17, further comprising an analysis algorithm to determine a timeframe for communicating said voice recording based upon at least one of a content category, activity associated with said voice recording, and an evaluation of other data recordings within a proximity to said voice recording.

19. The system of claim 14, wherein said data recording communicated to said user based on at least one of a proximity between said mobile communication device and said geographic location associated with said data recording, a user input via a user interface of said mobile communication device, and an alert level associated with said data recording.

20. The system of claim 14, further comprising a management element, wherein said management element facilitates configuration of at least one setting associated with at least one of said mobile communication device and said server.

21. The system of claim 20, wherein said system further comprises a second server wherein said second server comprises said management element.

22. The system of claim 14, wherein facilitating transmission of said data recording comprises:
   facilitating transmission of said indication to said mobile communication device,
   receiving a user request associated with said indication, and
   facilitating transmission of said data recording to said mobile communication device based on said user request.

23. The system of claim 22, wherein said user request is based upon at least one of a setting associated with said mobile communication device, a user input associated with said indication, and an analysis associated with said mobile communication device.

24. The system of claim 23, wherein said analysis associated with said mobile communication device is based upon at least one of a geographic location, a speed, an acceleration, a direction, a heading, and a navigation route associated with said mobile communication device.

25. The system of claim 14, wherein said server facilitates transmission of said geographic location associated with said data recording.

26. The system of claim 14, wherein said server facilitates transmission of said indication in conjunction with said geographic location associated with said data recording.

27. The system of claim 14, wherein said server generates a prediction of an alert level based at least in part on a voice recognition analysis of said data recording and associates said prediction with said geographic location.

28. The system of claim 27, wherein said server facilitates transmission of said prediction to at least one mobile communication device.

29. The system of claim 27, further comprising a management element, wherein said management element facilitates configuration of at least one setting associated with at least one of said mobile communication device and said server.

30. The system of claim 29, wherein said system further comprises a second server wherein said second server comprises said management element.

31. A system for broadcast communication among a plurality of mobile communication devices, the system comprising:
   said plurality of mobile communication devices that:
      a) communicate a data broadcast based on a geographic location associated with said mobile communication device via a communication standard, wherein said data broadcast comprises an audible voice transmission, and
      b) communicate said data broadcast to a user of said mobile communication device; and
   a server that:
      c) receives said data broadcast from at least one mobile communication device via a communication standard, wherein said data broadcast is associated with said geographic location,
      d) analyzes said geographic location and geographic locations associated with each of said plurality of mobile communication devices, and
      e) facilitates transmission of said data broadcast to at least one of said plurality of mobile communication devices via said communication standard based on said analysis.

32. The system of claim 31, wherein said analysis is further based on at least one parameter.

33. The system of claim 32, wherein said parameter is at least one of an alert level, a content category, a broadcast format, a user control, a communication area, and a user group restriction.

34. The system of claim 32, further comprising an identification component to identify users of said plurality of mobile communication devices to which said server facilitates transmission of said data broadcast.

35. The system of claim 31, wherein said data broadcast is communicated to said user based on at least one of a proximity between said mobile communication device and said geographic location associated with said data broadcast, a user input via a user interface of said mobile communication device, and an alert level associated with said data broadcast 36. The system of claim 31, wherein said server generates a prediction of an alert level based at least in part on a voice recognition analysis of said data broadcast and associates said prediction with a geographic location associated with said data broadcast.

37. The system of claim 36, wherein said server facilitates transmission of said prediction to at least one mobile communication device.

38. The system of claim 36, further comprising a management element, wherein said management element facilitates configuration of at least one setting associated with at least one of said mobile communication device and said server.

39. The system of claim 38, wherein said system further comprises a second server wherein said second server comprises said management element.

40. A computer program product for facilitating communication for a mobile communication device, the computer program product comprising:
   a tangible computer readable storage medium storing computer executable program code that, when executed by a processor, causes said computer executable program code to perform a method comprising:
      a) transmitting data by said mobile communication device to a server via a communication network, wherein said data comprises a voice transmission;
      b) receiving said data via said communication network based upon an analysis of a geographic location and at least one other parameter; and
      c) communicating said data to at least one of a user of said mobile communication device and a user of an other device based at least partially on a user input from a user interface of said mobile communication device.

* * * * *

UNITED STATES PATENT AND TRADEMARK OFFICE
CERTIFICATE OF CORRECTION

| | |
|---|---|
| PATENT NO. | : 9,132,773 B2 |
| APPLICATION NO. | : 13/840496 |
| DATED | : September 15, 2015 |
| INVENTOR(S) | : Washlow et al. |

It is certified that error appears in the above-identified patent and that said Letters Patent is hereby corrected as shown below:

IN THE SPECIFICATION

Column 4, line 16: delete "detectors" and insert --detector's--

Column 5, line 36: delete "preclude or and/modify" and insert --preclude and/or modify--

Column 9, line 54: delete "devices" and insert --detectors--

Column 9, line 60: delete "devices" and insert --detectors--

Column 14, line 14: delete "114" and insert --116--

Column 14, line 16: delete "114" and insert --116--

Column 26, line 2: delete "notices," and insert --notices.--

Column 26, line 13: delete "vehicles" and insert --vehicle's--

Column 27, line 6: insert --from-- between "received" and "other"

Column 30, line 59: delete "their" and insert --the user's--

Column 31, line 17: delete "their" and insert --the user's--

Column 33, line 39: delete "a recordings" and insert --a recording--

Column 33, line 63: delete "vehicles" and insert --vehicle's--

Column 34, line 57: delete "their" and insert --the user's--

Column 34, line 66: delete "and or" and insert --and/or--

Column 38, line 35: delete "areas" and insert --area--

Signed and Sealed this
Twenty-ninth Day of March, 2016

Michelle K. Lee
*Director of the United States Patent and Trademark Office*

CERTIFICATE OF CORRECTION (continued)
U.S. Pat. No. 9,132,773 B2

IN THE SPECIFICATION

Column 38, line 59: delete "a angular shape" and insert --an angular shape--

Column 38, line 60: insert --the-- between "is" and "location"

Column 39, line 10: delete "may be allow" and insert --may allow--

Column 39, line 11: delete "a fans" and insert --fans--

Column 39, line 66: delete "situation" and insert --situations--

Column 40, line 6: delete "an study session" and insert --a study session--

Column 40, line 10: delete "style" and insert --styles--

Column 40, line 18: delete "their" and insert --the user's--

Column 41, line 3: delete "that" and insert --than--

Column 42, line 14: delete "associate" and insert --associated--

Column 42, line 57: delete "utilize" and insert --utilized--

Column 43, line 16: delete "utilize" and insert --utilized--

Column 43, line 54: delete "indicated" and insert --indicate--

Column 45, line 2: delete "indicated" and insert --indicate--

Column 45, line 6: delete "indicated" and insert --indicate--

Column 48, line 11: delete "indicate the whether" and insert --indicate whether--

Column 49, line 8: delete "areas a for" and insert --areas for--

Column 49, line 9: delete "configure the one" and insert --configure one--

Column 49, line 62: delete "15, miles, 30, miles, etc." and insert --15 miles, 30 miles, etc.--

Column 51, lines 53-54: insert --with-- between "conjunction" and "providing"

IN THE CLAIMS

Column 52, line 43: delete "sever" and insert --server--